US006175835B1

(12) United States Patent
Shadmon

(10) Patent No.: US 6,175,835 B1
(45) Date of Patent: Jan. 16, 2001

(54) LAYERED INDEX WITH A BASIC UNBALANCED PARTITIONED INDEX THAT ALLOWS A BALANCED STRUCTURE OF BLOCKS

(75) Inventor: Moshe Shadmon, Tel-Aviv (IL)

(73) Assignee: Ori Software Development, Ltd., Tel Aviv (IL)

( * ) Notice: Under 35 U.S.C. 154(b), the term of this patent shall be extended for 0 days.

(21) Appl. No.: 09/235,645

(22) Filed: Jan. 22, 1999

Related U.S. Application Data

(63) Continuation-in-part of application No. 09/010,844, filed on Jan. 22, 1998, now abandoned, and a continuation-in-part of application No. 09/047,189, filed on Mar. 24, 1998, which is a continuation-in-part of application No. 08/981,010, filed on Jul. 20, 1998, now abandoned, which is a continuation of application No. PCT/IL97/00248, filed on Jul. 22, 1997.

(30) Foreign Application Priority Data

Jul. 26, 1996 (IL) .................................................... 118959

(51) Int. Cl.[7] .................................................... G06F 17/30

(52) U.S. Cl. ............................................................ 707/102

(58) Field of Search ............................................ 707/102

(56) References Cited

U.S. PATENT DOCUMENTS

| | | | |
|---|---|---|---|
| 4,606,002 | * | 8/1986 | Waisman et al. ..................... 707/102 |
| 4,945,475 | | 7/1990 | Bruffey et al. . |
| 5,257,365 | | 10/1993 | Powers et al. . |
| 5,295,261 | | 3/1994 | Simonetti . |
| 5,488,717 | | 1/1996 | Gibson et al. . |
| 5,495,609 | | 2/1996 | Scott . |
| 5,530,957 | | 6/1996 | Koenig . |
| 5,644,763 | | 7/1997 | Roy . |
| 5,664,172 | * | 9/1997 | Antoshenkov ........................... 707/4 |

(List continued on next page.)

FOREIGN PATENT DOCUMENTS

| | | |
|---|---|---|
| WO 98/04980 | 2/1998 | (WO) . |
| WO 99/38094 | 7/1999 | (WO) . |

OTHER PUBLICATIONS

"Database System Concepts" Henry F. Korth et al., McGraw Hill Intl Editions, 1986 (or the 3$^{rd}$ edition (1997)), Chapters 3–5 and 7–8, pp. 45–172 and 229–299.

"File Organization for Database Design", G. Wiederhold, McGraw–Hill, 1987, pp. 272, 273.

"The Art of Computer Programming", D.E. Knuth, Addison–Wesley Publishing Co., 1973, pp. 481–505, 681–687.

Software–Practice and Experience, vol. 25, No. 2, Feb., 1995, "Efficient Implementation of Suffix Trees", Arne Anderson et al., pp. 129–141.

IEEE Transactions on Software Engineering, vol. 17, No. 7, Jul. 1991, "Trie Hashing with Controlled Load", Witold A. Litwin et al., pp. 678–691.

Addison–Wesley XP002135679 120440, "The Art of Computer Programming", vol. 3, 1988, pp. 471–479.

Physical Data Organization Principles of Database Systems, J.D. Ullman, Jan. 1980, pp. 30–51.

Primary Examiner—Wayne Amsbury
(74) Attorney, Agent, or Firm—Oliff & Berridge, PLC

(57) ABSTRACT

In a database file management system for accessing data records and being executed on data processing system. The data records are linked to a trie index that is arranged in blocks and being stored in a storage medium. The trie index enables accessing or updating the data records by key or keys and being susceptible to an unbalanced structure of blocks. There is provided a method for constructing a layered index arranged in blocks, which includes the steps of providing the trie index and constructing a representative index over the representative keys of the trie index. The layered index enables accessing or updating the data records by key or keys and it constitutes a balanced structure of blocks.

98 Claims, 36 Drawing Sheets

U.S. PATENT DOCUMENTS

| | | | | |
|---|---|---|---|---|
| 5,694,591 | * | 12/1997 | Du et al. | 707/2 |
| 5,701,467 | * | 12/1997 | Freeston | 707/100 |
| 5,737,732 | | 4/1998 | Gibson et al. . | |
| 5,752,243 | * | 5/1998 | Reiter et al. | 707/3 |
| 5,761,652 | * | 6/1998 | Wu et al. | 707/2 |
| 5,799,299 | | 8/1998 | Fujiwata . | |
| 5,809,296 | | 9/1998 | Yong et al. . | |
| 5,842,196 | * | 11/1998 | Agarwal et al. | 707/2 |
| 5,873,087 | | 2/1999 | Brosda et al. . | |
| 5,963,956 | * | 10/1999 | Smartt | 707/4 |

\* cited by examiner

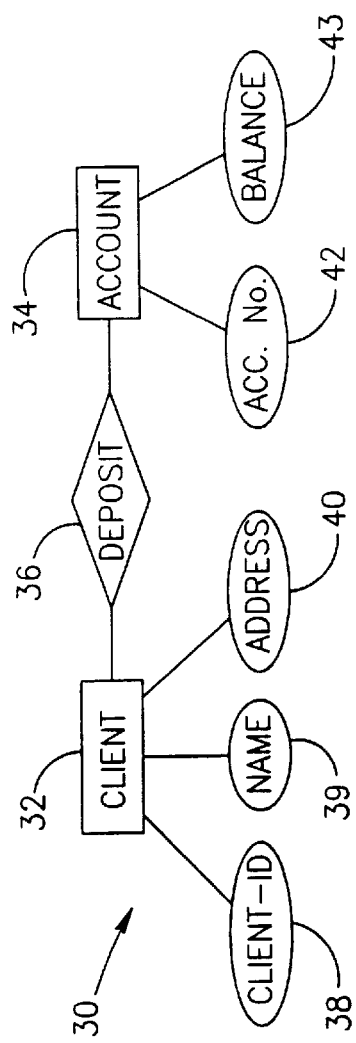

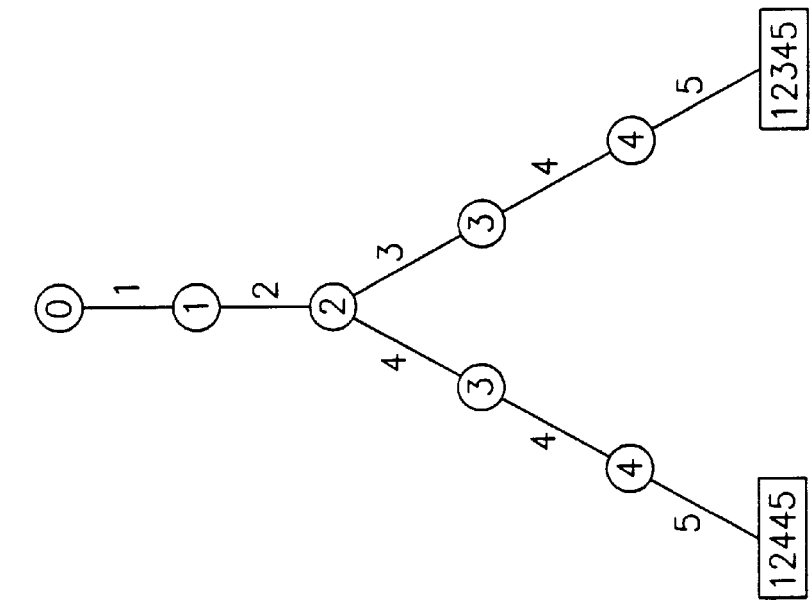
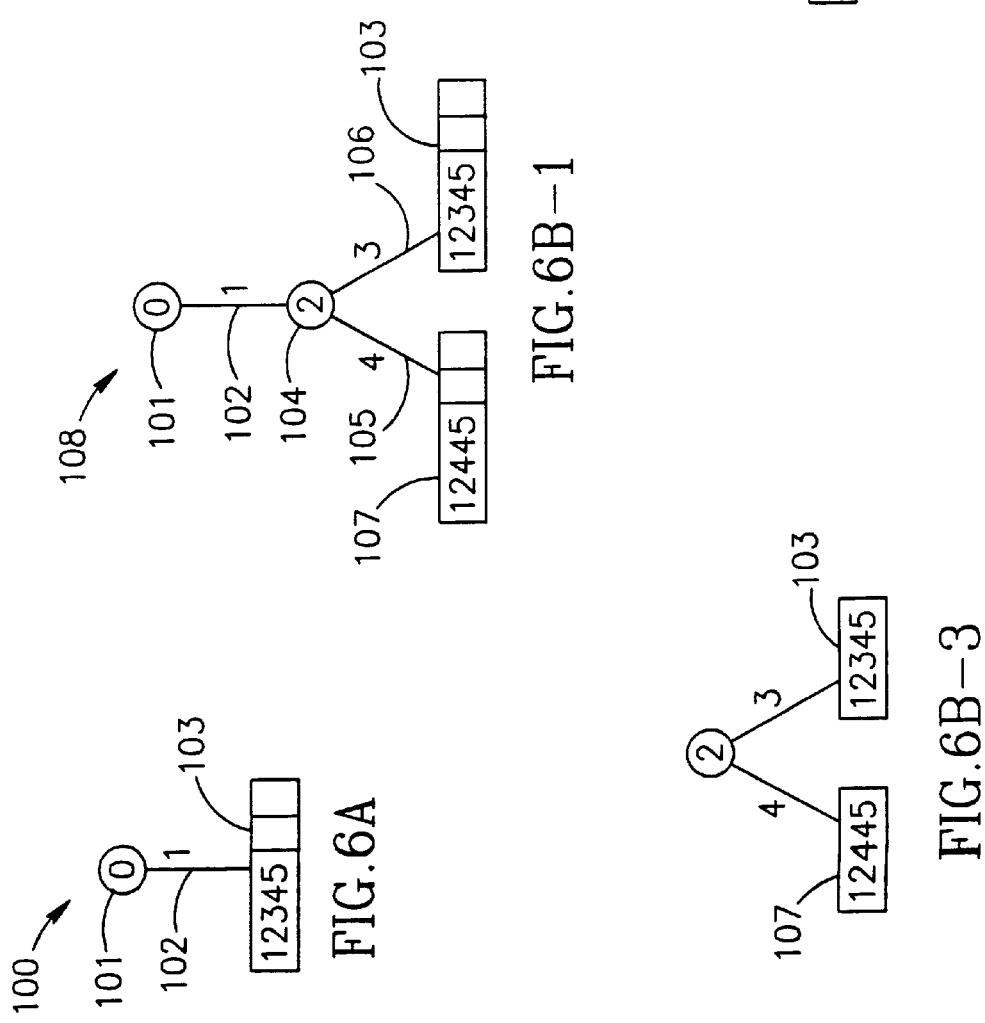

| A | ISBN | PUBLISHER | QUANTITY | | | |
|---|---|---|---|---|---|---|
| C | AUTHOR | | | | | |
| F | SURNAME | FIRST NAME | SSNO | DATE LENT | DATE RETURNED | |
| J | TITLE | | | | | |
| K | ABSTRACT | | | | | |
| O | REFERENCE ISBN | | | | | |
| P | TITLE | MAIN AUTHOR | PUBLISHER | | | |
| L | CATEGORY | | | | | |

FIG.15

LAYERED INDEX WITH A BASIC UNBALANCED PARTITIONED INDEX THAT ALLOWS A BALANCED STRUCTURE OF BLOCKS

This application is a continuation in part of Ser. No. 08/010,844, filed Jan. 22, 1998, ABN and a continuation in part of Ser. No. 09/047,189, filed Mar. 24, 1998, which is a continuation in part of Ser. No. 08/981,010, filed Jul. 20, 1998, ABN, which is a 371 of PCT/IL97/00248, filed Jul. 22, 1997.

FIELD OF THE INVENTION

This invention relates to databases and database management systems.

BACKGROUND OF THE INVENTION

As is well known, a database system is a collection of interrelated data files, indexes and a set of programs that allow one or more users to add data retrieve and modify the data stored in these files. The fundamental concept of a database system is to provide users with a so called "abstract" and simplified view of the data (referred to also as data model or conceptual structure) which exempts a conventional user from dealing with details such as how the data is physically organized and accessed.

Some of the well known data models (i.e. the "Hierarchical model", "Network model", "Relational model" and "Object Relational Model" will now be briefly reviewed. A more detailed discussion can be found for example in: Henry F. Korth, Abraham Silberschatz, "Database System Concepts", McGRAW-Hill International Editions, 1986 (or the $3^{rd}$ edition (1997))., Chapters 3–5 pp. 45–172.

Generally speaking, all the models to be discussed below have a common property in that they represent each "entity" as a "record" having one or more "fields" each being indicative of a given attribute of the entity (e.g. a record of a given book may have the following fields "BOOK ID", "BOOK NAME", "TITLE"). Normally one or more attributes constitute a "key" i.e. it identifies the record. In the latter example "BOOK-ID" serves as a key. The various models are distinguished one from the other, inter alia, in the way that these records are organized into a more complex structure:

Relational Model—The relational model, introduced by Codd, is a landmark in the history of database development. In relational databases an abstract concept has been introduced, according to which the data is represented by tables (referred to as "relations") in which the columns represent the fields and rows represent the records.

The association between tables is only conceptual. It is not a part of the database definition. Two tables can be implicitly associated by the fact that they have one or more columns whose values are taken from the same set of values (called "domain").

Other concepts introduced by the relational model are high level operators that operate on tables (i.e., both their parameters and results are tables) and comprehensive data languages (now called 4th generation languages) in which one specifies what are the required results rather than how these results are to be produced. Such non-procedural languages (SQL—Structured Query Language) have become an industry standard. Furthermore, the relational model suggests a very high level of data independence. There should not be any effect on the programs written in these languages due to changes in the manner data are organized, stored, indexed and ordered. The relational model has become a de-facto standard for data analysts.

Network Model—In the relational model, data (and relationship between data) are regarded as a collection of tables. In distinction therefrom in the network model data are represented as a collection of records whereas relationship between the records (data) are represented as links.

A record in the network model is similar to an "entity" in the sense that it is a collection of fields each holding one type of data. The links may be effectively viewed preferably (but not necessarily) as pointers. A collection of records and the relation therebetween constitutes a collection of graphs.

Hierarchical Model—The Hierarchical Model resembles the network model in the manner that data and relations between data are treated, i.e. as records and links. However, in distinction from the network model, the records and the relations between them constitute a collection of trees rather than of arbitrary graphs. The structure of the Hierarchical Model is simple and straightforward particularly in the case that the data that needs to be organized in a database are of inherent hierarchical nature. The hierarchical model has some inherent shortcomings, e.g. in many real life scenarios data cannot be easily arranged in hierarchical manner. Moreover, even if data may be organized in hierarchical manner, it may require larger volumes as compared to other database models.

Consider for example a basic entity "Employee" with the following subordinated attributes "Employee_Salary" and "Employee_Attendance". The latter may also have subordinated attributes e.g. "Employee_Entries" and "Employee_Exits". In this scenario the data is of inherent hierarchical nature and therefore should preferably be organized in the hierarchical model. Consider, for example, a scenario where "Employee" is assigned to several "Projects" and the time he/she spends ("Time_Spent") in each project is an attribute that is included in both the "Employee" and "Projects" entities. Such arrangement of data cannot be easily organized in the hierarchical model and one possible solution is to duplicate the item "Time_Spent" and hold it separately in the hierarchies of "Employee" and "Project". This approach is cumbersome and error prone in the sense that it is now required to assure that the two instances of "Time_Spent" are kept identical at all times.

Object Oriented Model—A comprehensive explanation can be found in "Object Oriented Modeling and Design", James Rumbaugh, Michael Blaha, William Premerlani, Fredrick Eddi and William Lorensen.

The object-oriented approach views all entities a objects. Each object belongs to a class, with each class there are associated methods and fields. To enable encapsulation some the fields are private, accessible only to methods of the class while others are public accessible to all. Thus "Joe Smith" belongs to the class of persons. For that class, the private fields age can be defined. Applying the class method update_age() to the object Joe will change his age. The methodology allows to define sub-classes which inherit all the methods and fields of the super-class. Thus, for example, the employee class can be defined as a subclass of the person class. In addition one may define additional fields and methods to the subclass. Thus, the employee class could support a salary field, and the get raise() method.

Object Relational Model allows an object view on relational-organized data. Thus, one is able to operate on the data as if it is organized as objects and at the same time, support the relational approach. As mentioned in the foregoing, data models deal with the conceptual or logical level of data representation and "hide" details such as how the data are physically arranged and accessed. The latter characteristics are normally dealt with by a so-called database file management system.

The database file management system maps the logical structure (in terms of database model) to a data structure, pertinent operations and possibly other data. The data structure includes index and data records. The index enables accessing or updating the data records by a key. In the context of search, the term search key is used. Database file management system should preferably operate on the data records so as to accomplish enhanced performance in terms of time (i.e. from the user's standpoint fast response time of the database), and space (i.e. to minimize the storage volume that is allocated for the database files). As is well known in the art, normally, there is a trade off between the time and space requirements. The performance of the database depends on the efficiency of the data structures that are used to represent the data and how efficiently the system can operate on these data. A detailed discussion on conventional file and management systems is given for example in Chapters 7 (file system structure) and 8 (indexing) in "Database System Concepts", ibid.

Known database file management systems typically utilize the following indexing schemes, which fall into the following main categories that include: Multi-way trees indexes and others.

Multi-way trees indexes—These techniques can be used to create a one or more access paths (referred to also as search paths) to the same data record. The search paths form a multi-way tree. Its main disadvantages are that it requires space (usually all the keys to the records plus some pointers) and maintenance (addition and/or deletion of keys whenever an update transaction (see definition below) occurs i.e. record is added and/or deleted. Normally, the nature of the indexing scheme as well as the volume of the data held in the files determine the number of accesses that are required to find or update (update encompasses, insert, delete or modify) a given data record. In the case that the storage medium under consideration is an external memory, the number of accesses is effectively the number of I/O accesses. As will be explained below, in each access to the storage medium a block of data is loaded into the memory.

Various types of tree indexing schemes have been developed but, normally, an indexing implementation is more costly than the specified direct access indexing techniques. On the other hand, tree indexing allows sequential and sub-range processing. One of the most widely used indexing schemes is the B-tree (under various commercial product names and implementation variants such as $B^+$ tree) in which the keys are kept in a balanced tree structure and the lowest level points at the data itself. Detailed explanation of the B-tree indexing scheme is found in "Database System Concepts" ibid. pp. 275–282. The number of I/O accesses obeys the algorithmic expression $Log_K N+1$ where K is an implementation dependent constant and N is the total number of records. This means that the performance slows down logarithmically as the number of records increases.

It is possible, of course, to use a combination of the above or other techniques, e.g. an indexing scheme which is implemented in accordance with two or more of the above techniques.

One of the significant drawbacks of the aforementioned popular B-tree indexing scheme is that the keys are not only held as part of the data records, but also as part of the index. This results, of course, in the undesired inflation of the index size and the latter drawback is further aggravated when indexes of large size are utilized (i.e. when a relatively large number of bits is required for representing the key).

One possible approach to cope with this problem is to exploit the Trie indexing scheme. An example of the latter is the trie discussed in G. Wiederhold, "File organization for Database design"; Mcgraw-Hill, 1987, pp. 272, 273, or in D. E. Knuth, "The Art of Computer Programming"; Addison-Wesley Publishing Company, 1973, pp. 481–505, 681–687.

Generally speaking, the trie indexing scheme enables a rapid search whilst avoiding the duplication of keys as manifested for example by the B tree technique. The trie indexing scheme has the general structure of a tree wherein the search is based on partitioning the search according to search key portions (e.g. search key digit or bit). Thus, for example each node in the trie indexing file represents an offset of the search key and the link to any one of its children represents the character's value at said offset. The trie structure affords efficient data structure in terms of the memory space that is allocated therefor, since, as specified before, the search-key is not held, as a whole, in internal nodes and hence the duplication that is exhibited for example in the B-tree indexing technique is avoided.

In a specific variant of the trie such as the trie described in "File organization for Database design" ibid., in order to achieve enhanced performance in terms of response time, a trie indexing file should be built by selecting the digits (or bits) from the search key such that the best possible partition of the search space in obtained, or in other words so as to accomplish a tree which is as balanced as possible. This, however, requires a priori knowledge of the data records of the trie and is accomplished at the penalty of obtaining an unsorted data, which in many real-life scenarios is inapplicable. It is noteworthy that if sorted data is mandatory, a balanced structure can not be guaranteed even if there is sufficient a priori knowledge of the data records of the trie. It should be noted that the specified trie does not support sequential sub-range processing.

When considering a large amount of data, it is of particular importance to maintain a so-called balanced structure of the tree index in order to avoid long paths for accessing a given data record from the root node to the leaf node that is associated with the sought data record. The specified B-tree indexing scheme, constitutes an inherent balanced tree structure, even after the tree has been subject to update transactions. The inherent balanced (or essentially balanced) structure is accomplished, however, and as explained above, at the penalty of inflating the contents of the blocks in the tree and, consequently, unduly increasing the file size that holds the index, particularly insofar as large trees which hold multitude of data records are concerned. The large volume of the files adversely affects the performance of the data management system in terms of number of accesses (and consequently in terms of accessing time) to the storage medium in order to reach a sought data record, which is obviously undesired.

Turning now to the "others" category of index schemes it includes for example the so called Skip list index: A skip list is a randomized data structure: It consists of levels, the lowermost level, level 0, consist of a list of all records ordered by non-decreasing order. Each node of level i (i= 0, . . . , h) chooses, with probability p, whether to be a representative of level i+1. The representatives of level i constitute the nodes of level i+1. These representatives, too, are organized as an ordered list. Level h+1 is the first empty level.

Having discussed the major drawbacks of hitherto known index schemes i.e. inflated data volumes (e.g. B-tree and variants thereof) and susceptibility to unbalanced structure (e.g. trie), there follows a discussion in another aspect which pertain to various characteristics including subordination of data records and multi-dimensional characteristics.

Thus, consider for example, two types of data records represented as two entities (tables), i.e. Books and borrowers, each being associated with respective unique key, e.g. borrower is identified by Borrower_Id and book is identified by Book_Id. In real life scenario, such as in a public library, one is interested to view for example all books borrowed by a given borrower. The latter transaction exemplifies subordination of data records, where "books" are subordinated to "borrower". In order to resolve this query, one should apply two queries—one for the borrower information and another for the books borrowed by him (according to the composite key—book borrower).

Insofar as B-tree indexing scheme is concerned, in order to support the subordination of data in the manner specified, several separate index files are requires, as follows:

Books index file, accessible via book-Id key;
Borrowers index file, accessible via borrower-Id key;
Transactions via borrowers, accessible via the composite key (borrower-Id book-Id).

Accordingly, the index scheme includes here three index files. This obviously poses undesired overhead insofar as data volumes and additional integrity maintenance and checking are concerned. Thus, for example, removal of a given book from the book file requires a preliminary test to inquire whether it exists in the borrower-book index file.

Having discussed the drawbacks of hitherto known techniques insofar as subordination of data records are concerned, the cumbersome representation and manner of operation thereof becomes even worth considering implementations of the so called multidimensional data records.

Reverting now to the latter example, the tables Books and borrowers are now regarded as multi-dimensional tables, which can be reached from several views. Thus, in addition to the above mentioned borrower→book view (books borrowed by borrower(s) which is implemented by an index over the borrower-book composite key, the database should support the alternative view of borrowers that borrowed a given book(s), which requires, of course, to utilize the alternative composite key (book-borrower).

In the Btree representation, it is accordingly required to add another index file accessible via the composite key (book-Id borrower-Id), giving rise to a total of four index files.

The pertinent drawbacks are self explanatory and become even worth for n dimensional tables (n>2).

There is accordingly a need in the art to reduce the drawbacks of data processing systems that exploit hitherto known database file management system. Specifically, there is a need in the art to provide for a data processing system that exhibits database performance by utilizing an efficient database file management system.

There is yet further need in the art to provide for a database file management system that utilizes an index which inherently being not susceptible to unbalanced structure in the manner specified above.

There is still further need in the art to provide for an index which inherently supports representation of multiple types of data, subordination of data records and/or multi-dimensions.

GLOSSARY OF TERMS

For clarity of explanation, there follows a glossary of additional terms used frequently throughout the description and the appended claims. Some of the terms are conventional and others have been coined:

Block—a storage unit which can be accessed by a single I/O operation. A block may contain data arranged in any desired manner, e.g. nodes arranged as a tree and possibly also links to actual data records. A block may reside in main (referred to also as internal) or secondary (referred to also as external) storage.

Tree—a data structure which is either empty or consists of a root node linked by means of d ($d \geq 0$) pointers (or links) to d disjoint trees called subtrees of the root. The roots of the subtrees are referred to as children nodes of the root node of the tree, and nodes of the subtrees are descendent nodes of the root. A node all the subtrees of which are empty is called a leaf node. The nodes in the tree that are not leaves are designated as internal nodes.

In the context of the invention, leaf nodes are also nodes that are associated with data records.

Nodes and trees should be construed in a broad sense. Thus, the definition of tree encompasses also a tree of blocks wherein each node constitutes a block. In the same manner, descendent blocks of a said block are all the blocks that can be accessed from the block. For detailed definition of "tree", refer also to the book Cormen, Leiserson and Rivest, or Lewis and Deneberg "Data structures and their algorithms".

It should be noted that the association (e.g. link) between leaf node and data record encompasses any realization, which enables to access data records from leaf nodes. Thus, by way of example, a data record may be accessed directly (i.e. through pointer) from the leaf node. By another non-limiting example, the leaf node points to data structure, (e.g. a table) which, in turn, enables to access data records. Other variants are of course, also feasible.

Depth of an index—is defined as the maximum number of blocks from a root block to a block associated with a data record.

Balanced Index—An index is balanced if there exists a constant c such that the number of accesses needed to reach any data record is at most clog n, where n is the number of records in the structure.

Obtaining a balanced tree encompasses, applying balancing technique, post factum, (on an unbalanced structure), bringing about a balanced structure, or, if desired, applying the balancing technique on the fly, so as to maintain, a balanced balanced structure.

Accessing in an index would be considered as a process of moving from a node to another node within a block or to another block usually, although not necessarily, in order to reach sought data records.

Navigating is considered as accessing data records, usually (although not necessarily), in order to collect them in an ordered manner by their key.

Search scheme: meaning the algorithm that is associated with an index that is used for accessing a given data record by key; intra-block search scheme meaning the algorithm that is used inside the block for accessing a given data record or another block. The data record is not necessarily accommodated within said block.

Common key of a block—The common key of a block is the longest prefix of all keys of the data records that can be accessed from the block by the relevant search scheme. If desired, part or all of the common key may be held explicitly in the block.

Update transactions—transaction consisting of either inserting a new data record, or deleting an existing data record or modifying an existing data record or portion thereof.

Vertical orientated trie structure—conventional orientation of digital tree from root to leaves. As will be exemplified below, it is not always obligatory to maintain all the links between nodes and/or blocks in the vertical trie. As will be explained in greater detail below, in an index of the invention, the trie that is susceptible to an unbalanced structure constitutes a vertical tree. As will be described below, in some specific embodiments, the construction of index over the keys of the data records of trie constitute vertical oriented tries.

Horizontal oriented trie structure—having h levels of vertical orientated trie structures with the first level standing for the uppermost level and the h th level standing for the lowermost level (constituting the trie that is susceptible to an unbalanced structure) which is normally associated with data records, and allows to move from a block in the $i^{th}$ level to a block in the $i+1^{st}$ level according to a common key value of the block. In various embodiments of the invention, and as will be explained in greater detail below, the h upper levels constitute a representative index over the common keys of the blocks of the lowermost level tree.

Storage medium—Any medium that may be used to store data, including either or both of internal and external memory. External memory may be one or more of the following: magnetic tape, magnetic disk, optical disk, or any other physical medium used for storing data. Internal memory includes any known main memory including cache memory as well as any other physical storage medium that serve as internal memory.

Short link—(referred to also as near link) a link labeled k between a node a having the value r to node b in the same block such that the keys of the data records that include node b on their access path have the value k at key position r.

Long link—(referred to also as far link) a link between a node v in block B of level i to block B' of level i−1 or to a data record. If v has value r and the label of the link is k, then the value of the common key of block B' or the key of the data record is k at position r.

The label of a short link or a far link is also referred as the value or direction of the link.

Split link—If a block overflows and a split process is performed such that if node a is linked to node b, and after the split node b and its descendent nodes are accommodated in a different block—block B—then the link between node a and node b is a split link. After the split, the split link is the link between node a and block B (that is accommodating node b). A split link is a labeled link.

In several implementations such as PAIF maintaining the split link from node a to to the block B where node b resides is optional since one can access block B through the layered index.

Direct link—a link between node v in block B of level i to block B' of level i−1, that includes a node v' such that nodes v and v' have the same value. If a search path to data record with a key k includes node v but does not include any of its near and far links then it should contain the direct link to block B'. A direct link has no label.

There follows a description that pertains to the terms duplicated node and copied node that are utilized in the block split procedure.

Thus, if a node v' has value k then all the keys of data records accessible from v' and its labeled links agree on positions 0, . . . , k−1.

If a node v is created such that it has a value equals to the value of node v' and all data records accessible from v and its labeled links are accessible from node v' and its labeled links, v is considered a duplicated node of v'. A duplicated node maintains a direct link to the block that includes node v' (a duplicated node is also referred as copied node).

GENERAL DESCRIPTION OF THE INVENTION

There follows a discussion in various additional terms and procedures that are used in the description and the claims in the context of the present invention.

Data records consist as a rule of several fields, some of which are designated as keys. Sometimes the records are ordered by one of the keys, called the primary key. An index (or index scheme) over the keys of data records or over representative keys (for the definition of the latter see below) is a data structure that facilitates search by one or more of the keys. Examples of index are any of the specified Multi-way tree index schemes. An index according to the invention may be constituted by using more than one index scheme.

The index may be stored in a file or files that reside partially or entirely in the internal memory or external memory.

In accordance with the invention there is provided an index that includes a partitioned index—a dynamic data structure—that allows search by key, and is partitioned into blocks, each of which contains a representative key. The representative keys should be sufficient to find the block associated with a record whose key equals the search key (if one exists). Having located the block, the data record may easily be retrieved. The representative keys are not necessarily stored physically in the block.

Examples of partitioned index are:
1. The sequence of blocks of a file ordered by increasing key value of the primary key. The index leads the search to the block containing the key. To allow searches by a key that is not the primary key, a partitioned index is constructed such that for each record the partitioned index contains its key and its link. These pairs are ordered by non-decreasing value of the key. The index leads to the block containing the address of the desired record.
2. A trie arranged in blocks.
3. Other types of index schemes that meet the provision of partitioned index.

A partitioned indexes over the keys of data records is called a basic partitioned index and is denoted index layer $I_0$.

This partitioned index might become non-balanced, thus giving rise to some long search paths.

To search the partitioned index efficiently, an additional index layer (an index layer is denoted in short also index) $I_1$ is constructed over the representative keys of $I_0$. If $I_1$ is also a partitioned index then an additional index $I_2$ may be constructed over the representative keys of the blocks of $I_1$. This process may be repeated until creating an index $I_h$ (hereinafter root index) which preferably is fully contained within a single block. The root index $I_h$ is not necessarily a partitioned index. The layered index (which constitutes also an index) is the collection of $I_0, \ldots, I_h$. $I_1, \ldots, I_h$ constitute a so called representative index.

To search a record by key k, the latter is searched in $I_h$ (and in some cases in $I_{h-1}$ to $I_1$ and data record(s)) in order to find the block B of $I_{h-1}$ leading to k. This process is repeated until reaching the block of $I_0$ that is associated with the record with key k (if one exists).

To insert a new record r with key k, a search is performed as above to find the block B. Having found B in $I_0$, r is added to B.

If B (in $I_0$) overflows, it is split into two (or more) blocks and the representative of B in $I_1$ is replaced by the representatives of the new blocks. The overflow of block $B_1$ in $I_1$ entails a splitting of $B_1$ and the representative of $B_1$ in $I_2$ is replaced by the representatives of the new blocks etc. If the block of $I_h$ overflows an additional layer $I_{h+1}$ is created and added to the layered index. It should be noted that an "overflow" state may be determined according to the particular application, and does not necessarily triggered when block is rendered full. Thus, for example, by one embodiment overflow occurs when a block is at least half size full.

Deletion is similar to insertion, and might involve merging—reverse process of splitting. The update or the split need not necessarily be performed on the fly, but may be delayed (i.e. performed post factum).

It should be noted that the construction of the layered index preferably retains a balanced index.

It should be noted that in some embodiments the balanced index is sufficient, and in some cases where the layered index (without $I_0$) is of relatively small volume (e.g. may be accommodated mostly or entirely in the internal memory) the "balanced structure" requirement may be exempted.

In accordance with a first aspect of the invention, it has been found that the inherent limitations of a basic partitioned index (e.g. trie) that is susceptible to an unbalanced structure may be coped with by providing an index and, more specifically, a layered index in the manner specified.

Focusing, for example, in the layered index as compared to the basic partitioned index (e.g. trie), it readily arises that accessing selected data records through the layered index is substantially more efficient than the accessing the same data records through said trie.

In the context of the invention, "more efficient" means that the number of accesses to the storage medium through the layered index in order to perform an update transaction (e.g. insert, delete or modify) on a data record or access data record is smaller compared to the number of accesses to the storage medium through the basic partitioned index. Number of accesses should be construed such that in each access a block is handled (e.g. loaded or processed) from the storage medium.

There may be exceptional scenarios where the latter "more efficient" provision does not apply e.g. in the case of very small file having only few blocks, where accessing a data record through the basic partitioned index may require the same or even less operations than through said layered index.

In order to implement partitioned index as a trie—the construction of a layered index from a basic partitioned index which is a trie, requires some further considerations.

Thus, each key is regarded as a character or bit string. Moreover, if the trie cannot be accommodated in a single block, it is partitioned into blocks, such that each block contains a single subtree of the trie. The representative key of the block is the string associated with the root node of the trie in the block, i.e., the sequence of labels of the path from the root of the trie of $I_i$ to the root of the trie of the block. As in the general layered index scheme, the representative keys of $I_i$ are the keys of $I_{i+1}$. To search a key k in $I_{i+1}$, one searches for the longest prefix k in the blocks of $I_{i+1}$ and from there moves to the appropriate block of $I_i$.

The insertion of a record entails adding its key to $I_0$, i.e., adding a value to the trie of $I_0$. If as a result a block overflows, the block is split—it is partitioned into typically two (in some implementations more) blocks, such that each block contains a (connected) trie. To accomplish this a link between a node u and its child v is severed, and the subtree rooted atv is moved to another block. The representative key of the new block, is added to $I_1$. As in the general layered index scheme, this process is continued to $I_1, \ldots, I_h$.

If the basic partitioned index is a compressed trie like Patricia or PAIF, only part of the keys are saved, this saves index space. However, these savings affect the manner in which the search is performed. In such compressed tries usually only nodes of degree greater than or equal to two are maintained. If the search key k does not belong to compressed trie, the search might terminate at some record r, and we have to check whether k is equal to the key of r. If the keys are different then the trie does not contain a record with key k.

The effect of this strategy on the layered index scheme is that the prefix of k might not be represented in the index. To enable search in such cases a direct link from nodes of blocks of $I_i$ to block of $I_{i-1}$ are introduced. These links do not have a direction, and are taken when the appropriate position of the search key does not agree with any one of the directions of the node.

Suppose the search reaches block $B_{i-1}$ of $I_{i-1}$, whose representative key $k_{i-1}$ is not a prefix of k. (If $k_{i-1}$ is not recorded explicitly in $B_{i-1}$, we can reach any data record r accessible from $B_{i-1}$, and from r's key determine $k_{i-1}$.) To continue the search, we compare k and $k_{i-1}$ to find the position j of the first character where they differ, search up the trie of block $B_i$ until finding a node v with a direct link and value less than or equal to j. The search continued from block of $I_{i-1}$ pointed at by that direct link. (If no such node exists, we go to the first block of the index $I_{i-1}$.) Thus, in the worse case, each layer might require one extra access. This notwithstanding, and as will be explained below, 3 layers are sufficient to address billions of records and usually 2 layers can be maintained in the internal memory of a computer. Thus it is possible to have no more than two I/O accesses to the external storage medium in order to access the block associated with a data record.

The split process also has to accommodate direct links. Suppose that the access path to block $B_{i-1}$ of $I_{i-1}$ consists of block $B_i$ of layer $I_i$, $B_{i-1}$ overflows and is split into blocks $B_{i-1}$ and $B_{i-1}'$. Block $B_i$ has now to contain links to all its descendent blocks in $I_{i-1}$. This can be accomplished by the following non-limiting technique:

Let $k_{i-1}'$ be the representative key of $B_{i-1}'$, this key is inserted to $T_i$—the compressed trie of $B_i$—so that the search to the keys of descendents of $B_{i-1}'$ reaches $B_{i-1}'$, and the search for the descendents of $B_{i-1}$ reaches $B_{i-1}$.

A non-limiting method to accomplishing split process is as follows:

1. at least one short link among the short links of a node (hereon split node) in the block is deleted (hereon split link) in a way that at least two tries exist in the block.
2. each of the sub-trees is moved to a separate block.
3. If the block of $B_i$ does not exist, $B_i$ is created and a copied node of the split node is created in $B_i$.
4. If the block of $B_i$ exists and a copied node of the split node does not exist in $B_i$, then a copied node of the split node is created in $B_i$ and connected to the trie of $B_i$ such that $B_{i-1}'$ (at the end of the split process) is accessible in a search path that includes the root node in $B_i$ and the copied node and its labeled links according to the representative key of $B_{i-1}'$.
5. If the copied node has no direct link, add a direct link from the copied node to the block $B_{i-1}$.
6. Add a far link from the copied node to the block $B_{i-1}'$ or if the copied node has a short link to a child node in the direction of the far link, the far link can be replaced by a direct link from the child node to block $B_{i-1}'$.

In the above implementation, a split of a block in $I_k$, k>0 is performed such that the split links (of $I_k$) are links between copied nodes of split nodes that reside in different blocks.

Accordingly, in accordance with one aspect the invention provides for in a storage medium used by a database file management system executed on data processing system, a data structure that includes:

a layered index arranged in blocks; the layered index includes a basic partitioned index that is associated with data records; the basic partitioned index enables accessing or updating the data records by key or keys, and being susceptible to an unbalanced structure of blocks;

said layered index enables accessing or updating the data records by key or keys and constitutes a balanced structure of blocks.

The invention further provides for, in a storage medium used by a database file management system executed on data processing system, a data structure that includes:

an index arranged in blocks and being constructed over the keys of data records; the index includes a basic partitioned index that is associated with the data records; the basic partitioned index enables accessing or updating the data records by key or keys, and being susceptible to an unbalanced structure of blocks;

said index enables accessing or updating the data records by key or keys and constitutes a balanced structure of blocks.

Still further, the invention provides for, in a storage medium used by a database file management system executed on data processing system, a data structure that includes:

an index arranged in blocks and being constructed over the keys of data records; the index includes a trie that is associated with the data records; the trie enables accessing or updating the data records by key or keys, and being susceptible to an unbalanced structure of blocks;

said index enables accessing or updating the data records by key or keys and constitutes a balanced structure of blocks.

Still further, the invention provides for in a database file management system for accessing data records and being executed on data processing system; the data records are associated with a basic partitioned index arranged in blocks and being stored in a storage medium; the basic partitioned index enables accessing or updating the data records by key or keys and being susceptible to an unbalanced structure of blocks;

a method for constructing a layered index arranged in blocks, comprising the steps of:

(One) providing said basic partitioned index;

(Two) constructing a representative index over the representative keys of said basic partitioned index; said layered index enables accessing or updating the data records by key or keys and constitutes a balanced structure of blocks.

The invention further provides for in a database file management system for accessing data records and being executed on data processing system; the data records are associated with a basic partitioned index arranged in blocks and being stored in a storage medium; the basic partitioned index enables accessing or updating the data records by key or keys and being susceptible to an unbalanced structure of blocks;

a method for constructing an index over the keys of the data records, the index being arranged in blocks, comprising the steps of:

(1) providing said basic partitioned index;

(2) constructing an index over the representative keys of said basic partitioned index; said index enables accessing or updating the data records by key or keys and constitutes a balanced structure of blocks.

In accordance with the invention there is further provided in a database file management system for accessing data records and being executed on data processing system; the data records are associated with a trie arranged in blocks and being stored in a storage medium; the trie enables accessing or updating the data records by key or keys and being susceptible to an unbalanced structure of blocks;

a method for constructing an index over the keys of the data records, the index being arranged in blocks, comprising the steps of:

(1) providing a trie;

(2) constructing an index over the representative keys of said trie; said index enables accessing or updating the data records by key or keys and constitutes a balanced structure of blocks.

The index, according to the invention is preferably, although not necessarily constructed by one or more of the indexing schemes selected from the specified index schemes. Typical, yet not exclusive, examples of multi-way trees indexes being the B-tree indexing scheme.

By one embodiment said basic partitioned search scheme being a trie that is constituted by a digital tree of the kind disclosed in U.S. Pat. No. 5,495,609.

By another embodiment said trie is constituted by a so called Probabilistic Access Indexing File (PAIF).

Thus, by a specific embodiment there is provided in a storage medium used by a database file management system executed on data processing system, a data structure that includes at least one probablistic access indexing file (PAIF) having a plurality of nodes and links;

the leave nodes of said PAIF are associated each with at least one data record accessible to said user application program and wherein at least portion of said data record constitutes at least one search-key;

selected nodes in said PIAF represent, each, a given offset of a search key portion within said inset search key; link(s) originated from each given node from among said selected nodes, represent, each, a unique value of said search key portion;

the PIAF having at least two sub-PIAF's being arranged, each, in a block;

said data base file management system is further capable of arranging said blocks as a balanced structure of blocks.

In the context of PAIF, it should be noted that said selected nodes, whilst preferably including only a given offset, this is not always necessarily the case. Thus, one or more of said nodes may include other information, such as portions of the keys and/or other information, all as required and appropriate.

According to a modified embodiment, the trie being of the PAIF type, the indexing scheme is constituted by a search scheme substantially identical to that of the PAIF trie.

Before proceeding any further it should be noted that for convenience of description only the invention is described mainly with reference to trie as a basic partitioned index. Those versed in the art will readily appreciate that the invention is by no means bound by trie and accordingly any basic partitioned index is applicable.

Thus, a database file management system that employs a layered index of the invention is advantageous, in terms of enhanced performance as compared to hitherto known techniques inter alia owing to the following characteristics:

The data are held inherently in sorted form according to search key. Namely, One can navigate in the tree by the order of the keys of the data records. The layered index inherently supports sequential operations like "get next" and "get previous". In this respect, the proposed layered index constitutes an advantage over e.g. hashing scheme and some implementations of digital trees.

There is no requirement for in advance knowledge of the contents of the database, in order to maintain balanced index.

A balanced layered index is retained and the depth of the layered index is relatively small, thereby minimizing the number of accesses (normally slow I/O operations) that are required to perform update transaction or access data record. According to one embodiment, practically one I/O (and no more than two I/O) operation (constituting one or two access) is required in order to access a given data record from among billions data records.

The invention thus further provides for in a computer system having a storage medium of at least an internal memory that ranges between 10 to 20 M byte or more, and an external memory;

a data structure that includes an index over the keys of the data records; the index is arranged in blocks; such that for one billion data records substantially no more than two accesses to said external memory are required in order to access a block that is associated with any one of said billion data records, irrespective of the size of the key of said data records.

Still further, the invention provides for in a computer system having a storage medium of at least an internal memory that ranges between 10 to 20 M byte or more, and an external memory;

a data structure that includes an index over the keys of the data records; the index is arranged in blocks; such that one million data records substantially all the blocks of the index are accommodated in said internal memory regardless of the size of the key of said data records.

The invention further provides for In a computer system having a storage medium, a data structure that includes an index over the keys of data records; the index is arranged in a balanced structure of blocks and enables to perform sequential operations on said data records; the index size is essentially not affected from the size of said keys.

It should be noted that the data records may reside in the blocks of the layered index, or may reside in separate data files (one or more). In the latter embodiment the data records should be associated, of course, to the corresponding layered index. As will further be clarified with reference to the description of specific embodiment below, a given data record may accommodate more than one search key.

The index, according to the invention is preferably, although not necessarily constructed by one or more of the indexing schemes selected from the specified index schemes. Typical, yet not exclusive, examples of multi-way trees indexes being the B-tree indexing scheme.

There follows now a discussion that pertains to the second aspect of the invention.

Thus, normally data consists of records of several types (e.g. in the example above books and borrowers). The type of the record determines its fields (attributes) and its keys. In a conventional system e.g. of the kind employing a B-tree index, the type of each key is not kept with the record and not considered part of the key. The program "knows" the type of the record, and therefrom the fields of the data records and their structure.

According to the second aspect of the invention there is proposed a different approach. Each type of key is assigned with a designator—a string of bits, e.g. a series of one or more characters which, normally but not necessarily, (is) are added as a prefix to all keys of this type. A designated key is a key with its designator. The designator is treated as part of the key (for search or update purposes), and therefore is part of the index scheme.

The designator enables to obtain the properties of the data record as a function of the type. Thus by looking at the designator of the key, one obtains the designator hence can deduce the type of the record, one need not know the record type a priori. Data records in which the keys are designated are called designated data records. A designated index is an index that enables search on designated data records.

There follows a description which exemplified the use of designators in accordance with the invention. Thus, consider a class C, such that all data records of this class have a key field (or fields) $k_1$, and possibly several other non-key fields. Let R be a data record of class C, where $R.k_1$=FIAT. Let the designator of $k_1$ be A. By adding the designator one gets the key AFIAT. To access a record with $R.k_1$=FIAT, the designated index is searched for the key AFIAT.

Having described the designator feature, there follows a description of another feature according to the second aspect—subordination of data records. Consider a record R1 with a key K1, and record R2 with a composite key consisting of the ordered pair of keys K1, K2. (In this case, the designated key of R2 is the composite key K1', K2', where K2' consists of the key K2 prefixed by a designator D2. (D2 is considered the designator of R2.) In a designated index, one can select R1 by searching the key K1'—the key K1 with its designator D1, and select R2 by searching the same index by the key K1'K2'—the concatenation of K1' and K2' where K2' is the key K2 with its designator D2. In this case K2 is subordinated to K1.

The subordination relationship is extended also to records. If K2 is subordinated to K1, the designator of K2' is D2 and the designator of R2 is also D2 (or D1, D2). If R2 is subordinated to R1, the key of R2 is composed by concatenating K2' to K1. Note that in K2', D2 is prefixed to K2.

In the ERD model, the type of record R1 and the type of record R2 may stand in a one-to-many relationship, meaning that several records of type R2 may be related to a single record of type R1. Such a relation can be implemented by the subordination relation: several records of type R2 will be subordinated to a single record of type (e.g., several books can be borrowed by the same borrower). In particular, if this relationship is one-to-one (e.g. one to one is the relationship where only one book can be borrowed by each borrower) then the key K1'D2, where D2 is the designator of R2, is sufficient to locate R2. In a designated index the search path to K1'K2' includes the search path to K1'. (This does not preclude the possibility of reaching the record R2 via another path.) The latter characteristic exhibits another important feature according to the second aspect, i.e. inherent maintenance of data integrity. Thus, the insertion of a record whose key is K1'K2' (or K1'D2) can only be performed if the record whose key is K1' exists. In the example above, an insertion of a transaction of a borrower (Borrower_Id=111111) who borrowed a book (book_Id= 2222) should result in insertion of a record R2 whose designated key is A111111B2222 (hereon borrower-book record)_only if the specified borrower (data record R1 with K1=111111) exists (in the above example, the designator of the borrower is A and the designator of the subordinated borrower-book data record is B). Data integrity is accomplished with just small overhead since the path in the index to the borrower-book record includes sufficient information to determine whether the borrower exists. If the borrower does not exist, the path to the composite key will not pass through the borrower. This will be automatically detected in the insertion process. In contrast, according to the prior art, records of different types were associated with different index files. Before inserting a new data record (with a composite key) in the Borrower-Book index file, a separate check must be performed in the Borrower index file in order to ascertain whether the specified borrower (record R1, key K1) exists, thus posing undue overhead.

Note that the subordination relation is not limited to just two levels, the subordinated record can itself have a record subordinated to it and accordingly n level of subordination may be accomplished. For example, consider a banking database, where the account records are subordinated to the branch records, and deposits records are subordinated to accounts.

Turning now to the multi-dimension feature according to the second aspect of the invention, let R be a record that is identified by either of two keys K1 and K2. Then, the designatored index should contain two search paths to R, one by the designated key K1' and one by the designated key K2'. Accordingly, R constitutes a multi-dimensional record. A multi-dimensional index includes the designated index and the multi-dimensional data record(s).

Consider a first embodiment where multi-dimensional index does not apply to subordinated data records. Thus, for example, consider a class C, such that all data records of this class have two key fields $k_1$—the car model—and $k_2$—its license plate number, and possibly several non-key fields. Let R be a data record of class C, where $R.k_1$=FIAT and $R.k_2$=127. Let the designator of $k_1$ be A and that of $k_2$ be B. By adding the designators one gets the keys AFIAT and B127. These extended keys are inserted into a single designated index. To access a record with $R.k_1$=FIAT, the designated index is searched for the key AFIAT, and to select a record with $R.k_2$=127, the same designated index is searched for B127.

The above discussion and example considered a multi-dimensional index where the data records do not necessarily exhibit subordination relationship. The multidimensional index may optionally applied also to subordinated data records. For example, consider a banking database, where the deposits are subordinated to both accounts and depositors. A single designated index provides access to accounts (by the designated key $k_1$' account-number), to depositors (by the designatored key $k_2$' depositor-name) and to deposits by both $k_1'k_2'$ and $k_2'k_1'$. (It is possible, of course, to use different designators for the $k_1$ when it is subordinated to $k_2$ and to $k_2$ when it is subordinated to $k_1$.).

The designator of a multi-dimensional record depends on the designator of the key used to search or update the record. Thus, the designator of a car record (FIAT, 127) is A when searching or updating the record by the key AFIAT, and is B when accessing it via the license plate number B127.

In addition to the data records it is needed to maintain meta-data. The meta-data includes information on the different records as a function of their type. Thus, it is needed to identify the designator and as a result the information on the record is available, for example a description of the various fields, keys, subordination, record size etc. The search scheme in the designated index is oblivious to the meta-data. It locates the record, identifies the designator (for example the designator can be prefixed to the record) and construct the (composite) designated key.

There is thus provided in accordance with a second aspect of the invention, in a storage medium used by a database file management system executed on data processing system, a data structure that includes: an index over the keys of data records; the data records being of at least two types where data records of the second type are subordinated to the data records of the first type.

Still further in accordance with the second aspect there is provided in a storage medium used by a database file management system executed on data processing system, a data structure that includes:

a designated index over designated keys of data records; the data records, constituting designated data records, being of at least two types where designated data records of the second type are subordinated to the designated data records of the first type.

According to the second aspect various advantages are accomplished including:

The data structure that includes designated index and designated data can maintain the relations between different data items.

The data structure that includes designated index and designated data can link logically related items.

The data structure that includes designated index and designated data can support several data models simultaneously and efficiently.

The data structure that includes designated index and designated data allows high efficiency in maintaining data integrity.

The data structure that includes designated index and designated data allows high efficiency in retrieving relating data.

A detailed discussion as regards the various advantages offered by the database file management system of the invention is given below with reference to specific embodiments.

It should be noted that the data records may constitute part of the PAIF, or may reside in one or more separate data files. In the latter embodiment the data records should be linked, of course, to the corresponding PAIF. As will further be clarified with reference to the description of specific embodiment below, a given data record may accommodate more than one search key.

It would also be presented how complex data structures and data relations can be supported by a new uniform and simple technology.

It would also be presented how an index structure can be of a minimal size, not depending on the size of the keys.

All of the above mentioned advantages are supported inherently by the invention without any preliminary considerations on the data (i.e. key range is unknown, number of records is unknown, random physical location of data records is assumed and so on).

By still another aspect the invention provides in a storage medium used by a database file management system executed on data processing system, a data structure that includes:

an index being stored in the storage medium and constructed over the keys of said data records that are stored in blocks; the index being arranged in blocks with the leaf blocks being linked to data records by means of links;

said index is characterized in that at least one of said links is shared by at least two data records stored in the same block.

By one embodiment, the index being constituted by a trie.

Still further, the invention provides for, in a storage medium used by a database file management system executed on data processing system, a data structure that includes:

an index being stored in a storage medium and constructed over the keys of said data records that are stored in blocks; the index being arranged in blocks with the leaf blocks being linked to data records by means of links;

said index is characterized in that at least one of said links is shared by at least two data records stored in the same block;

said index constituting a layered index according to claim 1, and blocks of said basic partitioned index are linked to said data records.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2 shows a sample database structure represented as an Entity Relationship Diagram (ERD), and serving for illustrative purposes;

FIG. 3 shows the database of FIG. 2, represented as tables in accordance with the relational data model, with each table holding few data occurrences;

FIGS. 6A–6C show the "CLIENT" table of FIG. 3, in accordance with file management system employing a PAIF index scheme;

FIG. 15 shows a schematic illustration of a designated index according to another embodiment of the invention;

DETAILED DESCRIPTION OF A PREFERRED EMBODIMENT

Figure 1:
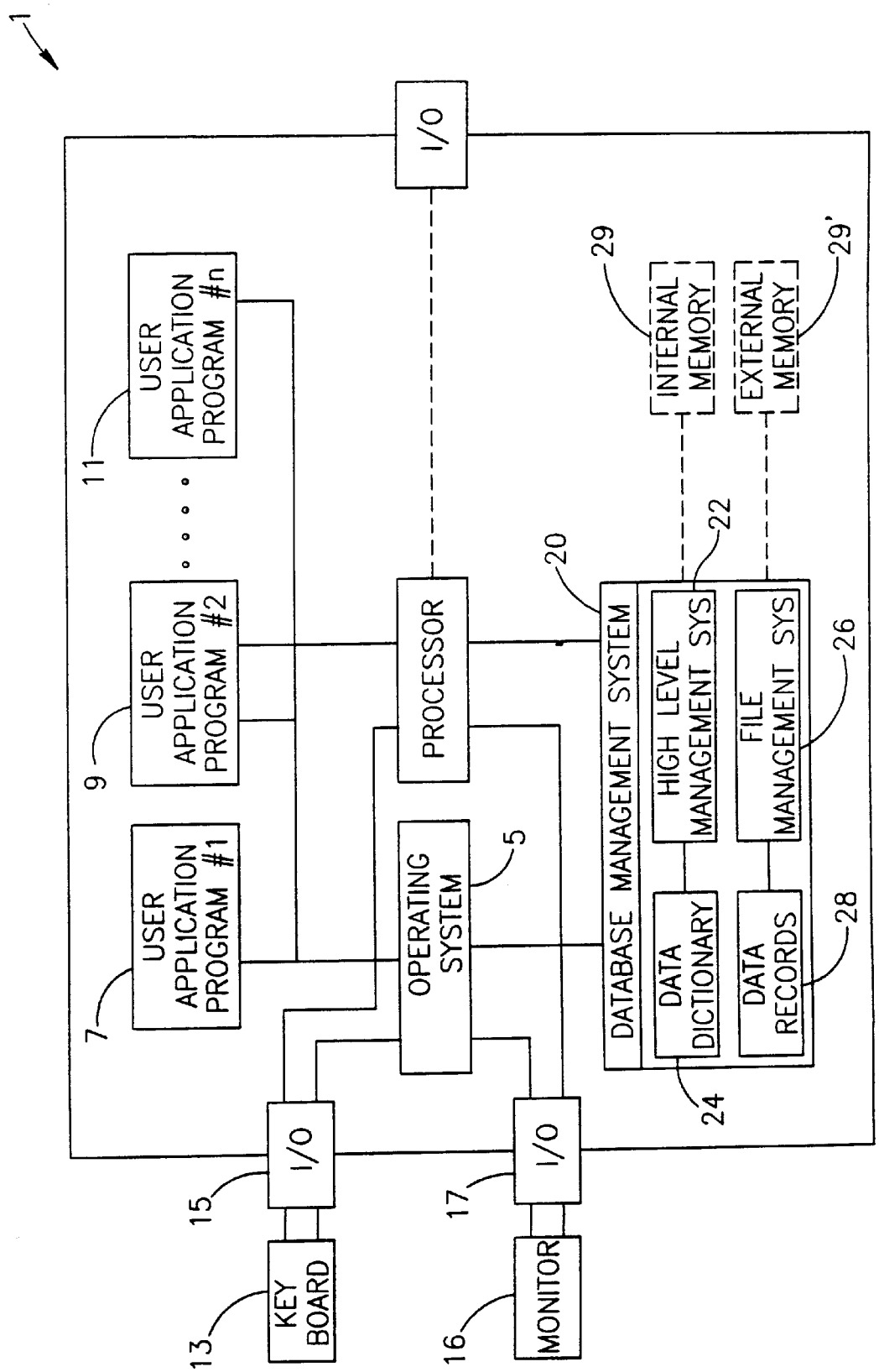
FIG. 1 shows a generalized block diagram of a system employing a database file management system.

Attention is first directed to FIG. 1 showing a generalized block diagram of a system employing a database file management system of the invention. Thus, a general purpose computer 1, e.g. a personal computer (P.C.) employing a Pentium® microprocessor 3 commercially available from Intel Corp. U.S.A., has an operating system module 5, e.g. Windows NT® commercially available from Microsoft Inc. U.S.A., which communicates with processor 3 and controls the overall operation of computer 1.

P.C. 1 further accommodates a plurality of user application programs of which only three 7, 9 and 11, respectively are shown. The user application programs are executed by processor 3 under the control of operating system 5, in a known per se manner, and are responsive to user input fed through keyboard 13 by the intermediary of I/O port 15 and the operating system 5. The user application programs further communicate with monitor 16 for displaying data, by the intermediary of I/O port 17 and operating system 5. The user application programs can access data stored in a database by means of database management system module 20. The generalized database management system, as depicted generally in FIG. 1, includes high level management system 22 which views, as a rule, the underlying data in a "logical" manner and is responsive, to the user application program by means known per se such as, e.g., SQL Data Definition and Data Manipulation language (DDL and DML). The database management system typically exploits, in a known per se manner, a data dictionary 24 that includes meta-data which maintains information on the underlying data.

The underlying structure of the data is governed by database file management system 26 which is associated with the index scheme and actual data records 28. The "high-level" logical instructions (e.g. SQL commands) received and processed by the high-level management system 22 are converted into "lower level" commands that access or update the data records that are stored in the database file(s) and to this end the database file management system considers the actual structure and organization of the data records. The "high level" and "low level" portions of the database file management system can communicate through a known per se Application Programmers Interface (API), e.g. the Microsoft open database connectivity (ODBC) interface commercially available from Microsoft. The utilization of the ODBC enables "high level" modules of the database file management system or application program to transparently communicate with different "database file management systems" that support the ODBC standard. The terms access or update of data records used herein encompass all kind of data manipulation including "find", "insert", "delete" and "modify" data record(s), and the pertinent DDL commands which afford the construction, modification and deletion of the database. FIG. 1 further shows, schematically, a storage medium in the form of internal memory module 29 (e.g. 16 Mega byte and possibly employing a cache memory sub-module) and an external memory module 29' (e.g. 1 gigabyte). Typically, external memory 29' is accessed through an external, relatively slow communication bus (not shown), whereas the internal memory is normally accessed by means of a faster internal bus (not shown). Normally, by virtue of the relatively small size of the internal memory, only those applications (or portions thereof) that are currently executed are loaded from the external memory into the internal memory. By the same token, for large databases that cannot be accommodated in their entirety in the internal memory, a major portion thereof is stored in the external memory. Thus, in response to an application generated query that seeks for one or more data records in the database, the database management system utilizes operating system services (i.e. an I/O operation) in order to load, through the external communication bus, one or more blocks of data from the external to the internal memory. If the sought data records are not found in the loaded blocks, additional I/O operations are required until the sought data records are targeted.

It should be noted that for simplicity of presentation, the internal and external memory modules 29, 29', are separated from the various modules 5, 7, 9, 11, 20. Clearly, albeit not shown, the various modules (operating system, DBMS, and user application programs) are normally stored in the external memory and their currently executed portions are loaded to the internal memory.

Computer 1 may serve as a workstation forming part of a LAN Local Area Network (LAN) (not shown) which employs a server having also essentially the same structure of FIG. 1. To the extent that the workstations and the server employ client-server based protocols a predominant portion of said modules (including the database records themselves 28) reside in the server.

Those versed in the art will readily appreciate that the foregoing embodiments described with reference to of FIG. 1 are only two out of many possible variants. Thus, by way of non-limiting example, the database may be an on-line database residing in an Internet Web site. The invention is, of course, not limited to the specified partition of small internal memory and large external memory. Thus, for example, by a modified embodiment a large internal and external memories are employed and by yet another modified embodiment only internal memory is employed.

It should be further noted that for clarity of explanation system 1 is illustrated in a simplified and generalized manner. A more detailed discussion of database file management systems and in particular of the various components that are normally accommodated in database file management systems can be found, e.g. in Chapter 7 of "Database System Concepts" ibid.

Figures 1, 6C:
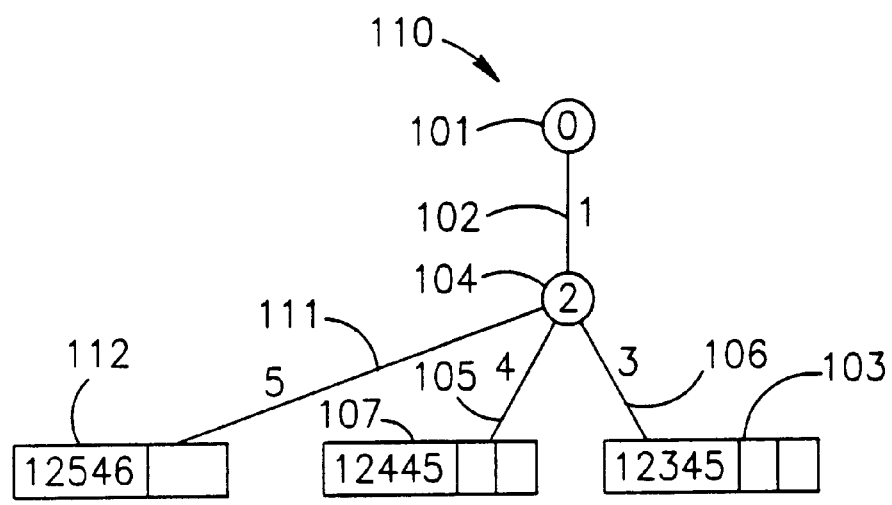
Figures 2, 6C:
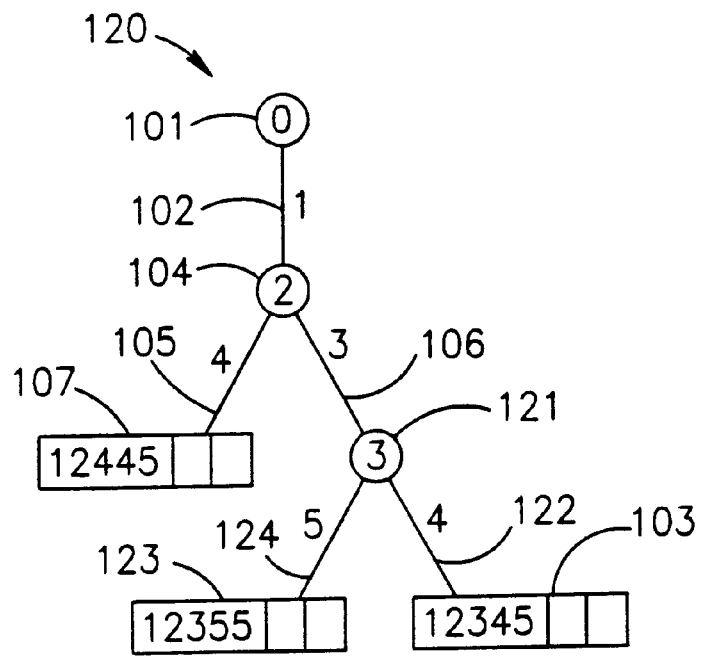

Having described the general structure of a system of the invention, attention is now directed to FIG. 2 showing a sample database structure represented as Entity Relationship Diagram (ERD), and serving for illustrative purposes. Thus, the ERD 30 of FIG. 2 consists of the entities "CLIENT" 32 and "ACCOUNT" 34 as well as an "n to m" "DEPOSIT" 36 relationship indicating that a given client may have more than one account and by the same token a given account may be owned by more than one client.

As shown, the entity "CLIENT" has the following attributes (fields): "Client_Id" 38 being a key attribute that uniquely identifies each client, "Name" 39 standing for the client's name and "Address" 40 standing for the client's address. The entity "ACCOUNT" has the following attributes (fields): "Acc_No" 42 being a key attribute that uniquely identifies each account, and "Balance" 43 holding the balance of the account. The relationship "DEPOSIT" consists of pairs of keys of the "CLIENT" and "ACCOUNT" entities, such that each pair is indicative of particular account owned by specific client.

Figures 3, 6C:
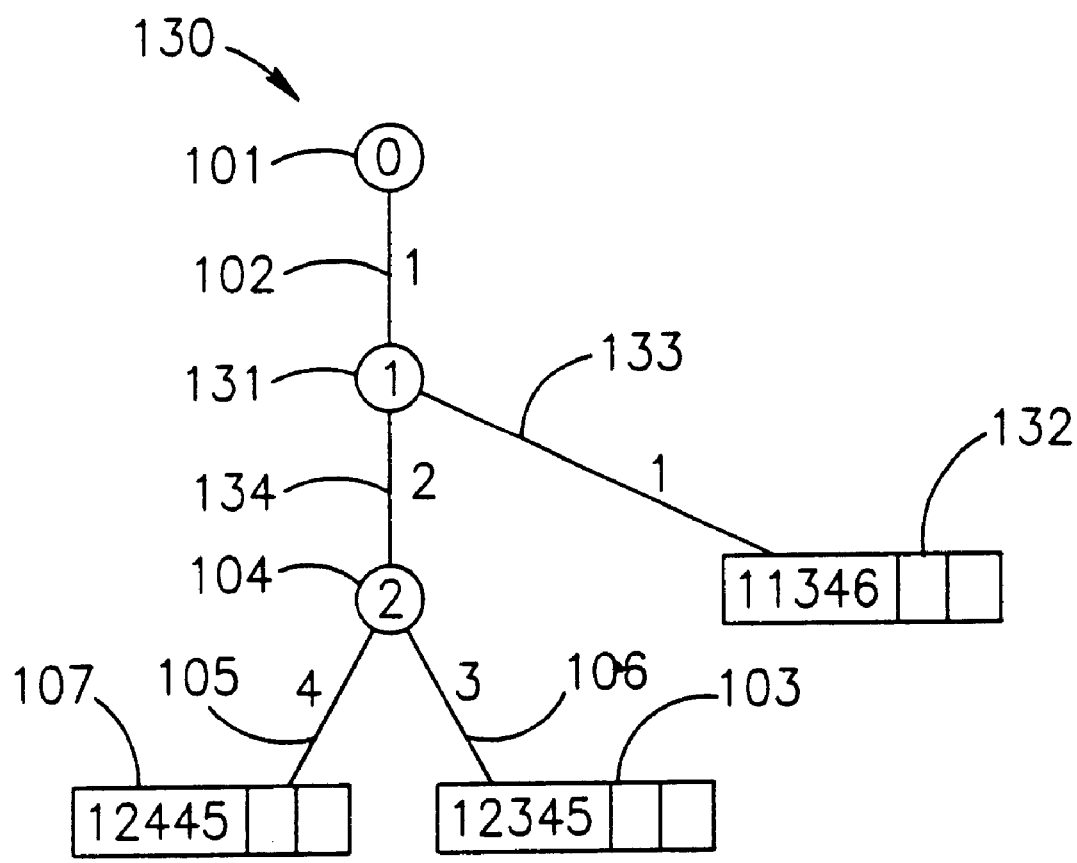

Turning now to FIG. 3, there is shown a database of FIG. 2, represented as three tables 50, 51 and 52 corresponding to the relational data model, 32, 34 and 36, respectively, with each table holding a few data occurrences for illustrative purposes. It should be noted that the length of the key field ("Client_ID") of the "CLIENT" table is 5 digits, whereas the length of the key field ("Acc_ID") of the "ACCOUNT" table is 6 digits. The client table holds 5 data occurrences 55–59, the account table holds 2 data occurrences 65, 66 and the deposit table holds 3 data occurrences 70–72.

Figure 4:
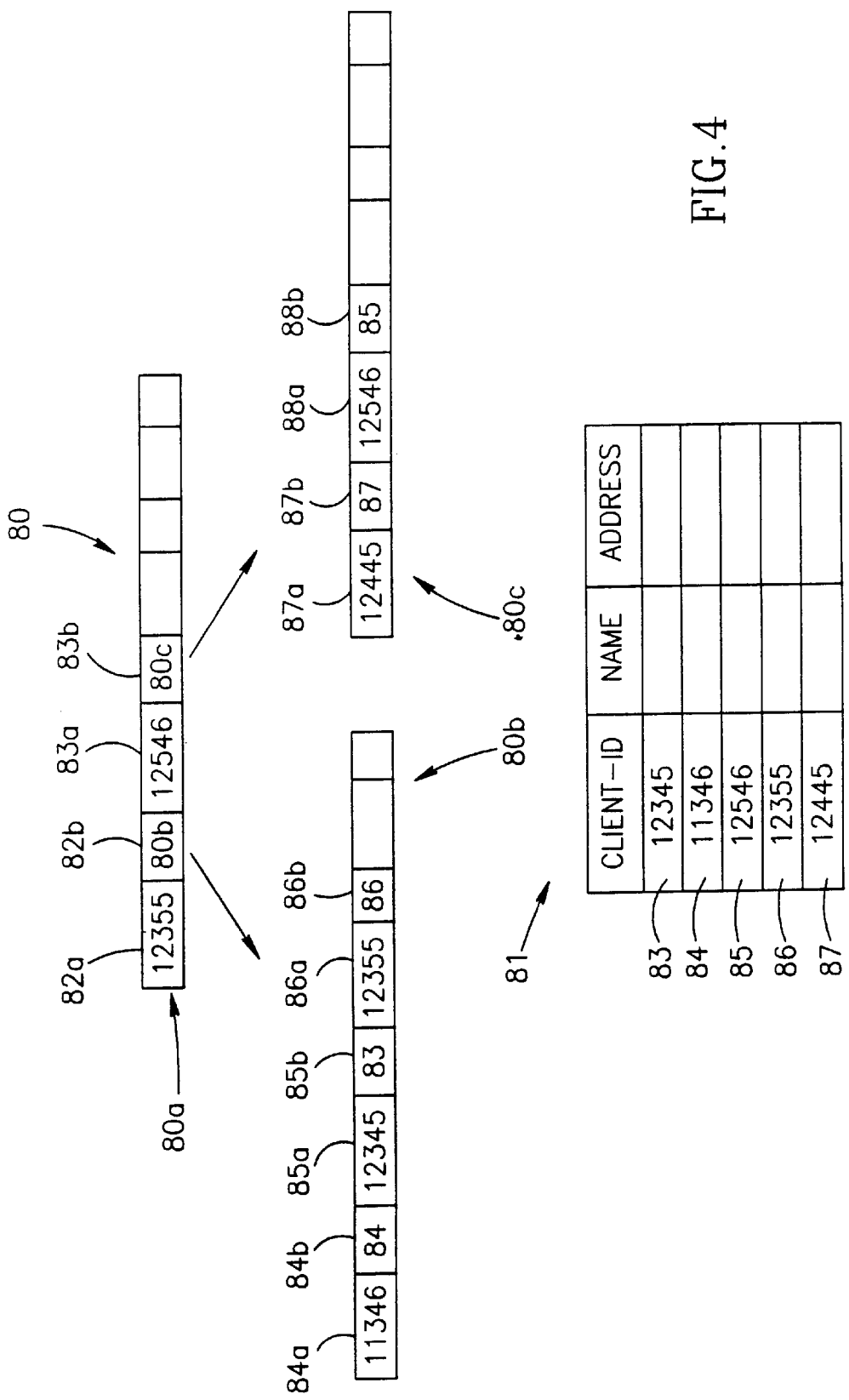
FIG. 4 shows the "CLIENT" table of FIG. 3, in accordance with file management system employing conventional $B^+$ tree index scheme.

In accordance with prior art techniques, for each table there is, as a rule, a different index file by the primary key. Thus, FIG. 4 illustrates an underlying indexing file of the "CLIENT" table of FIG. 3, in accordance with file management system employing the conventional B-tree indexing scheme. As shown, the indexing file 80 consists of three blocks 80a–c, standing for a root block and two leaf blocks respectively. The data records are organized randomly in a separate file 81 holding the five data records 83–87. Each block consists of a succession of pair of fields (e.g. 82a–b and 83a–b in block 80a). In each pair the first field stands for a search key value and the second field stands for a link such as number that identifies the next block to search, or in the case of a leaf block a link to the data record such as a number identifying the data record. The latter realization form a non limiting embodiment of associating a data record to a block. In the specific embodiment of FIG. 4, a search for records with a key that equals 12355 or smaller value are directed from root block 80a to block 80b.

Thus, a search for a record whose key is 12355 (82a) starts in root block 80a and is directed by the link 82b to block 80b. In block 80b, the search key 12355 (86a) is associated with link 86b indicating the address of the data record identified by this search key in the data file 81. Put differently the data record that is identified by search key "12355" (57 in FIG. 3) is the forth in order in data file 81.

The tables "ACCOUNT" and "DEPOSIT" are likewise arranged in two separate B-trees tree indexing files, respectively.

The B-tree indexing file of FIG. 4 exhibits one of the significant shortcomings of this approach in that the keys (i.e. search keys) are duplicated, i.e. they are held both in the internal blocks (i.e. in the index scheme) and in the data records associated with the B-tree index. Thus, for example, the search key of data record 57 (in FIG. 3) is not only held as an integral part of the data record 86 in file 81 but also in block 80b (search key 86a) and sometimes in parent blocks such as 80a (search key 82).

This being the case, one readily notices that for large files (which is the case in many real-life scenarios) the duplication of the search keys (and particularly for long keys) results in inflated index which necessitate a large storage volume, which also adversely affects the performance.

Figure 5:
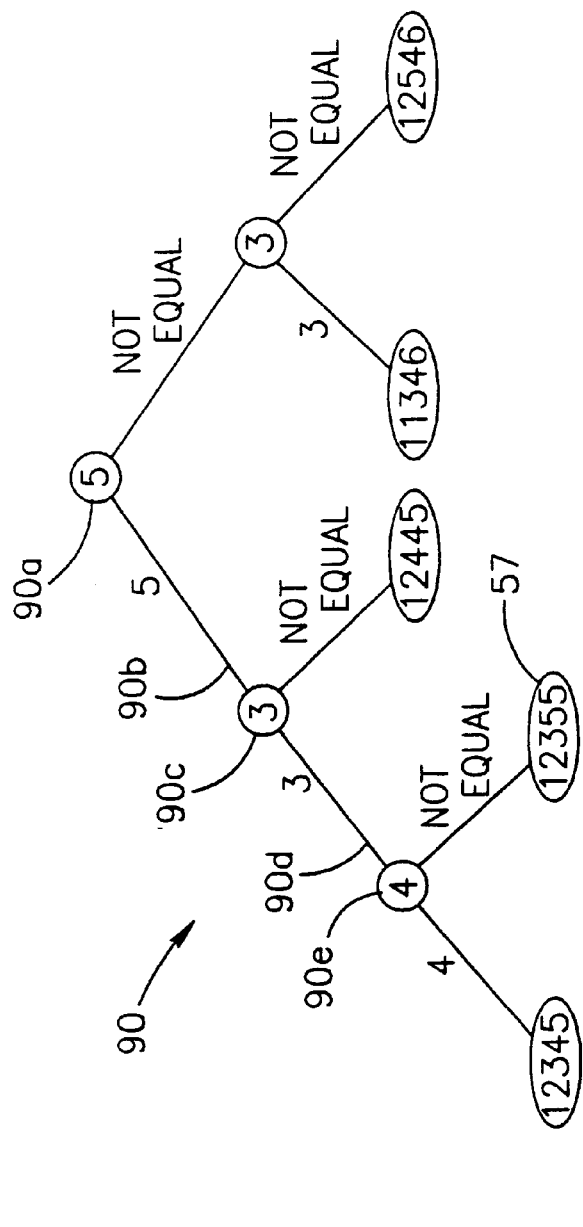
FIG. 5 shows the "CLIENT" table of FIG. 3, in accordance with file management system employing conventional trie index scheme.

FIG. 5 illustrates a different indexing scheme of the "CLIENT" table of FIG. 3, in accordance with a file management system employing a known trie indexing scheme. Thus, trie indexing file 90 includes plurality of nodes and links wherein each node stands for an offset position and the link stands for a value at this offset. Table 91 has four columns. The first column indicates which digit position is to be used, the second column the value of that digit. A digit value partitions the key into two subsets. Columns three and four direct the search procedure to the next step.

In order to locate a given search key, e.g. 12355, a digit at the position indicated by the root (position "5" indicated by node 90a, being also the first column in the first line of table 91) is compared to the value specified at the second column of the same line (value "5" indicated also by link 90b in the trie index). Since the digit at position 5 of the sought search key 12355 is indeed 5, control is transferred to line 2 (as indicated by the third column of line 1 of table 91). Next, the digit at position 3 of the sought search key (90c in the tree, being also the value of the first column of the second line in table 91) is compared to the value 3 (link 90d, being also the second column in the second line of the table 91). Since match occurs control is transferred to line 3 in the table. In this step the digit at position 4 of the sought search key does not match the value specified at the second column of line three (i.e. "5" vs. "4") and accordingly as indicated in the fourth column of table 91 ("not equal") a link to the sought data record 57 (86 in FIG. 4) is obtained.

The tables "ACCOUNT" and "DEPOSIT" are likewise arranged in two separate trie indexing files, respectively. In contrast to the B-tree indexing file of FIG. 4, the one shown FIG. 5 does not necessitate duplication of the search key. Put differently, only the offsets and the link values and not the entire keys are held in the trie (90). In this sense it constitutes an advantage over the B-technique.

However, and as specified, the above trie is associated with some shortcomings: it retains an even distribution of the data at the cost of knowing a priori the contents of the database and consequently partitioning the keys so as to obtain balanced structure. Knowing a priori the contents of the database is obviously undesired as it poses undue constraint since databases of the kind described in FIG. 2 are of a dynamic nature, e.g. for the specific database of FIG. 2, new clients open accounts, senior clients close accounts, new clients are registered as co-owners of existing accounts etc.

Another drawback of the above tree is that it does not support sequential processing. Navigating in the tree would result in accessing the data by the following order—83, 86, 87, 84, 85 (FIG. 4) and not by the order of the key.

Having shown a known trie index scheme (with reference to FIG. 5), there follows a description of various embodiments of an index of the invention which includes basic partitioned index and which cope with the drawbacks described above in connection with hitherto known techniques. Specifically there will be shown a preferred embodiment of the index in the form of layered index, and preferred embodiment of basic partitioned index in the form of trie. These examples are by no means binding.

Before turning to the explanation of the various embodiments there is described, with reference also to FIGS. 6A–C, a new trie index scheme designated PAIF. As will be shown below, the PAIF is not confined to a tree structure. On the basis of the PAIF, various embodiments of layered index are described, with reference to FIGS. 7–9, which include representative index constructed over the representative keys of the PAIF. By the embodiments of FIGS. 7 to 9, the index scheme of the representative index and that of the basic partitioned index being substantially the same PAIF.

Figure 10A:
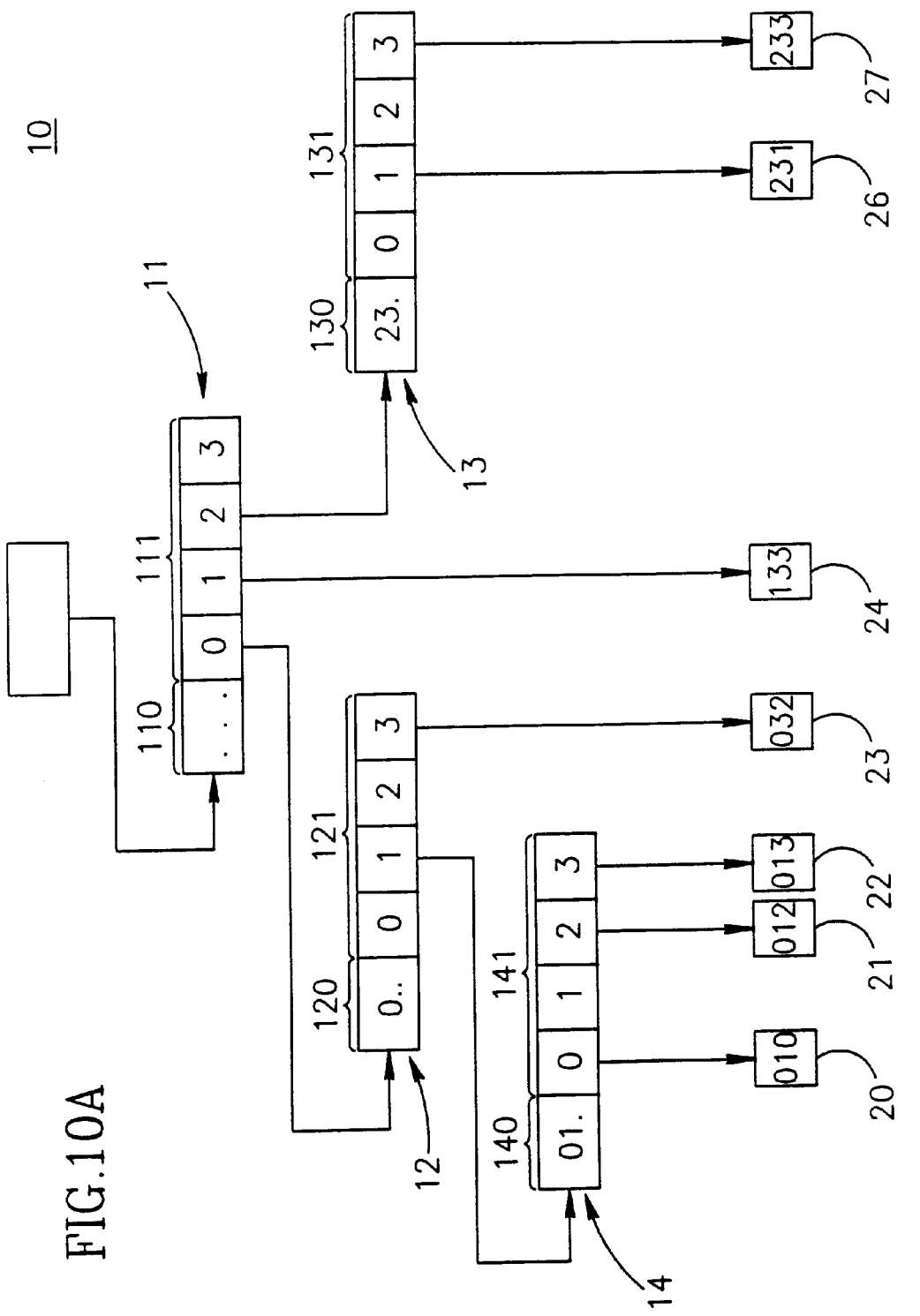
FIGS. 10A–B show schematic illustrations exemplifying construction of a layered index, according to another embodiment of the invention.

In FIG. 10 there is described yet another embodiment of the layered index, with a different trie. As will be shown, in the embodiment of FIG. 10, the representative index and the trie are also substantially the same. This, however, is not obligatory and as is exemplified, e.g. with reference to FIG. 11, where the trie and the representative index are different.

Turning now to FIGS. 6A–C, there is shown a succession of schematic illustration of the "CLIENT" table of FIG. 3, in accordance with the file management system employing the PAIF. The terms "transaction" and "operation" are used interchangeably.

In the description below the basic commands which enable data manipulation in the PAIF will be reviewed, i.e. insert new data record to a PAIF, find data record in PAIF, and delete existing data record. Those versed in the art will no doubt appreciate that on the basis of these basic primitives more compound data manipulation operations, (e.g. "Join") may be realized.

Turning at the onset to FIG. 6A, there is shown the Client's data record 103 (56 in table Client of FIG. 3) having search key "12345" (i.e. a 5-byte-long search key). The PAIF of FIG. 6A (100) is, of course, trivial and consists of a single node 101 (standing for both the root node and the leaf node) linked by means of a long link 102 to data record 103.

The node 100 represents an offset 0 in said search key and the link 102 represents a value "1" of the search key portion (being by this particular embodiment 1-byte-long) at the specified offset.

As clearly shown in FIG. 6A, the data record 103 is associated with a search path being a unit that consists of a node 101 and a link 102 which defines an offset and a pertinent search key portion value that conforms to the corresponding search key portion value at that particular offset within the search key of the specified data record. More specifically, the value of the one-byte search-key-portion at offset 0 within search key "12345" is indeed "1".

Turning now to FIG. 6B-1 there is shown a PAIF 108 after the termination of a successive transaction in which the data record having Client__Id__No "12445" 107 has been inserted (data occurrence 58 in table Client of FIG. 3). The search keys of data records 103 and 107 are distinguished only in the third byte (offset 2), i.e. "3" and "4" respectively.

The unit defined by root node 101 and the link 102 is not sufficient to distinguish between data records 103 and 107, since the value of the 1-byte search key portion at offset 0 for both data records is "1". Hence, node 104 indicates the lowest offset which distinguishes between the two records and links 105 and 106 indicate on the respective 1-byte search key portion "3" and "4" at offset 2. It should be noted that the realization of the PAIF is not bound by the specific examples illustrated in the drawings and various implementation thereof may apply, depending upon the particular application. Thus, for example, FIGS. 6B-2 and 6B-3 illustrate other two options of realizing the PAIF of FIG. 6B-1, where in FIG. 6B-2 the full key is represented in the PAIF (e.g. all the digits of the record 12445 are specified in the links commencing from the root node and ending at the data record). The latter realization is more explicit and less efficient in terms of space, as compared to the sparse realization of FIG. 6B-3 where only the nodes which are absolutely necessary appear in the tree. Other variants are, of course, applicable.

Before moving on to describe a procedure of inserting a new data record to an existing database it should be borne in mind that the higher the node in the trie PAIF the smaller is the offset indicated thereby (e.g. in the PAIF of FIG. 6B, node 101 is higher than mode 104 and accordingly it is assigned with smaller offset—"0" vs. "2").

Generally speaking, the preferred procedure for inserting a new data record into an existing PAIF includes the execution of the following steps:

i. advancing along a reference path commencing from the root node and ending at a data record associated to a leaf node (referred to as "reference data record"); in each node in the reference path, advancing along a link originated from said node if the value represented by the link equals the value of the 1-bit-long key portion at the offset specified by said node; in the case that the offset specified in the node is beyond any corresponding key portion in the key, or if there is no link with said value, advancing along an arbitrary path to any reference data record;

ii. comparing the search key of the reference data record to that of the new data record for determining the smallest offset of the search key portion that discerns the two (hereinafter discerning offset).

iii. proceed to one of the following steps (iii.0–iii.3) depending upon the value of the discerning offset:

iii.0 if the data records are equal then terminate; or iii.1 if the discerning offset matches the offset indicated by one of the nodes in the reference path, add another link originating from said one node and assign to said link the value of the search key portion at the discerning offset taken from the search key of the new data record; or iii.2 if the discerning offset is larger than that indicated by the leaf node that is linked, by means of a link, to the reference data record:

iii.2.1 disconnect the link from the reference data record (i.e. it remains temporarily "loose") and move the link to a new node; the new node is assigned with a value of the discerning offset;

iii.2.2 connect the reference data record and the new node (which now becomes a leaf node) and assign to the link (long link) a value of the search-key-portion at the discerning offset taken from the search key of the reference data record;

iii.2.3 connect by means of a link the new data record and the new node and assign to the link (long link) a value of the search-key-portion at the discerning offset taken from the search key of the new data record; or iii.3 if conditions iii.0, iii.1 and iii.2 are not met, there exists, in the reference search path, a father node and a child node thereof such that the discerning offset is, at the same time, larger than the offset assigned to the father node and smaller than the offset assigned to the child node —(—considered case A), or all the nodes in the reference search path have a value greater than the discerning offset—(—considered case B); accordingly, apply the following sub-steps:

iii.3.1 for case A and B, create a new node and assign the node with the value of said discrening offset, for case A only—disconnect the link from the father node to the child node and shift the link to a new internal node (i.e. the child node remains temporarily "loose"); iii.3.2 for case A and B, connect by means of a link (long link) the new data record and said new internal node; the value assigned to the link is that of the search-key-portion at the discerning offset, as taken from the search key of the new data record;

iii.3.3 for case A and B, connect by means of a new link the new node and for case A—the child node, for case B—the root node (i.e. the new node becomes for case A—a new father node, for case B—a new root node), and the value assigned to said link is the search-key-portion at the offset indicated by the new node, taken from the search key of the reference data record. UUH It should be noted that for a different reference path a different PAIF may be obtained.

For a better understanding, the aforementioned "insert data record" operation will be successively applied to the specific PAIF of FIG. 6B, each time with a different data record so as to exemplify the three distinct scenarios stipulated in steps iii.1–iii.3. above, thereby resulting in three PAIF illustrated in FIGS. 6C-1 to 6C-3, respectively.

In the first example the CLIENT data record having Client_Id (or search key) "12546" (59 in table Client of FIG. 3) is inserted to the PAIF of FIG. 6B. As stipulated in step (i), a move is made along the reference path commencing from the root 101 and ending, for example, at data record 103 which stands for the "reference data record". This being implemented by advancing from node 101 along link 102 (where in offset '0' of the inserted data record the value of the 1 long digit is '1') and thereafter since at offset '2' (as specified by node 104) none of the values of links 105 and 106 (4 and 3 respectively) matches the value of the inserted key at offset 2 ('5') advance is made at arbitrary path (by this particular embodiment through link 106) to the reference data record 103.

The comparison operation stipulated in step (ii) results in that the search key of the new data record in distinguished from the search key of the reference data record (103) at offsets 2 ("5" vs. "3") and 4 ("6" vs. "5"). The smallest offset ("discerning offset") is therefore 2.

Turning now to step (iii), the condition of step iii.1 is met since the discerning offset is equal to that assigned to node 104. Accordingly, and as is shown in FIG. 6C-1, new link 111 connects node 104 to the new data record 112. The value assigned to link 111 is 5, being the byte value at position 2 in the search key of the new data record 112. PAIF 110 of FIG. 6C-1 is therefore the result of inserting the data record 112 into the PAIF 108 of FIG. 6B-1.

Moving now to the second example, the CLIENT data record having Client_Id (or search key) "12355" (57 in table Client of FIG. 3) is inserted into the PAIF of FIG. 6B-1. Steps i and ii, stipulated above result in a reference path starting at node 101 and ending at data record 103.

Turning now to step (iii), the condition of step iii.2 is met since the discerning offset 3 is larger than the offset 2 of leaf node 104 in the reference search path. Accordingly, in compliance with step iii.2.1 and as is shown in the resulting PAIF 120 of FIG. 6C-2, the link 106 is disconnected from reference data record 103 and is connected to a new node 121. The new node is assigned with the discerning offset 3. Next, in compliance with step iii.2.2, the reference data record 103 and the new node 121 are connected by means of new link 122. The new link is assigned with the value 4 (being the digit value at the discerning offset 3 taken from the search key "12345" of the reference data record 103); and finally, as stipulated in step iii.2.3, the new data record 123 is connected to node 121 by means of link 124 which is assigned with the value 151 (being the digit at the discerning offset 3 taken from the search key "12355" of the new data record 123). PAIF 120 of FIG. 6C-2 is, therefore, the result of inserting the data record 123 into the PAIF 108 of FIG. 6B-1.

The third and last example concerns inserting the CLIENT data record having Client Id (or search key) "11346" (55 in table Client of FIG. 3) into the PAIF of FIG. 6B-1. Applying the aforementioned steps i and ii result in advancing from node 101 to data record 103 (in FIG. 6B) and establishing that the discerning offset is 1.

Thus in step iii, the condition of step iii.3 is met. Accordingly, in compliance with step iii.3.1 and as is shown in the resulting PAIF 130 of FIG. 6C-3, the link 102 is shifted to a new internal node 131. The new internal node 131 is assigned with the value 1 (being the discerning offset). As stipulated in step iii.3.2, the new data record 132 and node 131 are directly connected by means of new link 133. The value assigned to link 133 is 1 (being the digit at the discerning offset 1 taken from the search key "11346" of the new data record 132), and finally, in compliance with step iii.3.3 the new internal node 131 is linked to node 104 by means of link 134 assigned with the value 2 (being the digit at the discerning offset (1) taken from the search key "12345" of the reference data record 103).

Although the PAIF described above with reference to FIG. 6A-6C may be accommodated within one block it is nevertheless preferable to separate between "nodes" and "data records" such that data records are grouped in a distinct file or files. Applying this approach to the PAIF of FIG. 6C-3, results in the generation of the data record file holding the records 132, 103, 107. Links 133, 106 and 105 become, of course, long links.

Obviously, if an insert procedure results in finding that the data record to be inserted already exists in the PAIF an appropriate error message is returned to the procedure that invoked the Insert command.

It should be noted that in the latter examples it is assumed that the entire PAIF resides in a single block. Obviously when additional data records are inserted by following the foregoing "insert procedure" a block overflow may occur, which necessitates (as will be explained in greater detail below) invoking "split block" procedure, and thereafter it is needed to advance to the sought block and perform the insert procedure in the manner specified above.

Having described a typical "Insert" transaction, a "Find (or Retrieve) data record" transaction will be now described. Thus, for finding a data record by a given search key (hereinafter the sought data record) in an existing PAIF, the following steps should be executed:

i. advance along a search path commencing from the root node and ending at a data record linked to a leaf node, and for each node in the search path (hereinafter "current node") perform the following sub-steps:

i.1 for each link originated from the current node: compare the search-key-portion of the sought data record at the offset defined by the current node value to a value assigned to said link; in case of a match advance along said link and return to step i.1;

i.2. if none of the links originated from the current node matches the search-key-portion of the sought data record, return "NOT FOUND" and terminate the find procedure;

i.3 if a data record is reached (hereinafter "reference data record"), compare the search key of the sought data record as a whole, to the key of the reference data record;

i.3.1 in case, return "FOUND" (and in case of "Retrieve", return also the entire data record) and terminate the find procedure; or i.3.2 in the case of mismatch return "NOT FOUND" and terminate the find procedure.

For a better understanding the "find" procedure will be applied, twice, to the specific PAIF of FIG. 6C-3 giving rise to "found" and "not found", results respectively.

Thus, consider a find data record by search key "12445" (herein after sought data record). According to step i.1 the value of the digit "1" at the offset assigned to the root node (offset 0) of the sought data record is compared to the one assigned to link 102 (being the sole link originated from node 101). Since a match is found, control is shifted to node 131. Again according to step i.1 the value of the digit ("2") at the offset assigned to node 131 (offset 1) of the sought data record is compared to the one assigned to link 134. Here also a match is found so control is shifted to node 104. Next, according to step i.1, the value of the digit "4" at the offset assigned to node 104 (offset 2) of the sought data record is compared for each link originating from mode 104. The comparison results in a match for link 105 and accordingly control is shifted to data record 107.

According to step i.3 the search key of the sought data record and that of data record 107 are compared and since a match is found a "FOUND" result is returned (step i.3.1).

Turning now to a second example, consider the case when the sought data record has a search key "12463". The procedure described with reference to the previous example is repeated, however at step i.3 the comparison between the sought data record and data record 107 results in a mismatch, and according to step i.3.2 a "NOT FOUND" result is returned.

A general "Delete Data Record" transaction will now be described. Thus, as a first stage a "Find data record" transaction is applied to the PAIF. In case of "NO FOUND", an appropriate error message is returned to the procedure that invoked the "Delete" command. Alternatively, the sought data record is found. For clarity of explanation of the "Delete" procedure, the following nomenclatures are introduced:

The leaf node that is linked to the sought data record is referred to as the "target node". The father of the target node is referred to as the "predecessor target node". The link that connects the predecessor target node to the target node is referred to as the "predecessor link" and the link that connects the target node to a child node thereof (or to a data record other than the sought data record) is referred to as the "target link". Bearing this nomenclature in mind, the following steps are executed:

i. delete the sought data record and the link that links the target node thereto;

ii. if the number of links that remain in the target node is larger than or equal to 2, then the deletion procedure terminates;

iii. if, on the other hand, the number of links that remain in the target node is exactly one (i.e. one target link), then:

iii.1 "bypass" the target node by connecting the predecessor link from the predecessor node to said child node (or to a data record); and iii.2 delete the target node and the target link; terminating the deletion procedure.

It should be noted that the current step is more of "prudent memory management" step in order to release the space occupied by the target node and link, so as to enable allocation thereof to other nodes and links in the block. It should be further noted that said step (iii) is optional.

For a better understanding the foregoing "delete data record" procedure will be applied to the specific PAIF of FIG. 6C-3.

Thus, responsive to a command "delete record having search key="11346", the latter record is searched in the PAIF according to the procedure described above. Having found the data record 132 and in compliance with step i above, the data record as well as the link 133 leading thereto are both deleted. Since after the latter deleting step, the target node 131 remains only with the sole target link 134, step iii and iii.1 apply, and accordingly the predecessor link 102 bypasses target node 131 and is directly linked to the child node thereof 104. Next, in compliance with step ii.2, target node 131 and the target link 134 are deleted thereby obtaining the PAIF shown in FIG. 6B-1. Another Example is given with reference to the PAIF of FIG. 6C-1. Thus, responsive to a command "delete record having search key "12546", the latter record is searched in the PAIF according to the procedure described above. Having found the data record 112 and in compliance with step i above, the data record as well as the link (111) leading thereto are both deleted. Since, as stipulated in step ii, the number of links that remain in the target node 104 is two (i.e. links 105 and 106), then the deletion procedure terminates. The resulting PAIF is again the one shown in FIG. 6B-1.

Another common primitive is the "Modify existing data record", e.g. change the home address of an existing client. The "Modify" primitive is normally realized by selectively utilizing the aforementioned primitives. For executing a "Modify" command one should distinguish between the following cases:

1. The "modify" applies to fields other than the search key (e.g. modify the address of a client having Client_Id_No="xxxxx")—in this case the modify procedure simply involves a "Find" operation (data record having Client_Id_No="xxxxx"). Having found the sought data record, the old address is replaced by a new one.
2. The "modify" applies to a search key field (e.g. change an account no. from "xxxxxx" to "yyyyyy"). This command is realized as a sequence of two other primitives, i.e. delete data record having "Account_No"="xxxxxx" and thereafter insert data record having "Account_No"="yyyyyy", or vice versa. Obviously a Modify transaction may consist of both cases.

In the previous examples each search key is represented as a series of bytes and accordingly the search procedure is performed by partitioning the search-key into search key portions each consisting of at least one byte.

Those versed in the art will readily appreciate that bytes are not the only possible representation of a search key. Thus, for example, a search key can be represented in binary form, i.e. a series of 1's and 0's and accordingly the search procedure is performed by partitioning the search-key into search key portions each consisting of one bit (i.e. 1=1) or more, e.g. one byte (i.e. 1=8bits) and others. In certain scenarios, it may well be the case that the l value is not identical for all the nodes in the PAIF.

It should be further noted that different links in a given PAIF may be assigned with search-key-portions of different length as long as the respective search-key-portion is known the corresponding node.

As is clearly evident from the various PAIF of FIGS. 6A–6C, the data records are held in a sorted form according to search key. Navigating, for example, in the PAIF of FIG. 63-C (from right to left) brings about the ordered series "11346", "12345" and "12445". This characteristics constitutes yet another advantage which ease data manipulation as compared to the tree of FIG. 5 where the data records are not sorted. As specified before, a node in the PAIF is not necessarily classified uniquely. Thus, for example, in the PAIF 120 of FIG. 6C-2, node 104 is at the same time a leaf node (linked, by means of a long link 105 to data record 107) and an internal node (linked by means of a short link 106 to node 121).

Those versed in the art will readily understand that the "Insert", "Delete" "Find" and "Modify" procedures described herein are only one out of many possible variants for realizing these procedures and they may be modified, all as required and appropriate depending upon the particular implementation.

The specified insert, delete and find transactions apply to a so called intra-block transaction. As will be explained in greater detail below, applying the latter transactions in inter-block context necessitates to address few scenarios which are irrelevant in the intra-block operation.

Having explained the structure of the PAIF trie, there follows a description of various embodiments according to the invention, where there is shown a layered index based on a PAIF index scheme that includes a PAIF tree (as basic partitioned index).

Turning now to FIGS. 7A–H, there are shown schematic illustrations of a layered index constructed in response to a succession of split block operations, according to one embodiment of the invention. Consider for example a block 140 in FIG. 7A (in the basic partitioned index) which overflows in terms of memory space. This being the case a "split block" procedure is invoked which results in a layered index 142 of FIG. 7B consisting of root block 144 and a duplicated node A' (155) linked to leaf block 146 by means of direct link 145 and by means of long link 147 to a leaf block 148.

By this specific example, the split point was selected to be link 149 (FIG. 7A) (hereinafter "split link") thereby shifting nodes A,B,E D and F to new block 146 and nodes C,G,I,J, K,L and H to a new block 148. The split link is preferably selected in order to accomplish an essentially even distribution of nodes and links between the new blocks (e.g. the size of the sub PAIFs that resides in blocks 148 and 146 is essentially the same). In the case that a father block does not exist, a father block –144 (constituting $I_1$) is created with a duplicated node A' (155) of the split node A (156). In the case that a duplicated node of split node from which the split link is originated does not already reside in the father block 144, the node is copied to the latter block (marked A') and the connection between A' (155) node and the block in which A resides (146) is implemented by means of said direct link 145. The split link 149 (being originally a short link between A and C) is replaced by long link 147 between A' and the block in which C resides. Optionally nodes A and C (156, 153 respectively), may also be linked by means of split link marked as dashed line 150.

Figure 7B:
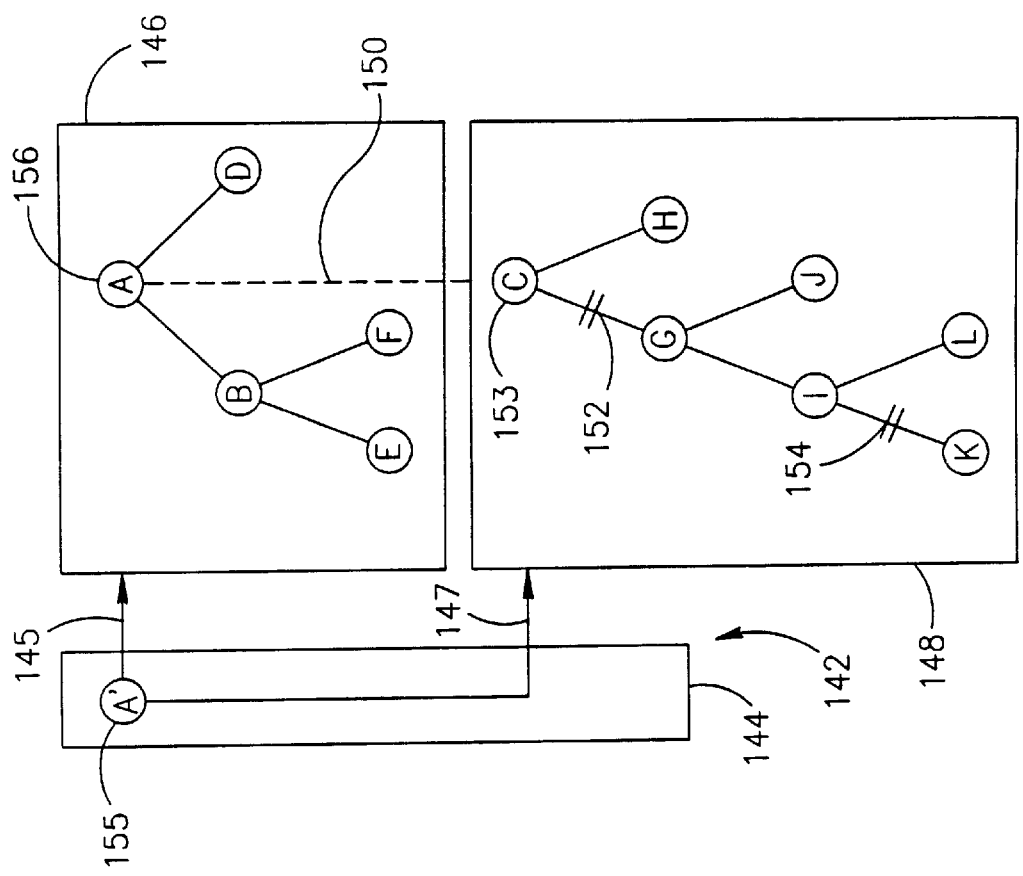
FIGS. 7A–7H show schematic illustrations exemplifying construction of a layered index, according to one embodiment of the invention.
Figure 7A:
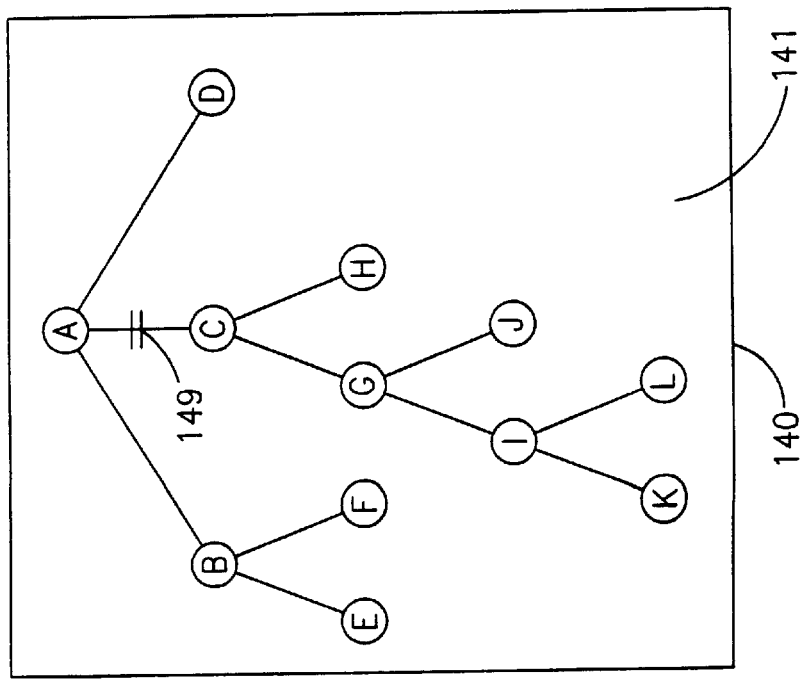

The net effect is that in FIG. 7B there is provided a layered index constituted by blocks 144, and the blocks of the trie are 146 and 148. Those versed in the art will readily appreciate that it is now possible to access or update data records not through the trie (i.e. commencing from node A 156 ), but rather through the layered index (i.e. commencing from node A' 155). In this connection it should be noted that link 147 has the same value as link 150, which in turn has the value of original link 149 of FIG. 7A.

Figure 7C:
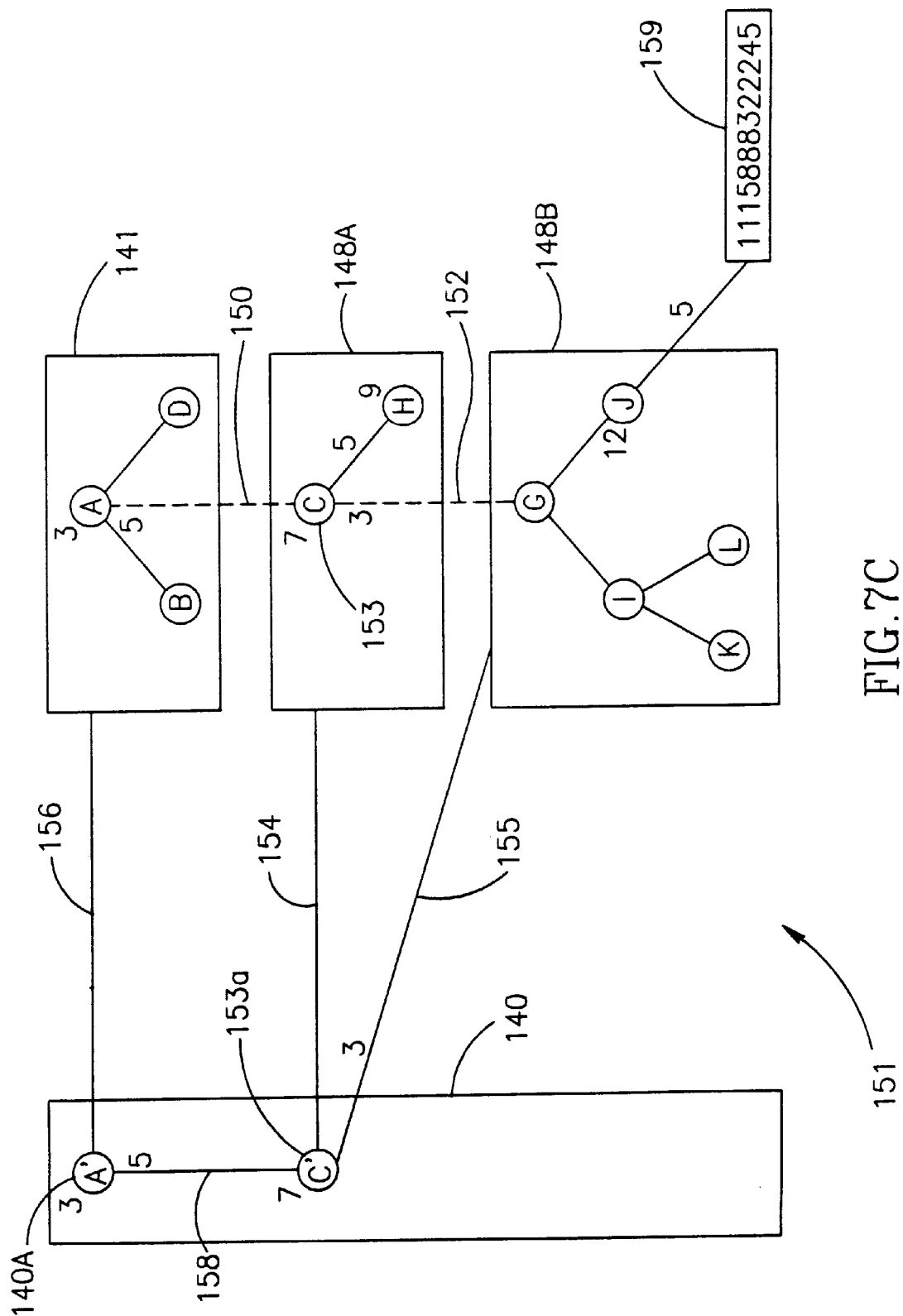
Figure 7D:
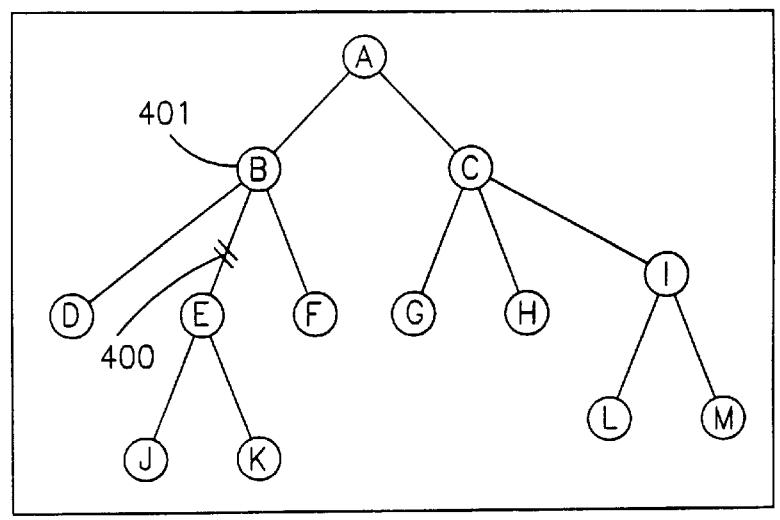

Considering now that block 148 overflows it undergoes similar block split procedure resulting in layered index 151 in FIG. 7C. By this example the split link is short link 152 of FIG. 7B and accordingly nodes C and H reside in block 148A of FIG. 7C whereas nodes G,I,K,L and J reside in block 148B. The node from which the split link originates (node C –153 of FIG. 7B) is duplicated (yielding a duplicated node 153a of FIG. 7C) and placed in block 140 marked C'. As before, direct link 154 connects the copied node C' 153a to the block 148A of the original split node 153 whilst the link 155 is a far link to the split block 148B and the value of the link is as the original value of link 152 between nodes C and G before (and after) the split.

In FIG. 7C, the layered index 151 is constituted by the trie that includes blocks 141, 148A and 148B forming $I_0$ and block 16 which forms a representative index over the common keys of the trie.

It should be noted that in FIG. 7C node A in block 141 and node C in block 148A are optionally disconnected and likewise node C of 148A and node G of 148B are optionally disconnected. As is clearly shown, nodes A' and C' are connected in block 140 to form a (connected) trie and it is accordingly possible to access blocks 141 through node A' and direct link 156; block 148A through node A', C' and direct link 154; and block 148B through nodes A', C' and direct link 155. It is noteworthy that the value of the link between nodes A' and C' (in block 140) is identical to the original value between nodes A and C (see link 149 in FIG. 7A).

As is clearly seen in FIG. 7C, the resulting layered index constitutes a balanced structure of blocks thereby keeping the index depth to a minimum and consequently minimizing the number of accesses (normally, although not necessarily, I/O operations) that are required in order to find, insert or delete a given data record. Considering now that in order to access data record the layered index maintains substantially logarithmic function that depends on the number of records, the layered index is more efficient in terms of number of I/O operations required for access a given data record as compared to the number of I/O operations required to access a data record through the trie. Thus, for example, for accessing data record that is associated with node J through the layered index, it is required at first to access block 140 and thereafter block 148B and thereafter the sought data record (i.e. three I/O operations). In contrast, accessing the same data record through the trie brings about 4 I/O accesses, namely block 141, block 148A block 148B and data record 159. As shown there are few particular instances that the trie is more efficient (e.g. accessing data record associated with node A), however, the larger the trie (i.e. constituted by more blocks) the more efficient is the access through the index of the layered index.

By the particular embodiment of FIG. 7, the representative index and the trie (being one embodiment of basic partitioned index) comply with substantially the same index scheme i.e. the PAIF. By "substantially" the same scheme it is meant that there are some differences as will explained with reference to FIG. 9G below.

Figure 7E:
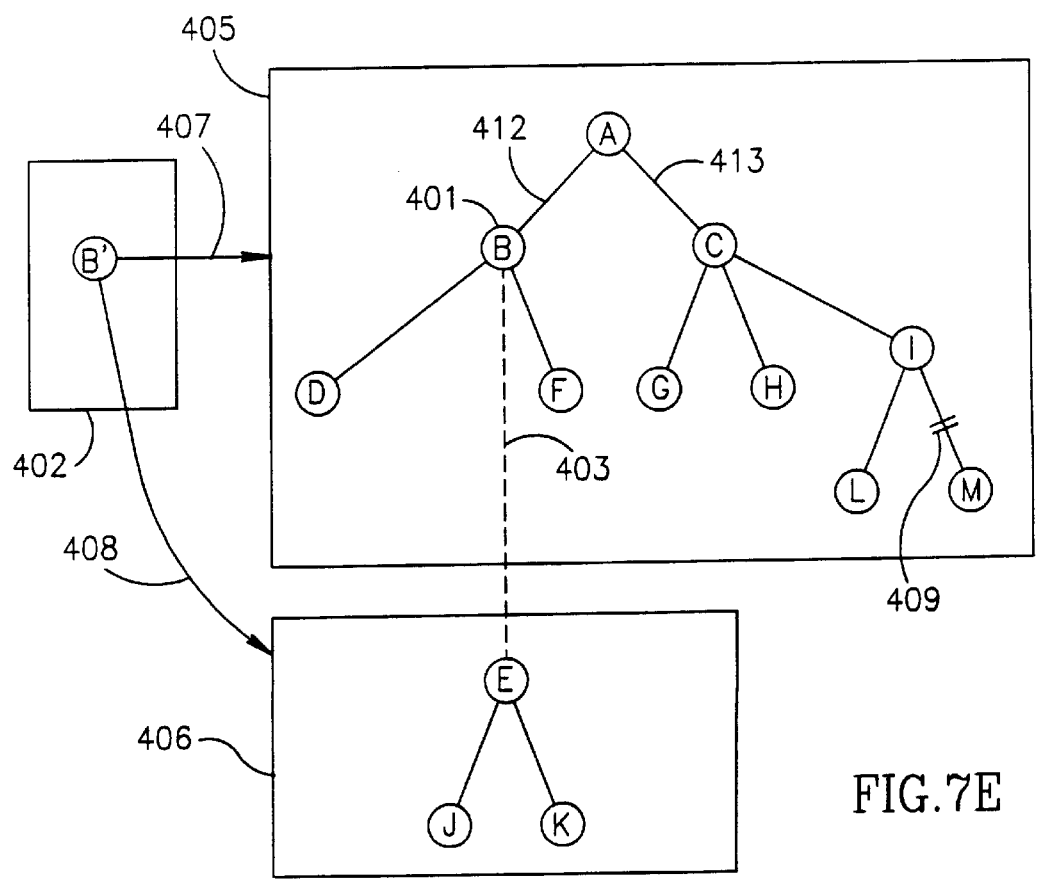

The considerations in connection with duplicating nodes to higher layers $I_j$ in the layered index are further illustrated with reference to additional examples depicted in FIGS. 7D to 7H. Thus, Consider the layered index of FIG. 7D where block split is performed in link 400. The resulting layered index is illustrated in FIG. 7E, where block 402 is created node 401 is copies to higher level block 402 (forming part of the layered index scheme) and the original link between nodes B and E is optionally retained (through dashed link 403). Through node B it is now possible to access the two blocks of the trie (405 and 406), by means of links 407 and 408, respectively.

Figure 7F:
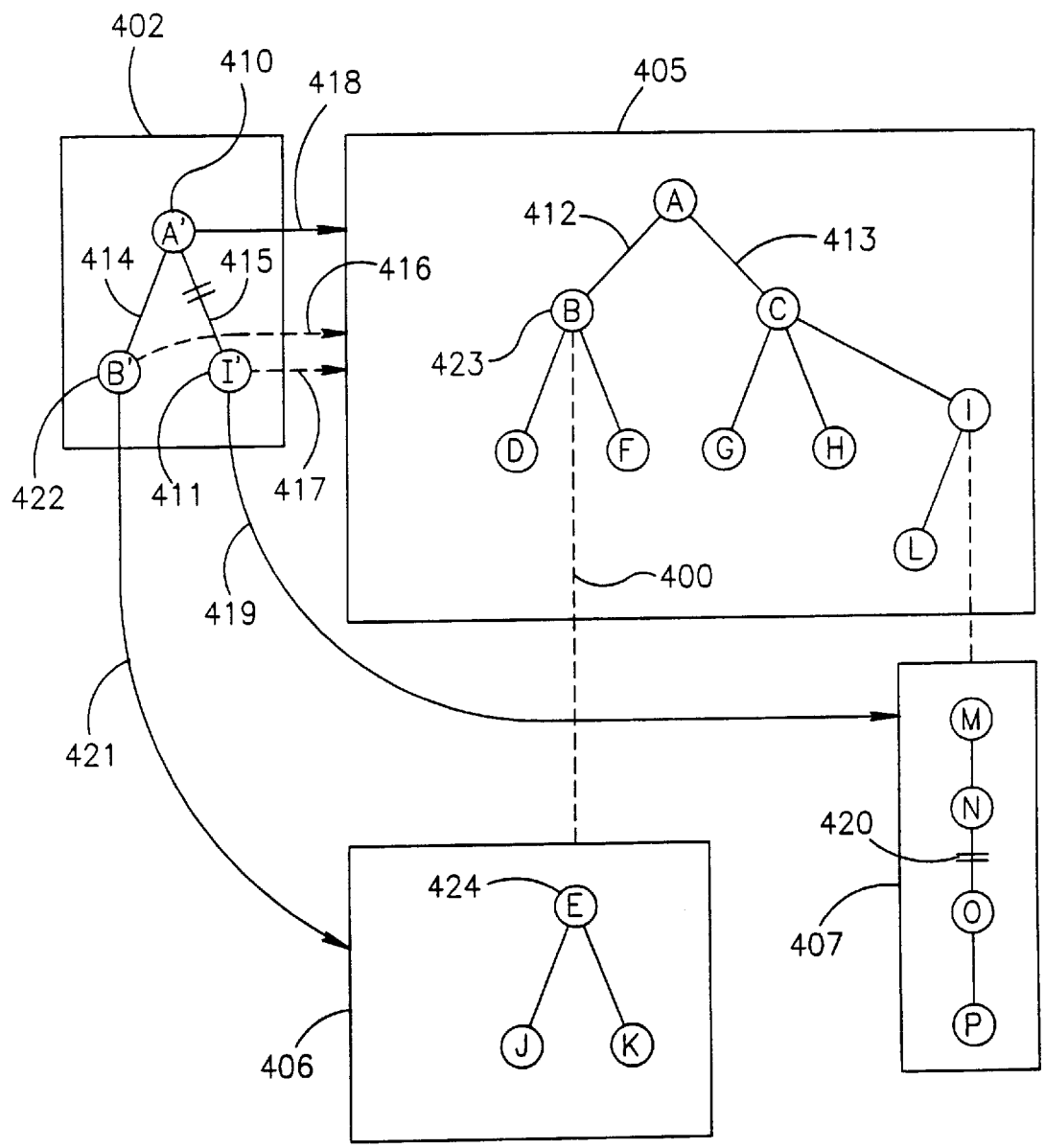

Next, should it now be required to split block 405 at, say link 409, the resulting structure appears now in block 402 of FIG. 7F, where nodes A and I of block 405 are duplicated to A' and I' (410 and 411) in block 402. Node I' is obviously a duplicated node of the split node I in block 405. However, node A is also copied considering that both nodes B (whose counterpart B' is a priori residing in block 402) and I (whose I' is now duplicated to block 402) are descendent nodes of A. Node A being the lowest ancestor node of nodes B and I, and thus a (connected) trie is formed in block 402. The value associated with short link 414 (between blocks A' and B' in block 402) is of the same value as link 412 (between A and B in block 405). The value of the link 415 (between nodes A' and I') in block 402 is of the same value as that of link 413 which originates from node A in the direction needed to access node B. The internal structure of block 402 is such that it allows a search to the representatives of blocks 405, 406 and 407.

The direct links 416, 417 of nodes 422 and 411 are optionally retained since it is possible to move along direct link 418 to block 405, seeing that node 410 is maintained in the access path to both nodes 422 and 411.

Figure 7G:
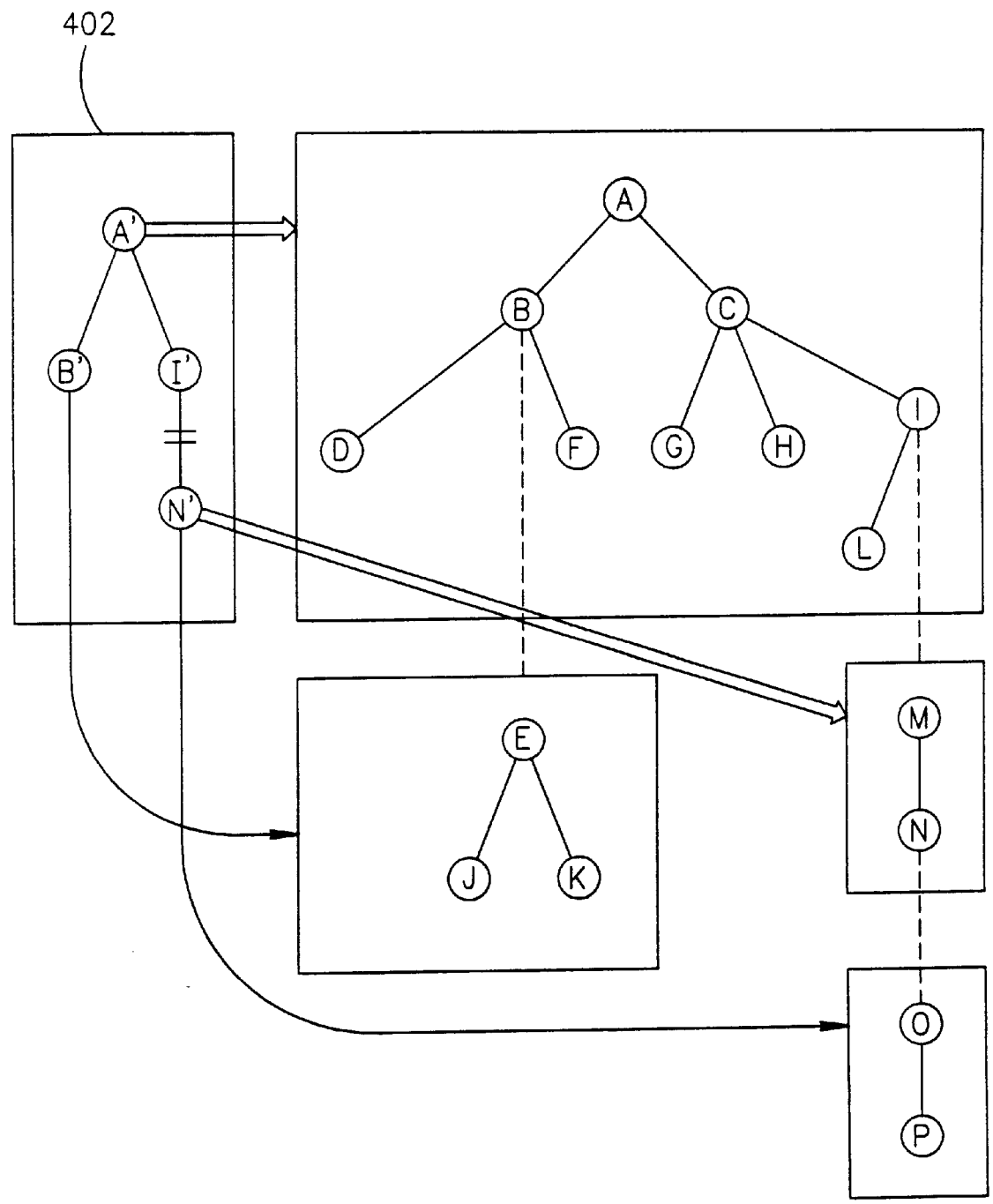
Figure 7H:
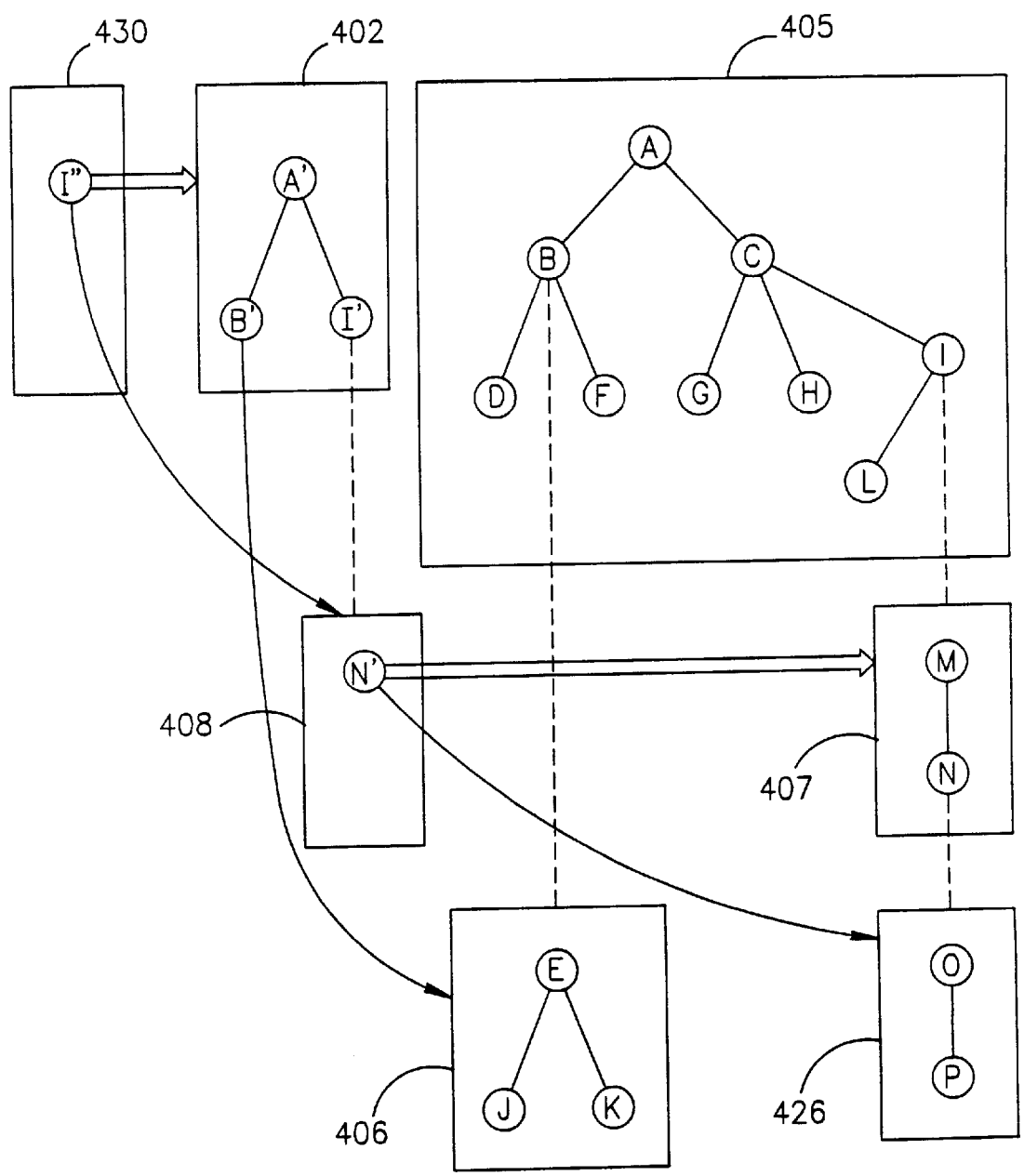

FIG. 7G shows the resulting layered index after splitting block 407 of FIG. 7F (in link 420) and FIG. 7H shows the resulting layered index after splitting block 402 (in the link between nodes I' and N'). The resulting layered index in FIG. 7H has, as shown three layers, the first consisting of block 430, the second consisting of blocks 402 and 408 and the trie consisting of blocks 405, 407, 426 and 406.

Those versed in the art will readily appreciate that the manner of realizing split block is, of course not limited to the examples of FIGS. 7D to 7H.

Having described an embodiment of constructing a layered index by split processes resulting from the succession of insert transaction (with reference to FIG. 7), it will be appreciated that the opposite procedure, i.e. "Delete block" is activated when a data record is deleted leaving only one node in a block having no data records associated therewith.

Those versed in the art will readily understand that the layered index described with reference to FIG. 7 is only one out of many possible variants for realize the layered index, where the representative index and the basic partitioned index being substantially the same.

The utilization of a PAIF in the manner specified constitutes an advantage over some of the hitherto known tries in the sense that the so accomplished layered index has a balanced structure of blocks despite the fact that the trie per se may possibly be unbalanced.

Figure 8A:
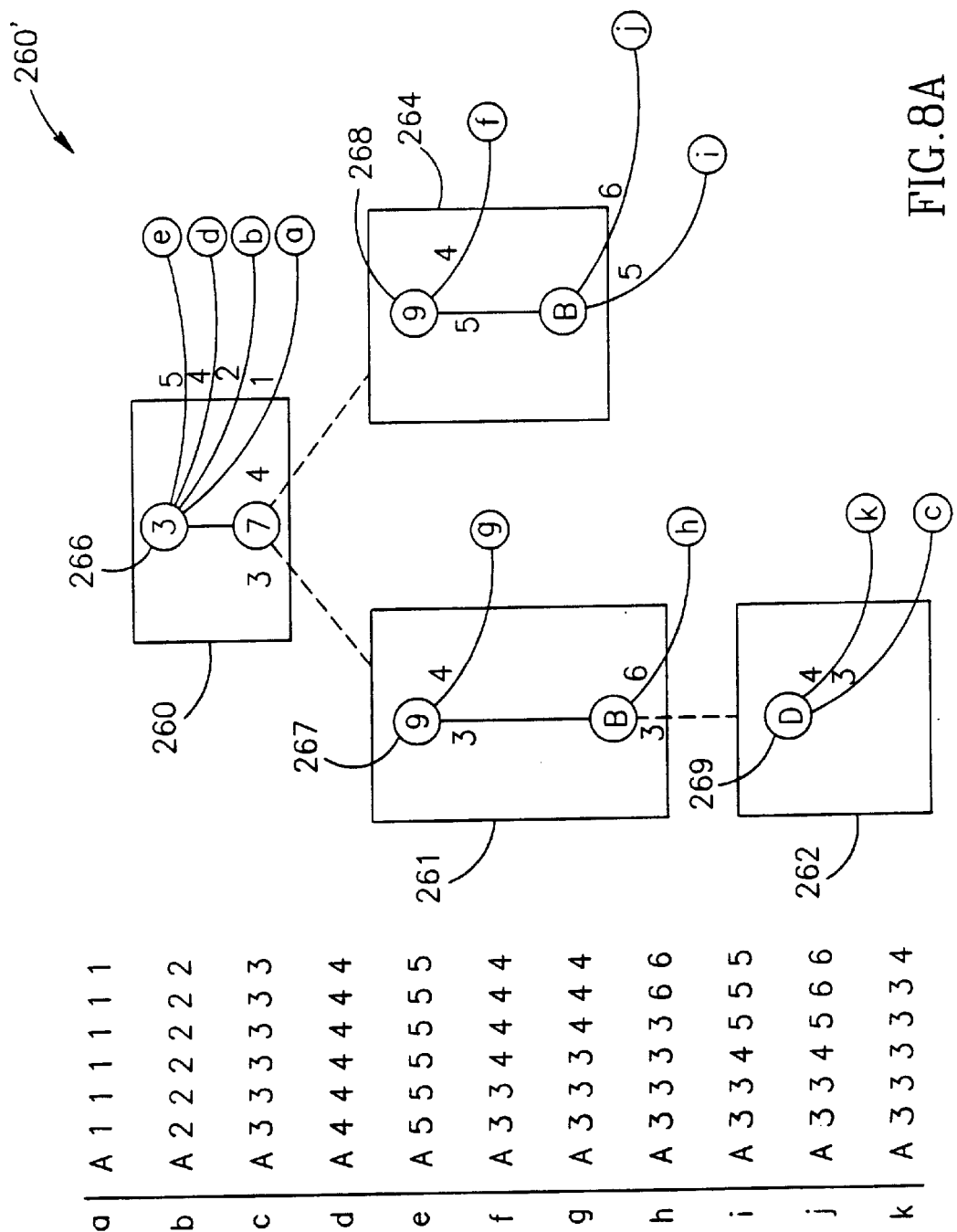
FIGS. 8A–B show schematic illustrations exemplifying construction of a layered index, according to yet another embodiment of the invention.

Attention is now directed to FIGS. 8A–BB showing respective two illustrations exemplifying the application of the technique of the invention to a according to another embodiment of the invention.

Thus, FIG. 8A illustrates a given trie structure having vertical orientation (i.e. constituting a vertical tree) which, as shown, is unbalanced i.e. three blocks depth (260, 261 and 262) vs. two blocks depth (260 and 264). The description below does not aim at explaining the search scheme of the specified vertical tree but emphasizes only those aspects which are required to obtain balanced layered index. It should nevertheless be noted that the nodes in trie structure 260, signify offsets in a half byte size. (The nodes values are presented in hexadecimal representation) of the data records (a–k) that are shown in FIG. 8A.

It should be noted that an extra I/O operation, i.e. accessing three blocks—(or three I/O operations) in order to access data record k as compared to one block (or one I/O operation) to access data record b as depicted in FIG. 8A, may be regarded as balanced. In some real-life scenarios this does not necessarily require applying the technique of the invention in order to bring about exactly the same number of I/O operations. Of course, further insertions of data records may generate higher "unbalance" degree, which, if not handled by the technique of the invention, will give rise to degraded performance (due to the unbalanced structure) as discussed in detail above (with reference to prior art techniques).

Figure 8B:
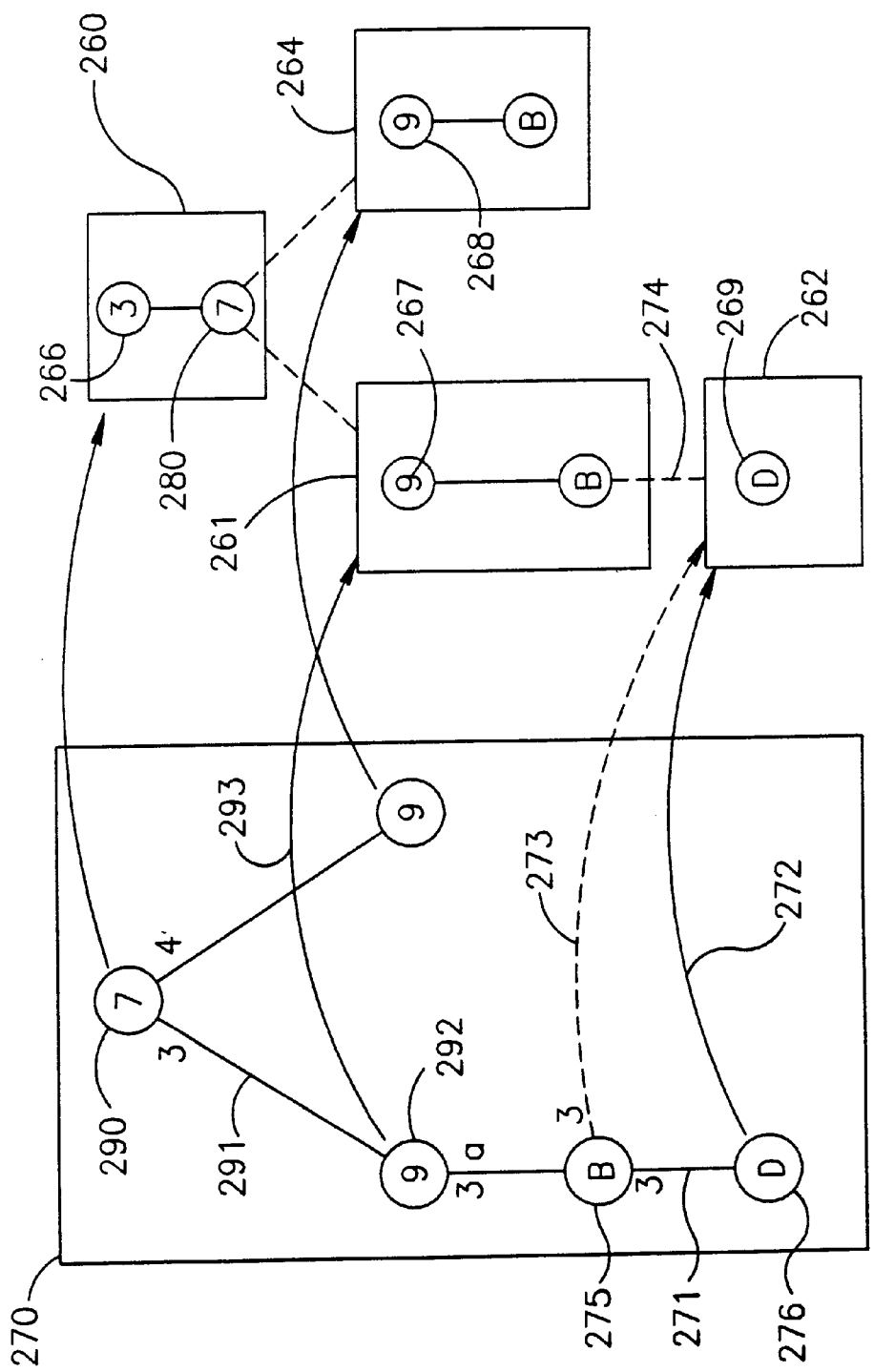

FIG. 8B illustrates one possible embodiment of the invention. As shown, a representative index that consists of one block 270 (forming $I_1$) is constructed with the result that horizontal balanced tree is obtained having a root block 270 from which all the blocks of the lower level vertical tree (the latter constitutes the unbalanced trie) are accessed through one I/O operation.

As shown, the actual access to the blocks in the first vertical tree (being the trie) are achieved by means of the common key value of each block. Before proceeding any further the term common key will be exemplified with reference to FIG. 8.

The common key of block 260 (in hexadecimal representation of half byte units) is 0×4, 0×1 and 0×3, where 0×4 stands for the most significant bits of the byte of the character A and 0×1 stands for the least significant bits of the Character A, and 0×3 stands for the most significant bits of the characters which reside in offset 2 of the data records.

It should be noted that all data records that can be accessed through block 266 share the common key prefix specified above. In the same manner, the following table summarizes the common key of each block:

| BLOCK NO. | COMMON KEY |
|---|---|
| 260 | 0×4, 0×1, 0×3 |
| 261 | 0×4, 0×1, 0×3, 0×3, 0×3, 0×3, 0×3, 0×3, 0×3 |
| 269 | 0×4, 0×1, 0×3, 0×3, 0×3, 0×3, 0×3, 0×3, 0×3, 0×3, 0×3, 0×3 0×3 |
| 264 | 0×4, 0×1, 0×3, 0×3, 0×3, 0×3, 0×3, 0×4, 0×3 |

It should be noted that block 261 can accommodate a root node with value 8, thus, the common key, hereafter k of the block, is changed to be 0×4, 0×1, 0×3, 0×3, 0×3, 0×3, 0×3, 0×3, i.e. it consists of 8 units. In this case, the representative of block 261 in $I_1$ should be changed accordingly. In a different implementation, the representative of 261 is k, even if the root node with the value 8 does not exist.

The index over the common keys is accomplished in the representative index (consisting of block 270) such that it constructs a trie that addresses the common keys of the first vertical tree. Now, for example, in order to find data record g, one follows node 290, link 291 to node 292. Then, one advances with the direct link 293 to block 261, which is associated with data record g. The resulting layered index is balanced.

As specified above, for the specific case of trie, the representative key of a block being a common key. Generally speaking, the common key of a block is the longest prefix of all keys of the data records that can be accessed from the block by the relevant index scheme. For the PAIF, the specified prefix size (calculated in 1-bit-long units) equals the value of the root node in the block (which as recalled holds offset value). If the prefix size is expressed as number of bits, then the prefix size is calculated as the offset value multiplied by the 1-bit-long value.

There follows now a description of yet another embodiment of constructing a layered index of the invention with reference to FIGS. 9A–9G.

Accordingly, attention is now directed to FIGS. 9A–9G showing a succession of modify (insert) transaction on a PAIF tree (constituting a trie that is susceptible to an unbalanced structure) and the so obtained layered index. For convenience of presentation, the data records are shown as forming part of the trie. As specified above, the actual manner in which the data records are associated to the trie may vary depending upon the particular application.

In the following figures, a layered index is constructed by inserting successively the following unsorted data records A–F (which for convenience of presentation form part of the blocks): The data string is presented as a series of bits where the 1-bit portion stands for 1:

A=001000011
B=110011100
C=011011111
D=011011011
E=101010101
F=111111111

In the first step (FIG. 9A), record A is inserted whereafter Block 300, includes node 301 having offset 0, being associated to first record A through link 302, having the value 0. At this stage, the tree consists of Block 100 having only one node. The index scheme dictates that the search path to data record A is determined according to value 0 at offset 0 as depicted on link 302 and node 301, respectively.

Thereafter (FIG. 9B), data record B is inserted, in which, as can be clearly seen and distinguished from data record A, in offset zero, the key value is 1 and, accordingly, link 302 leads to data record B and assigned with the value 1.

Thereafter (FIG. 9C), data record C is inserted, and the value thereof in offset 1, serves for distinguishing it from record A. Links 303 and 304 connect node 305 (standing for offset 1) to the specified data records C and A respectively. Since Block 300 accommodates nodes 301 and 305, it is not required, as yet, to split the block.

Figure 9A:
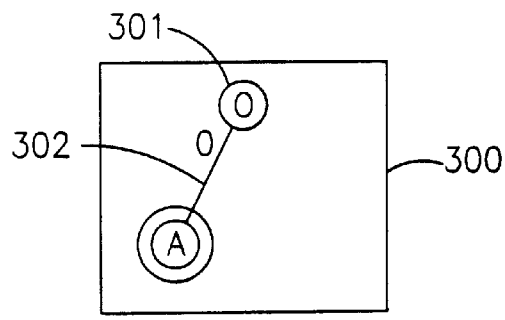
FIGS. 9A–G show schematic illustrations exemplifying construction of a layered index, according to yet another embodiment of the invention.
Figure 9B:
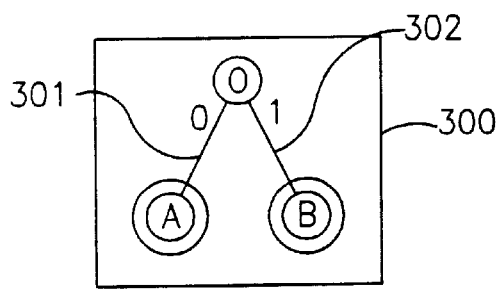
Figure 9C:
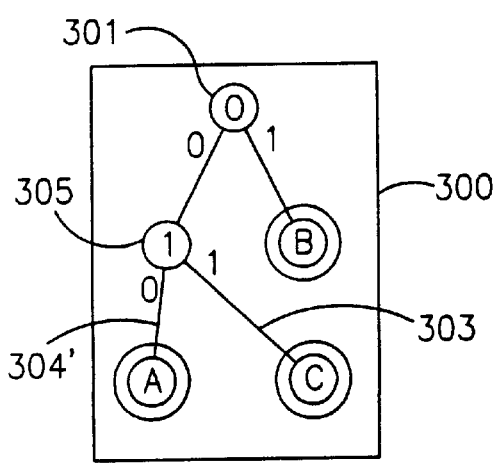
Figure 9D:
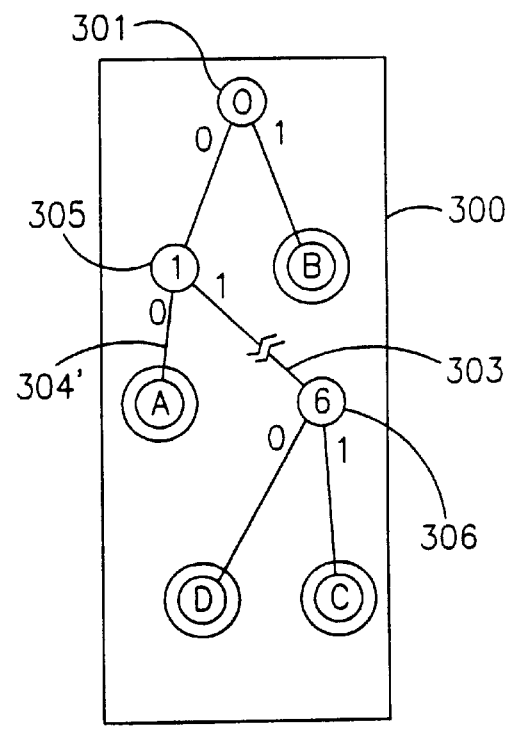
Figure 9E:
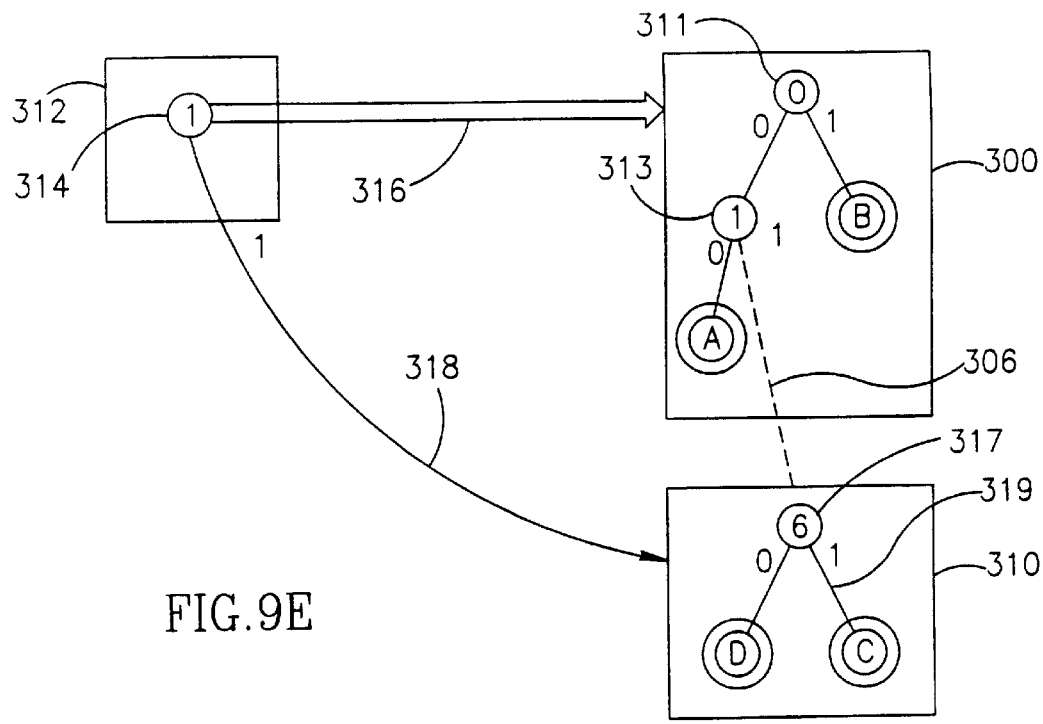
Figure 9F:
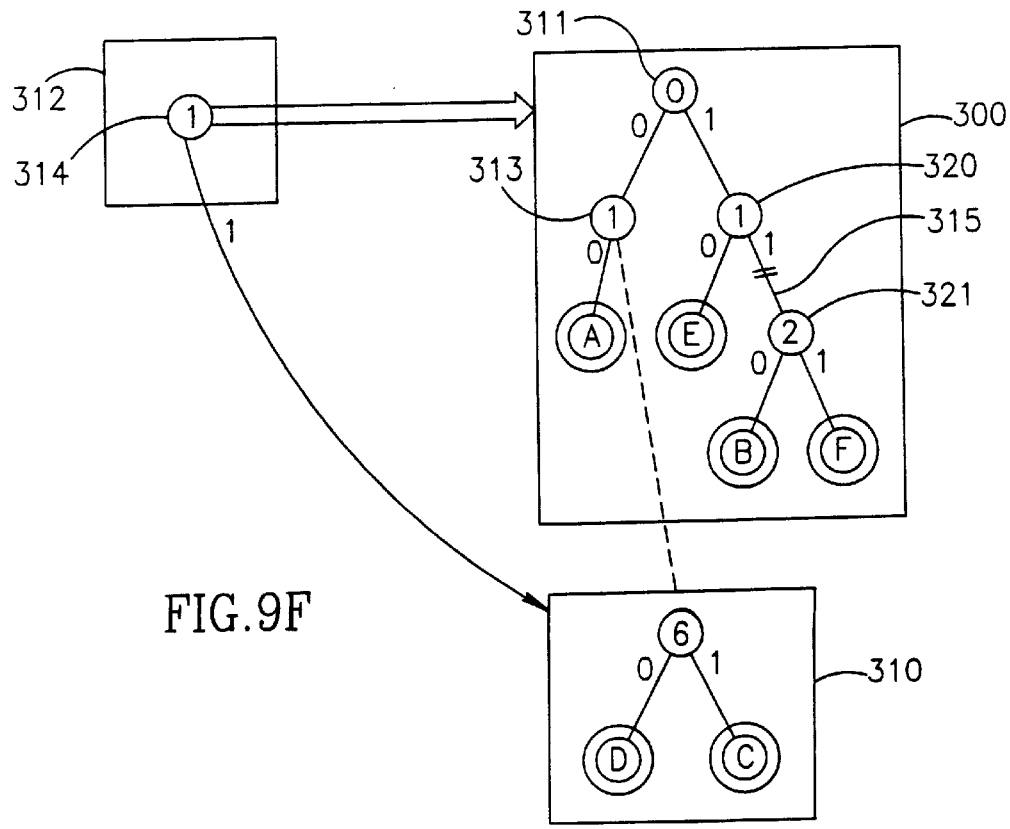

Next, data record D is inserted, and the structure of the block following the insert operation is shown in FIG. 9D. Since, however, the data block cannot accommodate more than two nodes (overflow occurs), it is now required to split Block 300. FIG. 9E illustrates the tree structure after splitting. Thus, link 306 is the split link with the motivation that approximately the contents of a half block will be retained in Block 300, and the contents of the remaining half block will be moved to another block 310. Of course, other links could be likewise selected to be the split link.

As a first stage, block 300 in $I_0$ is replaced with two blocks 300 and 310. The nodes 0,1 (designated as 311 and 313, respectively) and the data records A and B are retained in the splitting block 300, whereas node 6, data records D and C, (standing in this particular embodiment for the remaining nodes), are moved to block 310. Accordingly, the basic partitioned index of FIG. 9E consists now of two blocks 300 and 310 (which in fact constitute the unbalanced trie).

Thereafter, since the block of $B_1$ does not exist, it is created, and, accordingly, block 312 is provided. The split node (313) is copied to the block (312) to thereby constitute a duplicated node (314). Next, the duplicated node (314) is connected by means of direct link 316 to block 300, and the duplicated node 314 is linked by means of a far link 318, to the block 310. This far link replaces the original split link 306 that is marked in FIG. 9E in a dashed line. The value of the far link 318 is the same as the value of the split link. Thus, the representative index (constituted by block 312), allows to search according to the common keys of the basic partitioned index.

It should be noted that there are no constraints as to whether the split link should be deleted or retained. As shown, the so obtained horizontal tree that constitutes the layered index (consisting here on blocks 312, 300 and 310, of which 312 belongs to the representative index) is balanced. Next, data record E is inserted. In this case advancing in the horizontal tree (being one form of the layered index) from the first node 314 of block 312 (having a value 1) is not possible by means of the far link 318 since it represents direction 1 from node 314 (having a 1) value, and a link in direction 0 is required. Therefore advancing by means of the direct link 316 to block 300. Thus, the block that needs to be associated with the new data record is found. In the same way data record F is inserted resulting in a tree structure shown in FIG. 9F.

Next, if a split between node 320 and node 321 of block 300 is performed, node 320 is copied to block 312 (designated 323 in FIG. 9G) and since it can not be linked to node 314 of block 312 (since it will not retain the correct inta-block links of the nodes)—node 311 of block 300 is also copied to block 312 (designated 322 in FIG. 9G) in order to create a (connected) trie that enables to search by the search scheme to blocks 300, 326, 310 according to the common keys of the blocks.

Figure 9G:
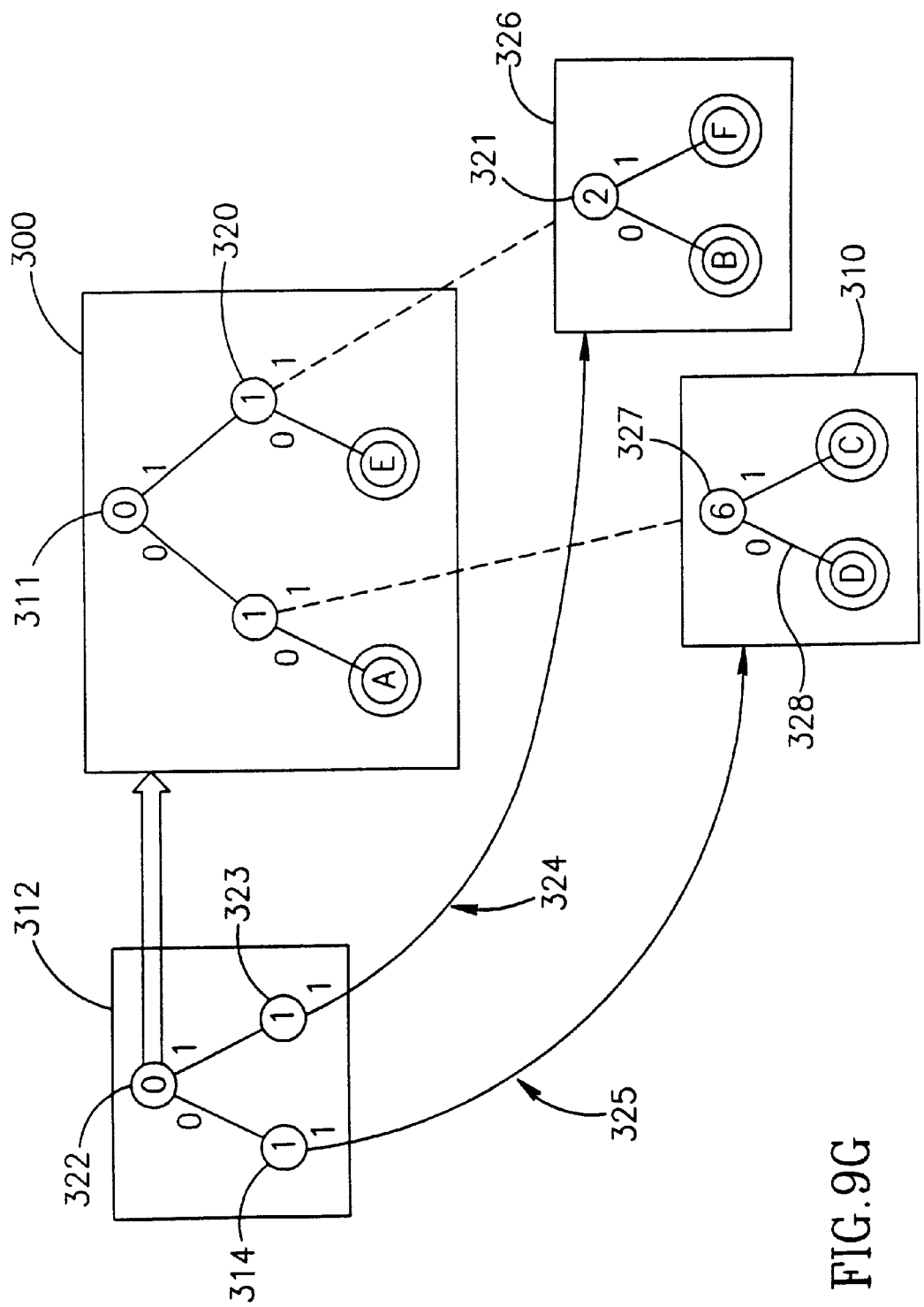

It should also be noted that instead of having direct links from all copied nodes 314,322,323 of block 312 in FIG. 9G, it would be sufficient to have one such direct link from the copied node (322) to block 300. A far link 324 from node 323 is set to block 126 in the direction of the link before the split (the direction of link 315 of FIG. 9F). Obviously, if another split is performed in block 326, it would be represented in block 312 by a node connected from node 323 by link in direction 1 having a direct link to the $B_{i-1}$, and a far link to block $B_{1-1}'$.

FIGS. 9A-G and 8A-B illustrate two of many possible manners of realizing the split block mechanism that maintains the balance structure of the invention by constructing a layered index. The flexibility in adopting another non-limiting variant is shown e.g. in FIG. 8B where the near link 271 and direct link 272 are represented by far link 273 (marked in dashed line) with direction as of link 271 rendering thus node 276 redundant.

Insofar as many embodiments are concerned, the balance technique of the invention confers to the so obtained balanced horizontal oriented digital tree (being one form of the layered index structure) a so called "probabilistic access" characteristics. This means that a search in connection with an input data record (e.g. search for a data record A), may lead to a different data record or to a node where there is no link to the direction prescribed by the index scheme and may require to apply "correction" in order to eventually access the sought data record.

For a better understanding of the foregoing consider, for example, FIG. 9E. Consider for example that a search transaction is applied to the layered index of FIG. 9E with the sought data record L=111011110. The search path will follow node 314 and link 318 (offset 1 value 1, respectively) and then at offset '6' (root node of block 310) through link 319 (value '1') to data record C. The latter example exemplifies the probabilistic search characteristics of the so obtained layered index.

In order to resolve the specified failure, the size of the common prefix of the key of the sought data record and the key of the data record is calculated. The common key of the block (310) is the prefix portion of the key of the actual data record C. Thus, the size of the common prefix is zero. Next, climb up the tree to the node in the access path that has a value equal to or less than the common prefix size that has a direct link. If the latter requirement is not met, i.e. all the nodes have a value greater than the calculated prefix size, then from the first node in the access path that has a direct link (which should point to the first block of the index $I_{i-1}$). Now, from the node 311 move by means of direct link 316 to the lower level vertical oriented tree (i.e. to layer $I_{i-1}$) and therefrom continue the search path as prescribed by the index scheme.

According to another scenario, should the index scheme prescribes to go in a given direction and there is no link in the desired direction, the search path follows the direct link from a node with the largest value on the search path (that maintains a direct link). When advancing from block to block, a comparison to the common key (if available) or to data records associated with nodes (if available) can lead to a decision as to whether or not to advance by the index scheme or to return to a node with a direct link. It should be noted that the common key is not necessarily physically attached to the data records.

Reverting to the previous example (sought data record L) and associated data record C of FIG. 9E, if the common key of block 310 (being 011011) is maintained in the block it is not needed to access data record C. Thus, since the common prefix of the key of L and the common key of the block is 0, one can return to node 314 and link 316 without accessing record C. Avoiding the need to access the data record in the manner specified has, of course, the advantage of improving performance. The criterion to know that the sought data record does not reside in the tree is that the size of the common key prefix of the sought data record and the common key of the block is greater than the value of the split node.

In the latter example, the value of the split node is 1 (of node 313), thus block 310 is not the block that accommodates record L (if such record exists). Therefore, the search for record L is continued from node 314 and link 316. This procedure applies to all modify transactions.

Insofar as insert transaction is concerned, block 300 is found in the manner specified above and is associated with the new data record L.

The latter example referred to a specific example of layered index. Those versed in the art will readily appreciate that the latter probabilistic access characteristics applies mutatis mutandis to other types of layered index that utilize a basic partitioned index.

The probabilistic search characteristics which leads to "errors" stems from the fact that not necessarily the complete common key of a block in layer $I_{h-1}$ is known from the values of the node that reside on the search path up to the block in $I_{h-1}$. Thus, it is necessary to know the common key of the block in $I_{h-1}$ in order to verify if the search path to the specified block matches the search path according to the key of the sought data record. If the common key is not maintained in the block, it might be needed to advance in the index to a data record in order to know the common key value.

The inherent error prone characteristics of the layered index and the manner of handling it has been exemplified with reference to FIG. 9 above, and may be described more generally as follows: to search a record by key k, the latter is searched in $I_h$ (and in some cases in $I_{h-1}$ to $I_1$ or to data record(s)) in order to find the block B of $I_{h-1}$ leading to k. This process is repeated until reaching the block of $I_0$ that is associated with the data record with key k (if one exists).

The description in FIGS. 7 to 9 exemplified a layered index utilizing a PAIF based indexing scheme as the basic partitioned index and the representative index. Those versed in the art will readily appreciate that the layered index of the invention is not bound only to PIAF. Thus, for example, U.S. Pat. No. 5,495,609 illustrates a different trie. Consider, for example, the trie of FIG. 10A in accordance with the specified '609 patent, and assuming that the trie consists of a block that accommodates nodes 11, 12, 13 and 14. Should it now be required to split the block subsequent to the insertion of new nodes to the tree, a possible approach of splitting the block in accordance with prior art techniques, would be, for example, to break the link between node 12 and 14, to thereby obtain two blocks, one accommodating nodes 11, 12 and 13, whereas the other accommodating node 14 (hereinafter new block). Assuming that the first block resides in the internal memory, if it is now required to reach record 26, only one I/O operation is required. If, on the other hand, record 20 is of interest, a first I/O operation is required, in order to access the new block (i.e. the one accommodating node 14), and therefrom another (i.e. second) I/O operation is required, in order to access record 20. It is accordingly appreciated that the split block gave rise to an unbalanced tree. Subsequent insert transactions may adversely affect the unbalanced characteristic of the tree, i.e. necessitate multiple I/O accesses which is obviously undesired.

Figure 10B:
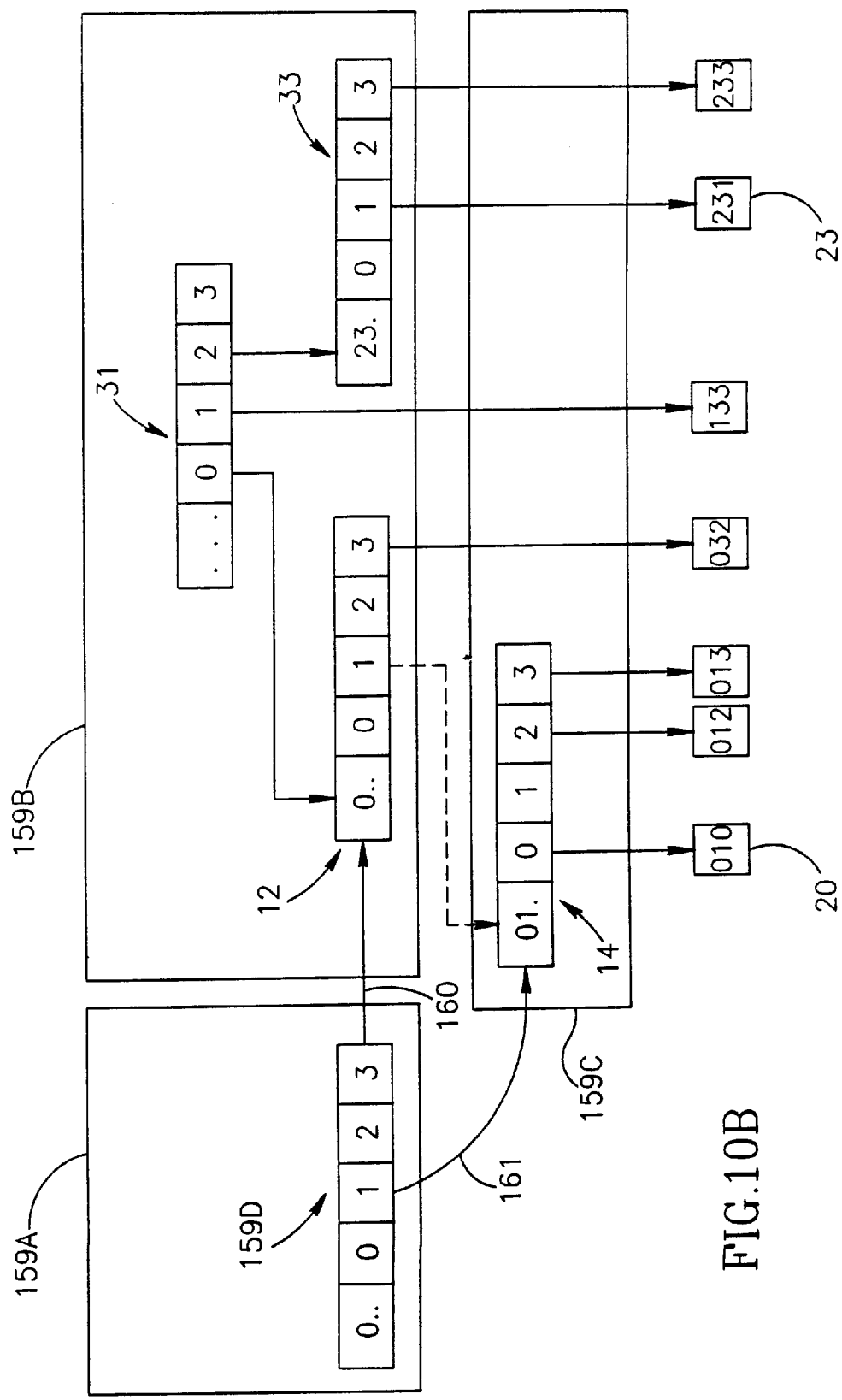

Applying the technique of the invention will cope with the shortcomings of an unbalanced tree, and the resulting layered index is illustrated in FIG. 10B, where the representative index is constituted by block 159A over the representative keys of the trie (constituted by blocks 159*b* and 159*c*). Here also, the link between node 12 and 14 is considered a split link, and the new node, 159D (being replication of node 12) is copied into a new block designated as 159A. Now, in order to access record 20 and record 26, the same number of I/O operations is required, and in this particular case, 2. As the size of the trie grows the more efficient is the access using the layered index.

The layered index of FIG. 10B brings about, thus, a balanced tree of blocks, assuring that essentially the same number of I/O operations is required to reach each and every data record in the tree. Those versed in the art will readily appreciate that preferably the number of I/O operations is a logarithmic function depending upon the number of data records and the number of links originated from a block. Thus, for example, if 1000 far links originate from a block, a layered index with 3 levels allows access to 1,000,000,000 data records.

For a better understanding of the foregoing, there follows numerical example. Assuming that every block has 1000 far links. Assuming that the size of each far link is 4 bytes it readily arises that the size needed for representing the far links is 4000 bytes. Assuming further that the nodes and the near links within a block occupy another 4000 bytes, the resulting block size is less than 10,000 bytes. For sake of discussion assuming that each block size is 20,000 bytes.

Considering now a layered index that consists of one block (e.g. block 144 in FIG. 7B) as index layer 1 and assuming that it is linked to a thousand blocks in the layer 1, (of which only two blocks 146 and 148 are shown in FIG. 7B), the layered index amounts for a total of 1001 blocks each having a size of 20,000 bytes. Accordingly, the total space that should be allocated for holding the blocks of the layered index is about 20 mega bytes. This order of size can be easily accommodated in the internal memory of say, for example, a personal computer. Assuming now that each block in $I_0$ is associated with one thousand data records, the net effect is that by utilizing a layered index of the invention (according to the latter embodiment) which is wholly accommodated in the internal memory, a million data records can be accessed without I/O index.

By the same token accessing billions of records may required practically one more index layer which may require an additional one I/O operation.

For a better understanding of the foregoing consider for example the implementation of the layered index in FIGS. 6B-1 or 6B-3 (PAIF index scheme). Had the keys of data records 103 and 107 been longer in size (for example 100 byte long), this would have not changed the size of the PAIF. Another non limiting example can be shown in FIG. 8B—the size and the structure of the layered index would not be changed if the size of the key of data records a–k addressed by the index would be 200 bytes long. As can be seen, it is also possible to navigate in the index and to retrieve the data a–k according to the order of the key. This exemplifies one form of sequential operation.

As shown, the resulting layered index of FIG. 10B includes two trees having vertical orientation i.e. the first tree structure consisting of blocks 159B and 159C (being one form of the basic partitioned index $I_0$) and second tree having one block 159A (being one form of the basic partitioned index $I_1$).

The so accomplished horizontal tree of blocks (being one form of the layered index) is balanced, i.e. root block 159A which, through one I/O enables to access all the links to the data records. Further insertions of data records which will lead to additional splits in the blocks of $I_0$, will require, of course, updating the layer index $I_1$. When the number of nodes in block 159A of $I_1$ exceeds a given number, block 159A is split according to the split mechanism.

The trie index with which the technique of the invention is of concern, is not confined to the search tree disclosed in the '609 patent, and it may encompass other types of trees as explained above.

It should be noted that the intra-block structure is not necessarily balanced, i.e. nodes inside block are not necessarily arranged in a balanced structure. Whilst this fact is seemingly a drawback, those versed in the art will readily appreciate that its implications on the overall database performance are virtually insignificant. This stems from the fact that intra-block search scheme is normally performed in the fast internal memory of the computer system. As opposed to the intra-block search scheme, the arrangement of a block within a layered index is retained in a balanced structure thereby the number of blocks in a search path is a logarithmic function depending on the number of data records and reflects therefore the number of I/O accesses to the external memory (an operation which is inherently slow) in order to load a desired block to the internal memory.

In this connection those versed in the art will readily appreciated that the present invention is by no means bound to a given physical realization. Thus, for example, insofar as search scheme is of concern whilst the intra-block retains the search scheme after applying the technique of the invention this applies to the logical concept of e.g. advancing in the layered index according to offsets and values of offset. The latter general concept may be realized in many manners all of which are encompasses by the technique of the invention. Thus, for example, the offset size (in terms of numbers of bits) that is accommodated within each node may be altered, the manner of realizing empty pointers (i.e. pointers that point to null—having no children) and others. The latter physical realization flexibility applies also to the inter-block portion.

The layered index described with reference to FIGS. 7 to 10 all, retain essentially the same index scheme for both the trie and the representative index scheme, (except for the error handling which may be encountered when accessing data records through the index, as explained in detail with reference to FIG. 10G above).

Figure 11:
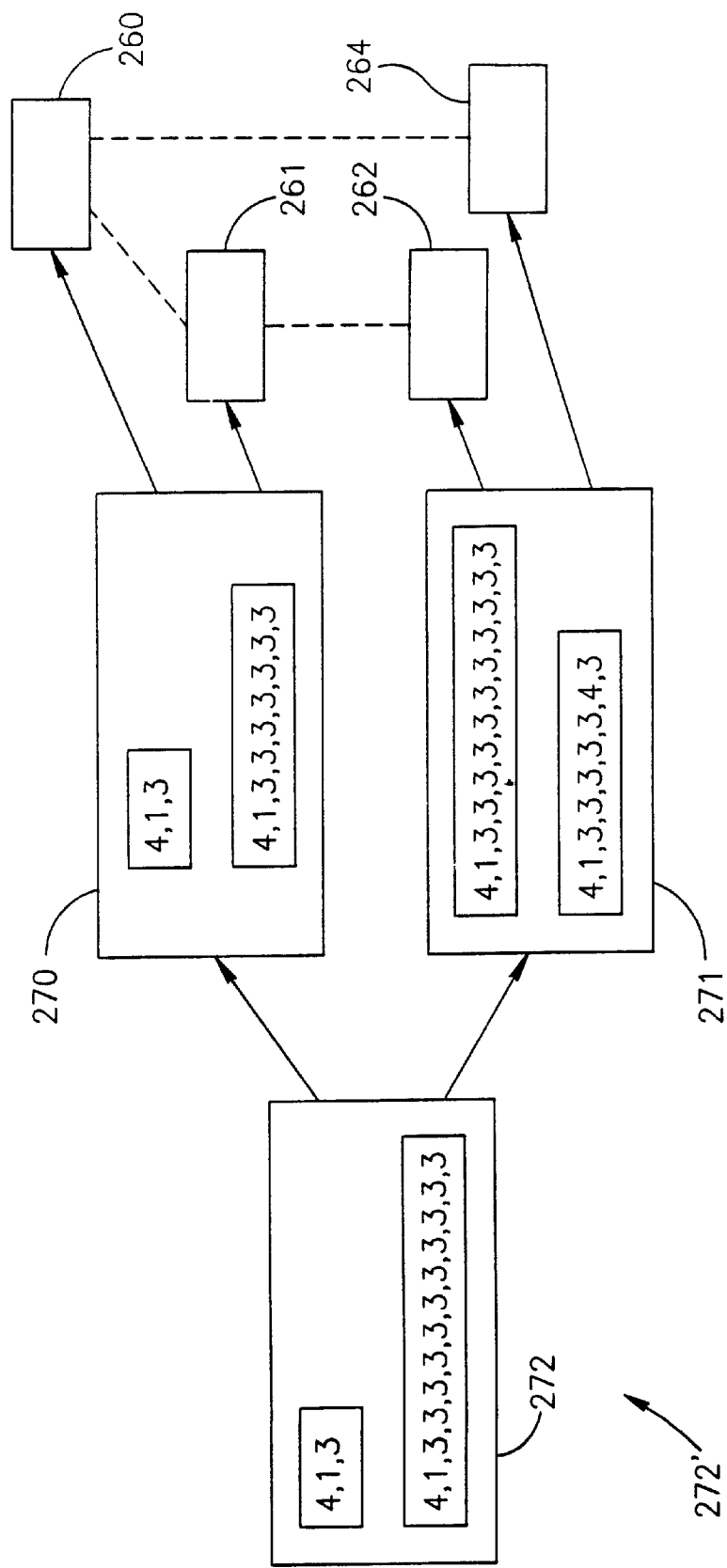
FIG. 11 shows a schematic illustration exemplifying construction of a layered index, according to still yet another embodiment of the invention.

The retention of the index scheme for both the trie and the representative index is not obligatory as will be exemplified with reference to FIG. 11.

FIG. 11 illustrates another approach of balancing an unbalanced tree of FIG. 8A (i.e. constructing a layered index) using a conventional B tree as a representative index over the representative keys of the unbalanced trie. The so obtained horizontal oriented balanced tree (layered index) includes blocks 272 at the upper level (index layer $I_2$), 270 and 271 at a lower level (index layer I₁) and the original blocks of the unbalanced vertical oriented tree of FIG. 8A at the lowest (blocks 260, 261, 262, 264)—index layer I₀. FIG. 4 demonstrates thus that the index scheme of the representative index is not necessarily the same as that of the original unbalanced trie. If desired, the B-tree in its entirety (forming a representative index) may be regarded as an index layer I₁.

The database file management system of the invention not only copes with the drawbacks of the conventional trie indexing file but also offers other benefits which facilitate and improve data access by user application programs.

Thus, the fact that a balanced structure of blocks is retained assures that, on the average, the number of slow I/O operations is retained essentially optimal, i.e. a more efficient result is obtained, particularly when large files consisting of multitude of blocks are concerned.

Those versed in the art will readily appreciate that whilst preferably the construction of layered index apply to slow I/O operations, e.g. for minimizing the number of accesses to slow external storage medium, the invention is by no means bound to the specified storage medium. Thus, for example the storage medium with which the present invention is applicable may also be an internal memory. This is of particular relevance considering the ever increasing volumes of internal memories which although being faster than external memory, may also required efficient access control which is realized according to the invention.

There follows a description of the second aspect of the invention.

For convenience of explanation, the second aspect of the invention will be described with reference to the PAIF index (constituting a designated index). The invention is by no means bound by this specific example.

As stated before, the database file management system of the invention enables to address different types of data records using a single index.

In order to better distinguish between data records of different types that are addressed by the same PAIF index, each data record belonging to a given type is associated with a given designator. The latter forms part of the key of the data record constituting a designator key. The designator is unique for every type of data. Thus, for example, the key of data records that belong to the entity "Borrower" is prefixed with the designator 'A', whereas all the keys of data records that belong to the entity "Book" are prefixed with the designator 'B'. The new key of the data records that belong to Borrower becomes a designated key that consists now of the concatenation of 'A' and the original key of Borrower, and by the same token, the new designated key of the data records that belong to Book consists now of the concatenation of 'B' and the original key of Book.

Having discussed the so called "designator" feature of the second aspect of the invention, there follows a description of the so called meta data.

According to an aspect of the invention, a data dictionary maintains meta-data information, which provides information on the data records as a function of the type of the records. Thus, in addition to the data records it is needed to maintain a designator, to be able to identify the designator and by using the meta-data information, to be able to identify or construct the designated key as well as other information such as the record size. The search scheme of the index is oblivious to the meta-data. It locates the record from the designator (or composite) key without using the meta-data. The meta-data is required to construct the (composite) designator key and, once the record is retrieved, to determine the properties of the record. Thus, for example, having retrieved the data record of book the designator—B—is identified, and information on the record designated B is available from the meta-data. For example the size of the book record, its fields and the fields that are the key fields.

The use of designated data records is not bound to only one type, but rather (preferably) more than one type may be treated by the designated index and as will be explained below with subordination relationship.

Figure 12:
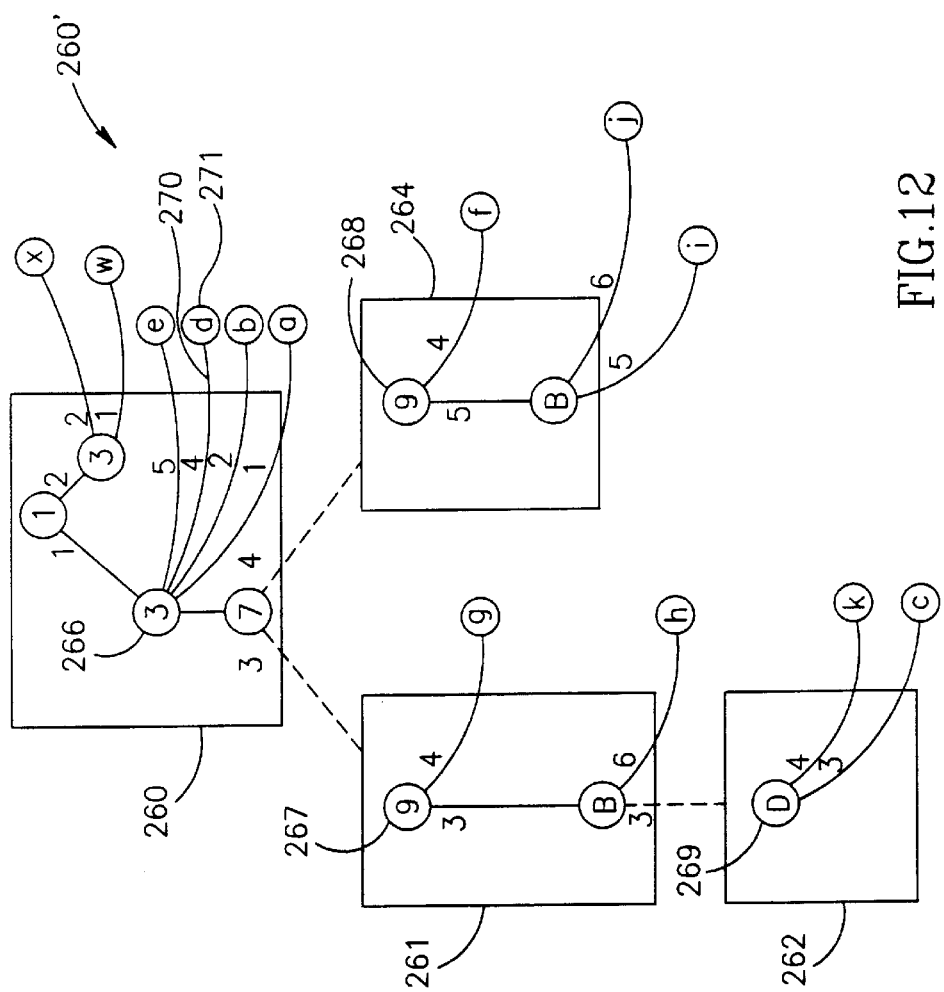
FIG. 12 shows a schematic illustration for exemplifying use of designators in a designated index in accordance with one embodiment of the invention.

Thus, whilst according to hitherto known solutions, data of different types are typically held in several files (and is addressed by several index files), according to a database management system utilizing a designated index of the invention, data records of different types may be addressed from the same index. It should be noted that the keys of data records that belong to different types (and are addressed by the same designated index) do not necessarily have the same length. Thus, for example, consider a layered index which is also a designated index based on a trie as its basic partitioned layered index of the kind depicted in FIG. 8A. The size of the key of the records that belong to the "Borrower" entity is 6 bytes long, whereas the size of the key of the records that belong to the "Book" entity is 5 bytes long. Inserting books to the designated index of FIG. 8A with the designator keys B11111 and B22222 result in the data structure of FIG. 12 that includes a designated index that address 2 types of data records—data records a–k which are assigned with the designator A and data records w–x which are assigned with the designator B. In the description below, the terms record of type X or record designated X are used to describe a record having a designated key and the designator is X.

Whilst the latter example illustrated one manner of realizing designated data (i.e. pre-pending as prefix a character, string or any number of bits) to the key of the data record, those versed in the art will readily appreciate that this is only one out of many possible variants. In fact, the proposed designator may be realized in any known manner provided that the designator distinguishes between different data records, treated as part of the key, and therefore forms part of the search.

The latter statement applies, regardless of whether the designator: (i) forms part of the data record (or key portion), (ii) being stores elsewhere (e.g. in a different data structure), or (iii) it may be defined elsewhere, or even defined otherwise. An example of the latter is a trie structure that is associated with data records all of the same type (for example, all are designated with a character A). Obviously, by this example, it is not required to physically attach the designator to the instances of the data records, seeing that the designator is common to all records. However if data record is accessed it is needed to identify the designator and add it to the key. Another possible solution is to prefix the designator to the data record such that when the data record is accessed the designator is available. For example, consider FIG. 12, data record d is accessed from node 266 by link 270. The first character of data record d is A—the designator.

Figure 13A:
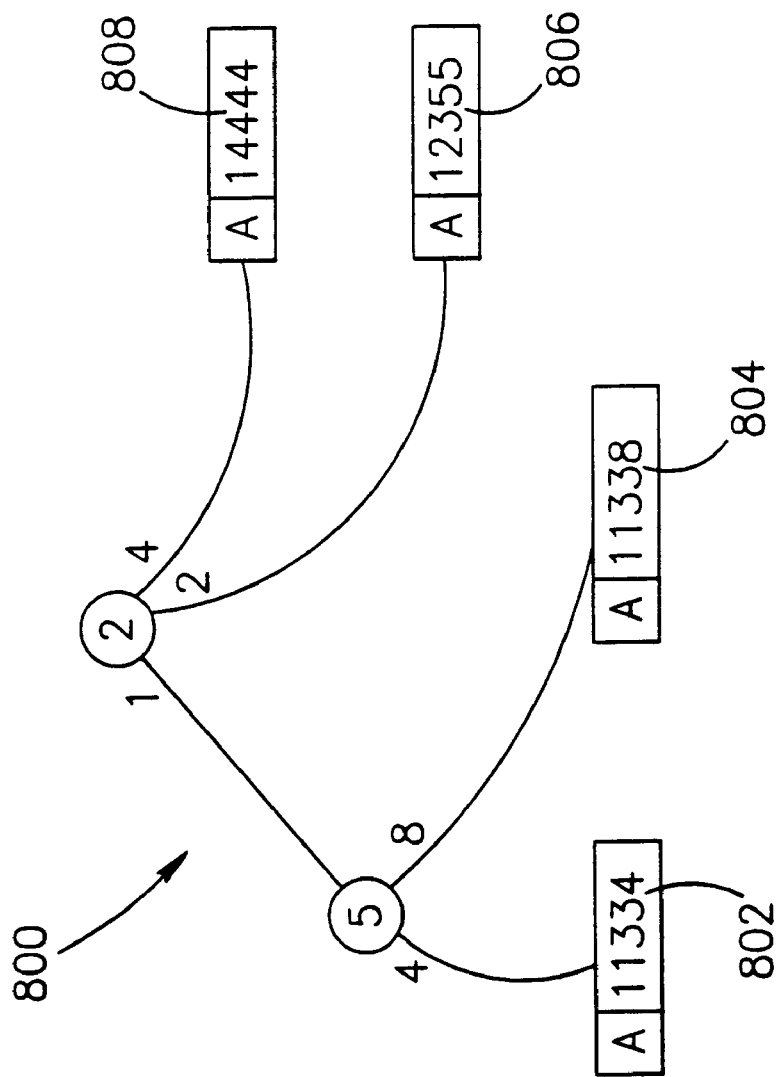
FIGS. 13A–E show five schematic illustrations for exemplifying feature of subordination of data records in a designated index in accordance with one embodiment of the invention.

For a better understanding of the subordination relationship, attention is directed to FIG. 13A–13E. FIG. 13A illustrates a designated index 800 (in the form of PAIF) with four data records 802, 804, 806 and 808 (of which only the designator keys are shown) associated thereto. The data records are all of the same type as readily arises from the designator 'A' that is prepended to each of the data records.

Figure 13B:
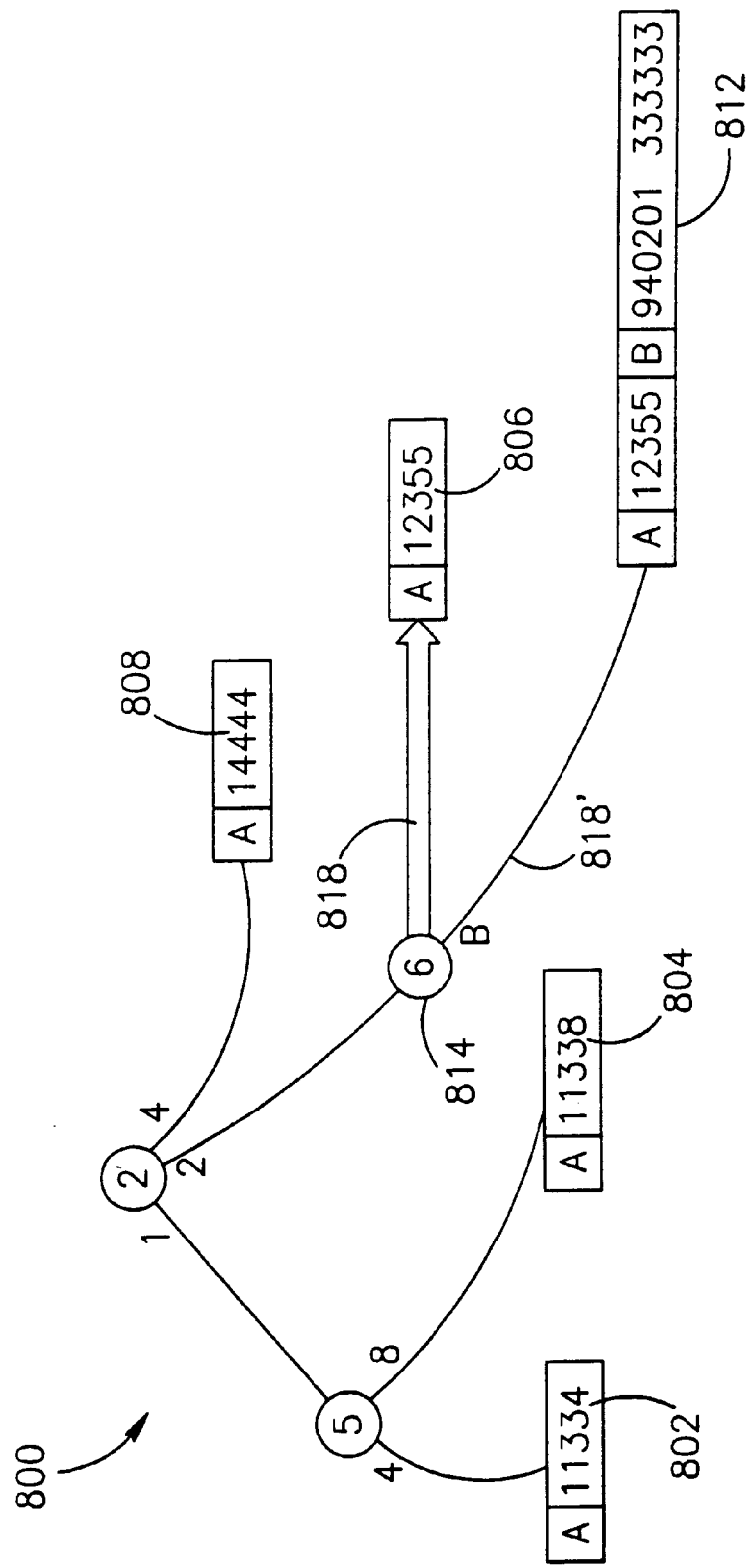

Turning now to FIG. 13B, there is shown the PAIF 800 with new data record (812) with a composite key A12355B940201333333 (the designator of record 81 is B). The new data record is subordinated to data record 806 whose key is A12355. According to the PAIF index, node 814 indicated that the discerning offset is 6 and that the value B links to data record 812 (having the value B at offset 6). Seeing that record 806 has no value at offset 6, it is assigned with virtual value (say null) at this offset in order to determine the discerning offset vis-a-vis the other record and accordingly, then link 818 is set with direction marked null.

Figure 13C:
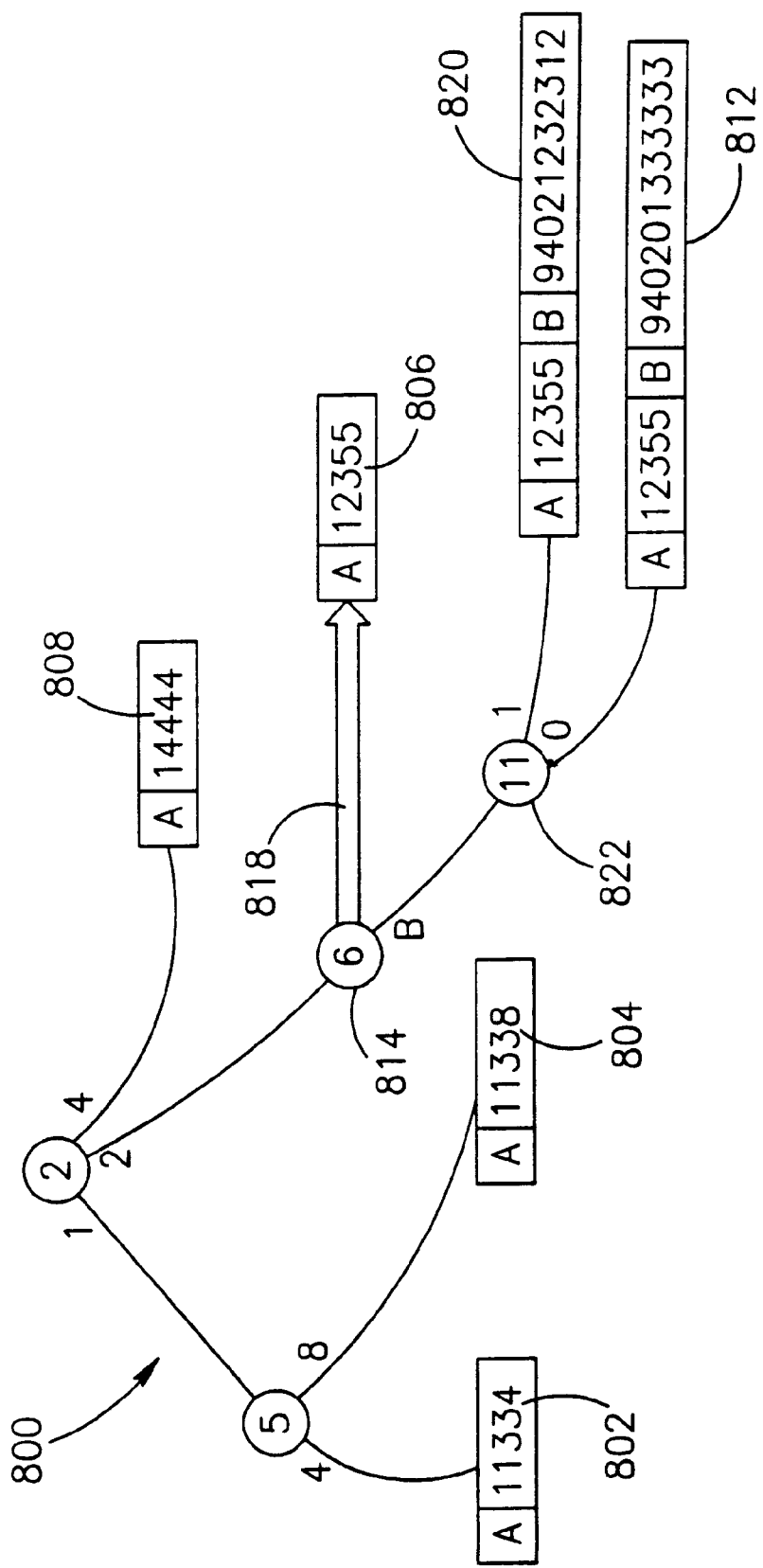

FIG. 13C illustrates the PAIF 800 in which another data record 820 is inserted. Data record 820 which represents another instance of B type data record that is subordinated to A type data record (806) is inserted to the PAIF. The discerning offset is 11 (the value of the new node 822) and the link values thereof are '0' and '1' to data records 812 and 820, respectively.

Figure 13D:
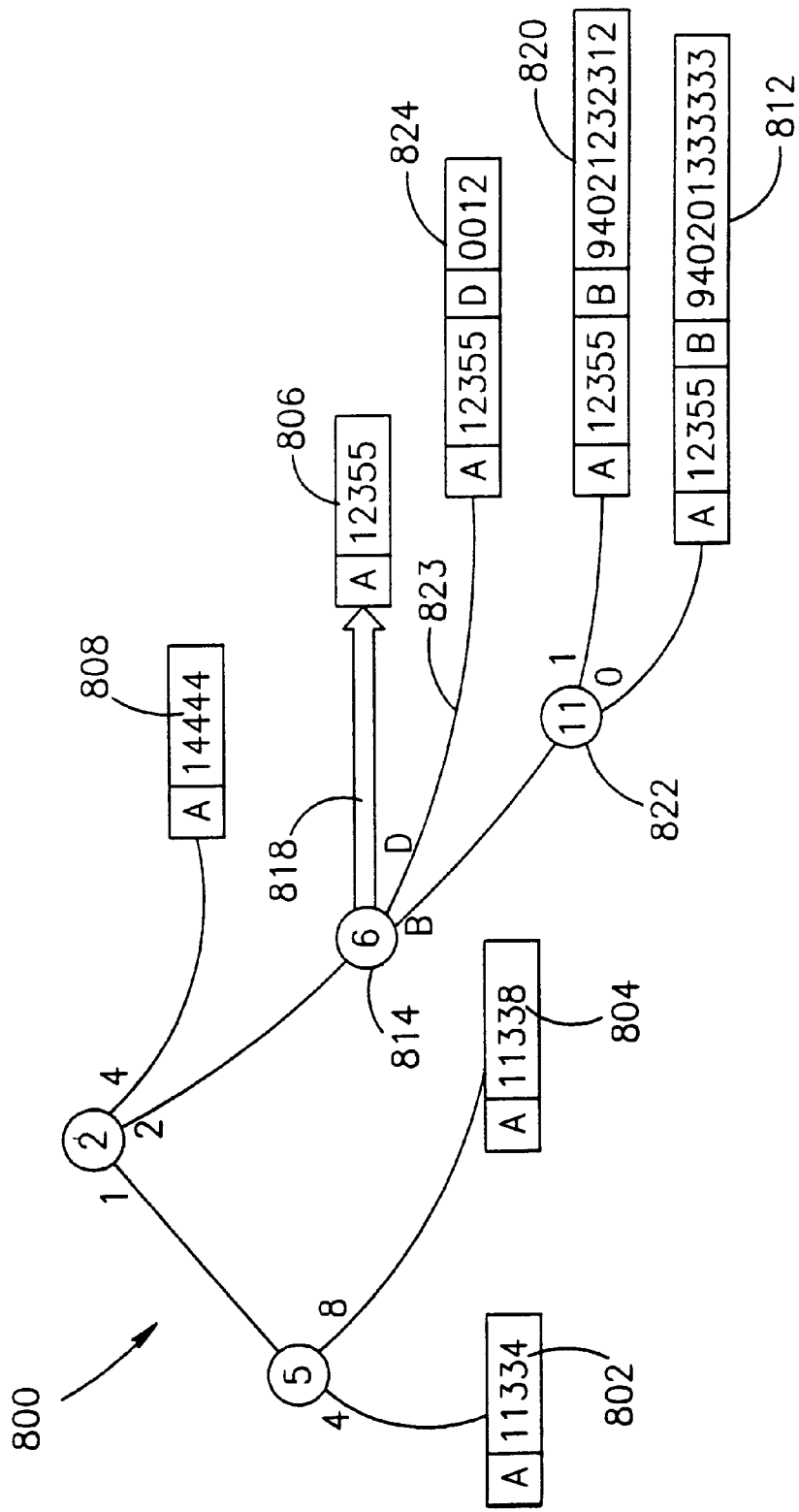

FIG. 13D illustrates the PAIF 800, where a different types of records are subordinated to record 806. Data record of type 'D' (824) being subordinated to data record of type 'A' is linked from node 814 by link 823 having the value D. As recalled, the PAIF already represents data record designated B where the latter is subordinated to the data record designated A. An example of the 'B' type subordinated to 'A' type is items ('B') stored by supplier ('A') and ('D') type subordinated to ('A') is clients ('D') served by the supplier ('A').

Figure 13E:
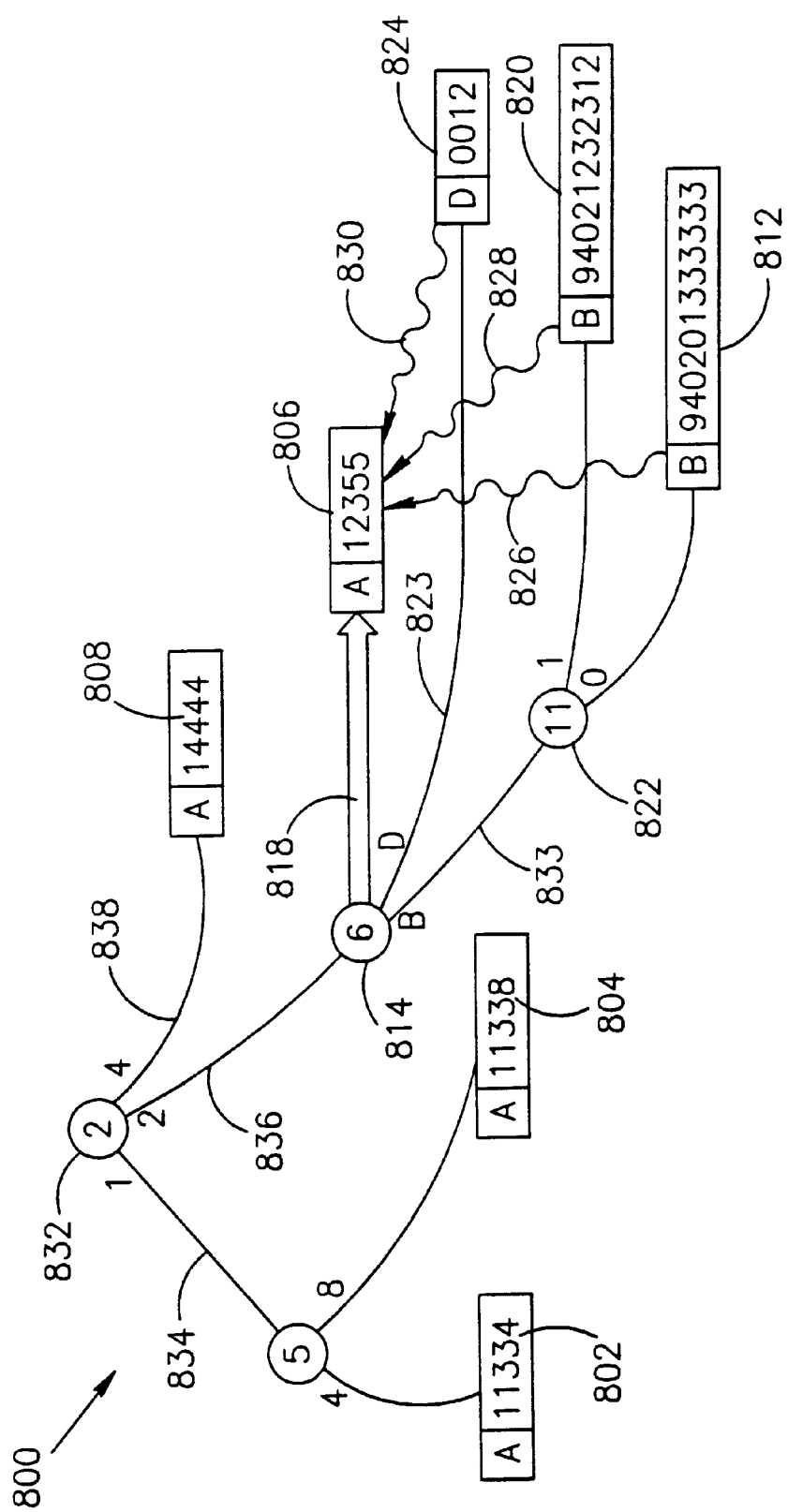

Turning now to FIG. 13E, there is shown another embodiment of the PAIF of FIG. 13D implemented slightly differently. In particular, the subordinated data records 812, 820 and 824 are represented and maintained in the data file without their key prefix that is the designator key of the record 806 (i.e. the prefixed key A12355 is omitted). When accessing, for example, data record 812 the information available from the meta-data according to the designator B allows to extract the following information:

(i) identify that part of the key is missing, (ii) that record 812 is subordinated to a record designated A that can be accessed from node with value 6 (814) and by a link with value null (818).

Thus it is possible to access data record 806 and construct the complete key of record 812. If the PAIF 800 is a layered index, it might be that nodes 814 and 822 reside in different blocks and the access path to the block associated with record 812 does not include node 814. In that case, a link from the subordinated records (links 826, 828 and 830) to record 806 allows to access data record 806 and construct the key. The implementation described above obviate the necessity to duplicate the representation of the designated key of data record 806 in respect of each subordinated data record (by the particular example of FIG. 13D, the specified prefix A12355 is duplicated three times for records 812, 820 and 824). Replacing the key prefix with a link can save space (if the size of the prefixed is larger than the representation of the link) and allows to access the record that the subordination relates to without necessitating a separate search.

FIGS. 13D, 13E illustrate that the subornation relationship characteristics of the invention is not limited to any specific realization.

The subordination relationship of the invention enables, thus, to render more efficient the low level implementation of data as compared to hitherto known techniques in the sense that one index can be associated with various data types and subordination relationships as compared to separate index files according to the prior art. This notwithstanding, there may of course be applications according to the invention, where more the one index file is utilized.

Obviously, each of the subordinated records 812, 820, 824 can have records subordinated to it.

Moreover, there are some other advantages that are brought about using the proposed technique of the invention, e.g. maintaining data integrity. Consider, for example, an insert transaction that is applied to the PAIF 800 of FIG. 13E, of data record designated B with a composite key A12355B930101123456 subordinated to data record 806 (having designated key A12355). The search leads to node 822. The value at key offset 11 of the inserted data record is 0 thus record 812 is accessed. The search key of record 812 needs to be constructed (by accessing record 806 via link 826) and the insertion of the new data record can be completed. It should be noted that the link to record 806 obviates the need to conduct a separate search for record 806 by it's key in order to confirm it's existence. Thus the maintenance of data integrity is more efficient.

Performing the same data integrity check using the specified B-tree index implies considerable overhead since it is required two phase operation. At first, a search is applied to the index of data records of type 'A' in order to find data record whose key is 12355. Only upon finding it record of type B can be inserted (and a separate index file is normally updated).

When searching data, the data structure of FIG. 20E exemplifies other advantages resulting from the fact that subordinated data records are linked to their "parent" record. For example, if record from type A is a customer and record from type B is an invoice, it is usually needed to access the invoice details with the customer details. The link from the invoice to the customer obviates a separate search for the customer details.

The so obtained designated index of the invention brings about another important advantage in that navigation in the index for accomplishing sequential operations.

Consider, for example, the PAIF of FIG. 13E, where it is required to "retrieve" all data records in an ascending order. Thus, it is possible to navigate in the PAIF (known also as sequential operation) and data records 802, 804 806, 812, 820, 824, and 808 are retrieved according to the order of the designator key. If only records of certain type are needed, for example the records of type A, one would navigate in the index in the same manner whilst avoiding the access of nodes and records that are not relevant. Accordingly, from node 814 data record 806 is accessed and it can be predicted that the data records that can be accessed from node 814 by its links and descendent nodes are subordinated to record 806, thereby avoiding links 833, 823. In this example only records 802, 804, 806 and 808 are retrieved. In the same manner, one would avoid to move along link 823 if only records of type A and B are needed since it can be predicted that a link with a value D from a node with a value 6 addressing record 806 is a link to subordinated data record designated D.

If the PAIF index is a layered index and assuming that nodes 814 reside in a different block than of node 822, the move from node 814 to node 812 can be by the split link. If the split link does not exist, for example in FIG. 7F one needs to use the link 421 of node B' (422) when it is needed to advance by link 400 from node B (423) to node E (424).

Having exemplified the subordination relationship with reference to the specific embodiment of FIG. 13, there follows a description that pertains to the multi-dimensional characteristic according to the second aspect of the invention.

Figure 14:
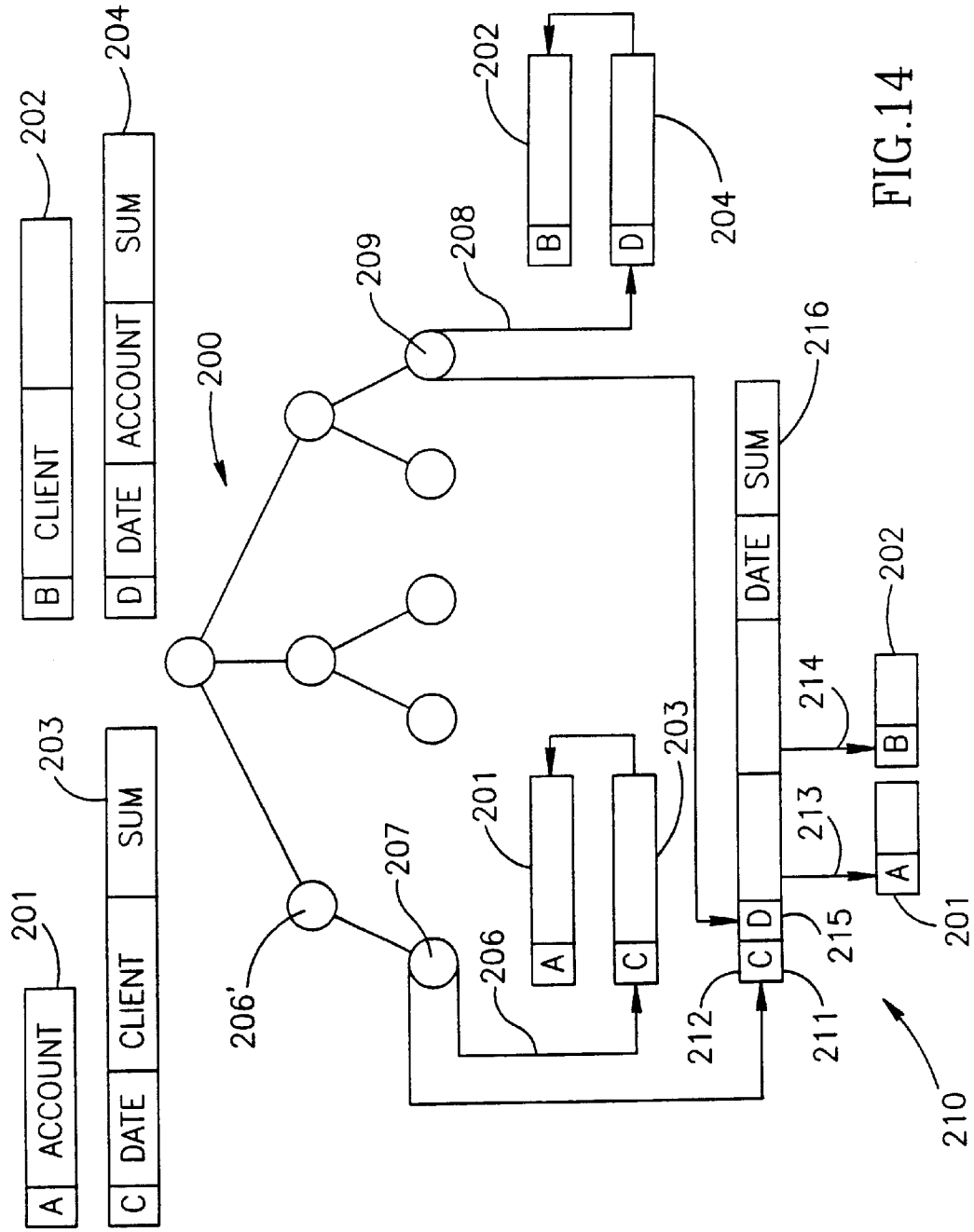
FIG. 14 shows a schematic illustration of a designated index exemplifying multi-dimension record according to an embodiment of the invention.

Turning now to FIG. 14, there is shown a schematic illustration of a designated index according to one embodiment of the invention. The index contains two search paths to one designated data record ("DEPOSIT" data record)

such that the deposit can be accessed by each of the two composite keys—a designated key that includes the key fields account number, date and client number and a second designated key that includes the key fields client number, date and account number. Reverting to the above example, the account data record has a designated key 'A133333' (1201), Updating a deposit for the account (deposit subordinated to account) can be implemented by means of designated record 203 subordinated to designated record 201. The PAIF would allow to access records 201, 203 from node 207 by link 206. By the same token, data record 204 represents a deposit of a client. The key of record 202 is B133333. Updating a deposit 204 to a client 202 can be implemented by the index 200 and node 209 linked (208) to data record 204. The key of data record 203 is. 'A133333C01019811346' ($k_1$). The key of record 204 is B11346D010198133333 ($k_2$).

As shown the fields of Client and Account are duplicated in records 203, 204 (as well as additional information such as the date and the sum) which is an obvious drawback which results in an undue inflated file.

This drawback may be overcome by representing a single DEPOSIT record as a multidimension record 210.

Data record 210 (FIG. 14) is a multi-dimension record that is updated and accessed by the designated index 200 according to the designator key $k_1$ (designator C) and according to the designator key $k_2$ (designator D). (note that when data record is a multi-dimension record, the designator of the record depends on the key that is being used). The path in the index by $k_1$ leads to node 207 and from that node to the designator C of record 210. The information in the meta-data according to the designator C allows to construct the relevant structure. For example construct a data structure that includes the key $k_1$ by links 213, 214 records 201 and 202 are accessed an thus with the date field of record 210 all the key fields are constructed. The path in the index by $k_2$ leads to node 209 and from that node to the designator D of record 210. The information in the meta-data according to the designator D allows to construct the relevant structure, for example construct a data structure that includes the key $k_2$. As shown, the search path defined by the search keys of record 203 leads to the first field 212 having a value 'C' (which is the designator according to search key $k_1$). The third field points to data record 201. The second field 215 (having a value 'D'—which is the designator according to search key $k_2$) of the same data structure 210 is accessible by search path that is defined by the search key of record 204. The fourth field has a link to the actual data record 202. In this manner the record DEPOSIT represents subordination of both account and client, whilst avoiding duplication of the fields account, client date and sum. It should be noted that the data elements account and client are accessed by means of link to the original data records (201 and 202) and the rest of the data (date and sum) exists only once within data element 210. Obviously, data record 210 can include other fields. The invention is by no means bound to a given realization and accordingly the manner of realizing data record 210 as depicted in FIG. 14 is only one out of many possible variants. The number of search paths is not limited. As had been explained above with reference also to FIG. 13E, if the sought data record is Axxxx (i.e. the account record 201 per se), then one simply moves in the index with a search key of 'Axxxx' to any of it's subordinated records and access the record of type A by the link from the subordinated record to record of type A. Such for example link 213 of FIG. 14. Other implementation are of course feasible (e.g. maintaining a link in the index to record A), all as required and appropriate. The specified description which provides two (and in the general case at least two) search paths to one physical occurrence of data records constitutes the multi-dimensional data structure which is a designated index that contains at least two search paths to one data record (called multi-dimension record).

Relation among data elements—FIG. 15 illustrates another feature of the invention, i.e. data relationship feature. Thus, data record A (a book data record) has C, F, J, K and L data records subordinated thereto. The realization of this hierarchy was illustrated above. According to the present relationship feature, one-to-one and one-to-many relations may easily be realized. Consider, for example, that a book has many categories (L), i.e. one-to-many, however, it has only one abstract (K), i.e. one-to-one.

According to the proposed feature, a one-to-one data relationship is implemented by a designated (composite) key of two components: the first is the designated key of its subordinating record and the second is the designator of the subordinated record (since it is a one-to-one relation there is no need to use the key field of the subordinated record). Whereas a one-to-many relationship is implemented by a designator (composite) key whose first component is the designator key of the subordinating record, and whose second component consists of the designator and key of the subordinated record.

In this example, the one-to-one relation between a book and its abstract is maintained by defining the key of L to be AxxxL, where Axxx is the designated key of A, L is the designator of the key of record L. The one-to-many relation between a book and a category is maintained by defining the key of L to be AxxxLyyy, where Axxx is the designated key of A, L is the designator of the key and yyy are the key field(s) of record L.

There follows now a description that pertains to another feature according to the second aspect of the invention that pertains to multi-model representation. In accordance with this feature, and as will be explained in greater detail below, one or more of the following (and possibly other) models may be represented by the specified designated index.

Representing relational tables by a multi-model designated index—

The relational model considers all data as consisting of tables. Each table consists of records of the same structure, called tuples. Suppose, the tuples consist of fields F1, F2 and F3. Each such field is a key. If key F2 is subordinate to key F1, and key F3 is subordinate to key F2, we can easily construct the table: to retrieve its tuples, follow the designator of key F1, and from there for each value of F1, follow the designator of F2, and in the same manner continue to F3. Each such triple defines a tuple of the table. Some projections are even easier: to find all the pairs of values of F1 and F2 for which there exists a value of F3 in the table, we terminate the search after processing (F1, F2). Performing the projection of (F2, F3) might be expensive, since it requires searching all values of F1 first. However, if this operation is common, the designated index should also maintain the search path (F2, F3, F1). I.e., we construct a new designator composite key F2'F3' F1' with new designators, and insert the additional paths to the designated index. Thus each record can be reached via both paths and constitute multi-dimension record.

Additional models on the multi-model designated index—

The designated index enables to represent additional data models, including relational database, an object oriented system, and a hierarchical database, where substantially no data is duplicated.

Implementing object oriented (persistent data structures) by multi-model designated index—

The object oriented approach considers all data as objects. Every object belongs to a class, which determines its structure and which methods (functions) can be applied to it. The classes are organized in a hierarchy, from which structure and method may be inherited. The object-oriented approach is ephemeral—an object exists only while the program that created it is active. Objects that need to be supported for a longer period of time, are defined as persistent. These objects are stored on the disk and are available to other (authorized) programs. The multi-model designated index can easily support such object. Since their structure is uniformly encoded with the aid of designators, later incarnations of the program as well as other programs can access these persistent objects. Note that at the same time a persistent object can also be part of a relational table.

There is no need to duplicate data.

Figure 16:
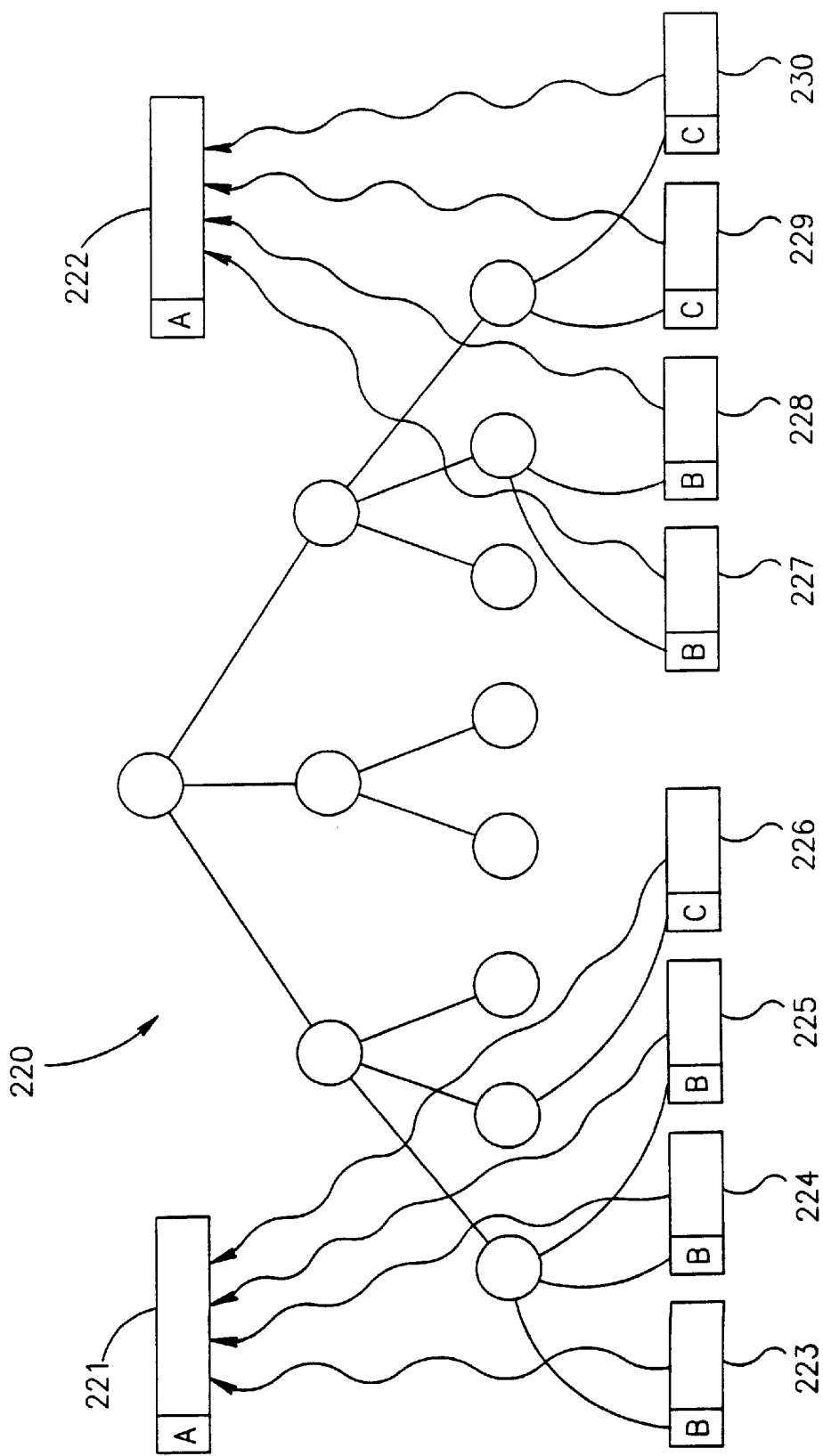
FIG. 16 shows a schematic illustration for exemplifying feature of relations among data records provided in accordance with one embodiment of the invention.

Consider, for example, the data structure 220 of FIG. 16. Data records 223, 224, 225, and 226 are subordinated to data record 221 and together with record 221 are considered as an object. It is possible to search efficiently in the index for all data records with a key prefix equals to the designated key of record 221 (partial key search) and retrieve the entire object. If only part of the object's data is needed such as the A type record and the subordinated B type records, again a partial key search is done for data records with key prefix that is equal to the designated key of record type A (for example 221) and the designators B as the next key field.

Implementing object-relational by multi-model designated index—

As opposed to the object-oriented approach, the relational approach considers all data as tables. Thus it is difficult to integrate SQL queries in an object-oriented programming language (C++ or Java). The object-relational approach provides an interface to convert tables to objects. The interface requires the user to specify the relationship between the objects and the table attributes. If some attributes themselves are tables, we need to allow relational algebra operations on these tables too. These conversions are performed by the application program. Thus the database is unable to optimize the queries. The designated index treats data in a uniform manner, thus providing an ideal interface between the object-oriented application program and the data structures. The application program's queries are formulated in terms of designated keys, so the database can optimize the query strategy. The database returns designated keys, which the object-oriented application program can readily process by the object-oriented methodology. The sequence of designators of the search path to the object determines its class, and the designators to various fields allow the object-oriented program to resolve polymorphism of the method calls.

The designated addresses all relating data. For example assuming that FIG. 16 describes a data structure of an insurance company where records of type A are customers, records of type B are customers claims and records of type C are customers payments. As it is clearly shown, all the data records are addressed by a single index structure.

Now, one is able to efficiently access all the object instances since the index allows to navigate from a customer to its related data—claims and payments. At the same time one is able to navigate on the index structure efficiently and effect the customer table (the collections of records of type A), customer claims table (the collections of records of type A and B) and customers payments table (the collection of records A and C). Since the data structure does not impose physical clustering of the data, if data is shared among different objects, it can be efficiently accessed by the different object views—and thus such data record is a multi-dimension record. In this example, a claim can be efficiently accessed both from the customer object and the policy object and being from a type structured as for example in FIG. 16 (structure 210).

The object-oriented approach allows users to add user-defined types (UDT) and user-defined functions (UDF). For example one could add the photos of accidents to the insurance company database. In the example, a new designated data record subordinated to the A type data record is defined. When a claim's details are searched, the photo of the accident is accessed and sent to the photo printout application. With a designated index, the relation between the photo data to the claim is handled in the same manner as with built in classes and relations. The new UDT can be based on or be related (by subordination) to any other data type. Now, with the designated index, the application can navigate to the new UDT from the defined classes from which the new UDT can inherent methods and other properties. In the example, when navigating in the index, one would navigate to a claim from which one could reach the photo as well as any other part of the claim's data.

Network and Hierarchical Models

Implementing network and hierarchical models by multi-model designated index—

The network and hierarchical models have been replaced by the relational model. However, even though these models are obsolete, they have some advantages (as well as many disadvantages) over the table-oriented implementation. Once a record is retrieved the addresses of related records are readily available.

Consider, for example, a bank with customers and loans. Each customer has an address and several loans, while each loan is taken by one or more customers. In the network model, each customer is represented by a node containing link to the customer and links to nodes representing the loans taken by the customer. A node representing a loan is likewise linked to the nodes of the customers that took that loan. Thus given a loan one can easily access of the customers that took the loan and get their home addresses.

The B-tree implementation, requires us to maintain two trees: one of the customers and home addresses, and the second of loans and customers. Thus having retrieved the data of a loan, the names of the customers that took the loan are available. To find their addresses, an independent B-tree search is required for each customer.

In the proposed multi-model designated index (such as for example in FIG. 16), once reaching the node representing the loan, one can continue to a designator that identifies the customers that took that loan (for example records of type B). Normally, at most one disk access is required for each customer. The proposed multi-dimensional designated index has the advantages of the network model, without its disadvantages. While the network model treated each node separately, and was susceptible to long search paths, the multi-model designated index treats all data uniformly and the length of the search paths in probably logarithmic such that the base of the logarithm is the block size. Thus, in practice, the search requires a single disk access.

Implementing server-client model with object oriented based on a designated index—

The client-server model enables efficient implementations of the relational model. According to this model, all the data resides at a central computer (called the server), and the application programs run at other computers (called clients).

When an application needs data, it formulates an SQL query, which is sent by the client to the server. The server evaluates the query and returns the resulting table to the client.

Thus, the interface between the client and the server is via SQL queries—the server is unaware of the internal data structures and code of the application. The client and the server have just to agree on the names of the tables and their attributes.

In the object-oriented approach this model breaks down. Since each data item is an object, the server must be aware of its internal structure. This problem is aggravated in the presence of polymorphic methods. The server must be aware of the structure and the details of the entire class hierarchy.

The designated index allows to apply the client-server approach for the object-oriented and object-relational models. For example, to reach an attribute, the application program sends the path of keys and link designators leading to the desired node to the server. Based on this data the server can fulfill the request without any knowledge of the data structure of the application program.

The client and the server should agree on the names of the fields and their designators. The server need not be aware of the type of data of each such field, and its semantic content.

According to yet another aspect of the invention it is proposed to further compress the representation of the index thereby render it more efficient.

Hereon there is an estimation of the space required by a trie and methods to reduce the space requirements.

If the trie is a layered index the analyzing of the trie index structure will concentrate on the last layer ($I_0$):

Storage requirements for primary key index of a trie—

One of the most important features of a trie based data structure is the modest size of its representation. The PAIF for example maintains even smaller size than a conventional trie because of it's compressed representation.

The last level of the PAIF index contains a trie with links that point to other trie nodes in the same block, and links that point to records. Let N be the number of records in the database. The index contains exactly N pointers to these records. If each pointer requires 4 bytes, the size needed for the pointers is 4N bytes. In addition, each pointer has a direction, (1 byte) thus the total is 5N bytes.

Now consider the space required for a PAIF trie. Since N pointers emanate from the index and each trie node has at least 2 children, there are at most $n \leq N-1$ trie nodes. Let d denote the average number of children of a trie node then $n \leq N/(d-1)$. Since in practice d>>2, n<<N. Each trie node has a level number (1 byte). Since each trie node has at most one incoming trie link, there are at most n−1 trie links, each trie link has a label, which is a single character and an intra-block pointer (1 byte), thus a total of 3n bytes. Thus in the worst case it is needed $3n+4N \leq 7N$ bytes in the worst case. And between 4N and 6N bytes in practice.

Performing the same analysis but from another angle: Consider two pointers $p_1$ and $p_2$ that emanate from node v of level k. Let $x_1$ be a key reachable from $p_1$ and $x_2$ a key reachable from $p_2$. Then $x_1$ and $x_2$ share the first k−1 characters. In A PAIF structure, each one of these characters is represented at most once. In the B-tree representation it is needed to explicitly represent the first k character of each key.

The savings in the PAIF are twofold: First every character of is stored at most once on each level, and second, not all characters need be represented.

Further index compression—

In the above discussion, most of the space is required for the pointers to records. It will be now presented a method that allows to save pointer space. The method is based on allowing several links to records to share the same pointer. Suppose, first, that the records have fixed size. If the first two records reside in the same block, then it is possible to keep a single full sized pointer for the first pointer to a block, and instead of keeping a pointer for each of the remaining outgoing links to that block, computing their displacement, i.e., if the first two records reside in block number 2000 and the third record in block 7000 it is possible to maintain the structure 2000(e,f) 7000(h).The savings would be much more substantial if a larger number of outgoing links point all to the same block. If k such links point to a block, then the 4B of the pointer are divided among all k records, thus the space for addressing each record is reduced to 4/k bytes plus the space for the direction (1 byte). For $k \geq 4$ this means that each record requires 2 bytes in the index.

For variable sized records It is possible to maintain the displacement within the block, for example: 2000(e: $d_e$, f:$d_f$) 7000(h: $d_h$). Instead of maintaining a full pointer, a displacement that could fit into a single byte is maintained. Thus, for each record it is needed 1 byte for its share in the pointer, 1 byte for the direction, and 1 byte for the displacement; a total of 3 bytes per record.

Figure 17A:
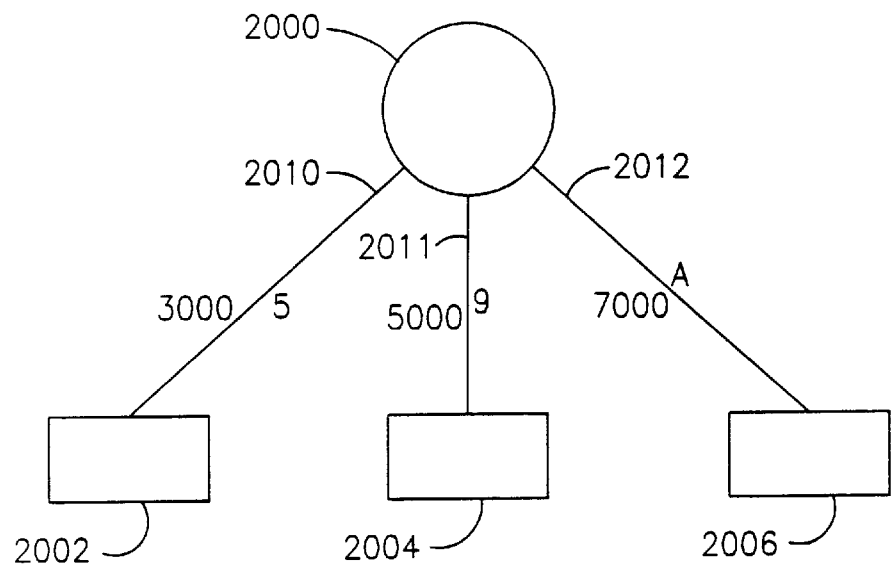
FIGS. 17A–B show a schematic illustration of compressed representation of links to data records in accordance with one embodiment of the invention.

Looking at the example of FIG. 17, FIG. 17A shows a node 2000 of a trie with the links 2010, 2011, 2012 (values 5,9,A respectively) that address 3 data records—2002, 2004, 2006 at disk address 3000, 5000, 7000 respectively. The size needed to represent the link values (1 byte for each link) and the pointers (4 bytes) to the data is 15 bytes.

Figure 17B:
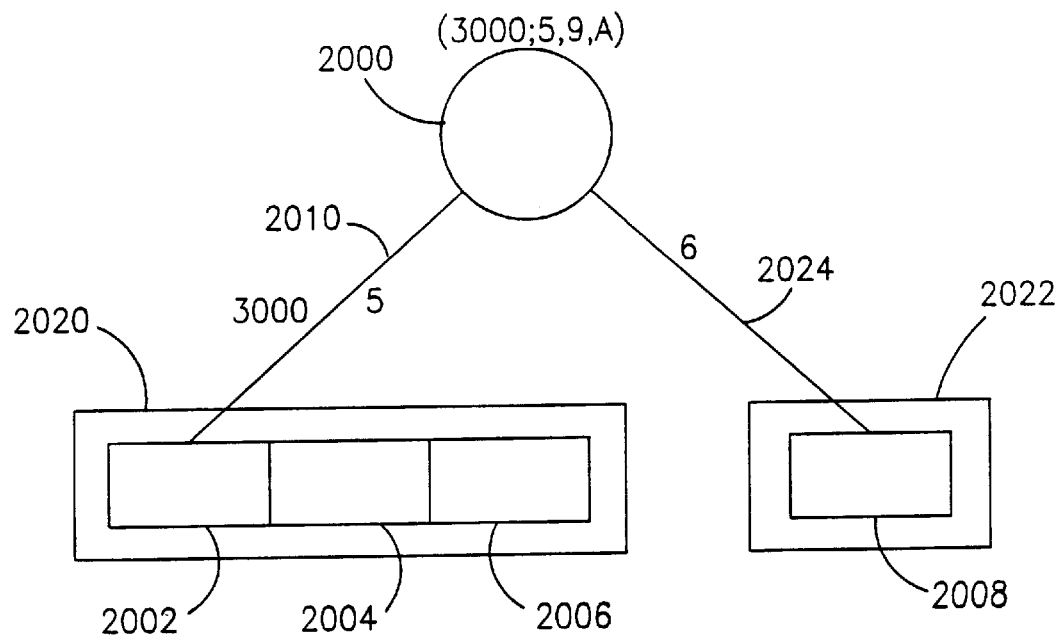

Turning now to FIG. 17B where node 2000 maintains a shared link (2010) to three data records (2002,2004,2006). The information that represent the link is the address to block 2020 (4 bytes) and the link values to the data records 2002, 2004, 2006 that reside in the block (1 byte for each link value). The size needed to represent the pointer to the data block and the value of the links is only 7 bytes—(3000:5,9,A).

Now in order to access data record 2004 one can calculate it's address as the address of the data block+the displacement which depends on the record size assuming that the records in the data block are all of equal size.

As had been explained, node 2000 can include links to other data records or data blocks (such as link 2024 to data block 2022 accommodating data record 2008).

Preferably, the database file management system of the invention should be associated with known per se concurrency and/or distributed capabilities so as to enable a plurality of users to access virtually simultaneously to the database. The database may be located in a central location, or distributed among two or more remote locations.

Turning now to FIGS. 18A–D, there are shown four benchmark graphs demonstrating the enhanced performance, in terms of response time and file size of database utilizing a file management system that employs a system of the invention vs. commercially available Ctree based database. The inserts are realized through Uniface application running in Windows (for workgroup) operating system.

Figure 18A:
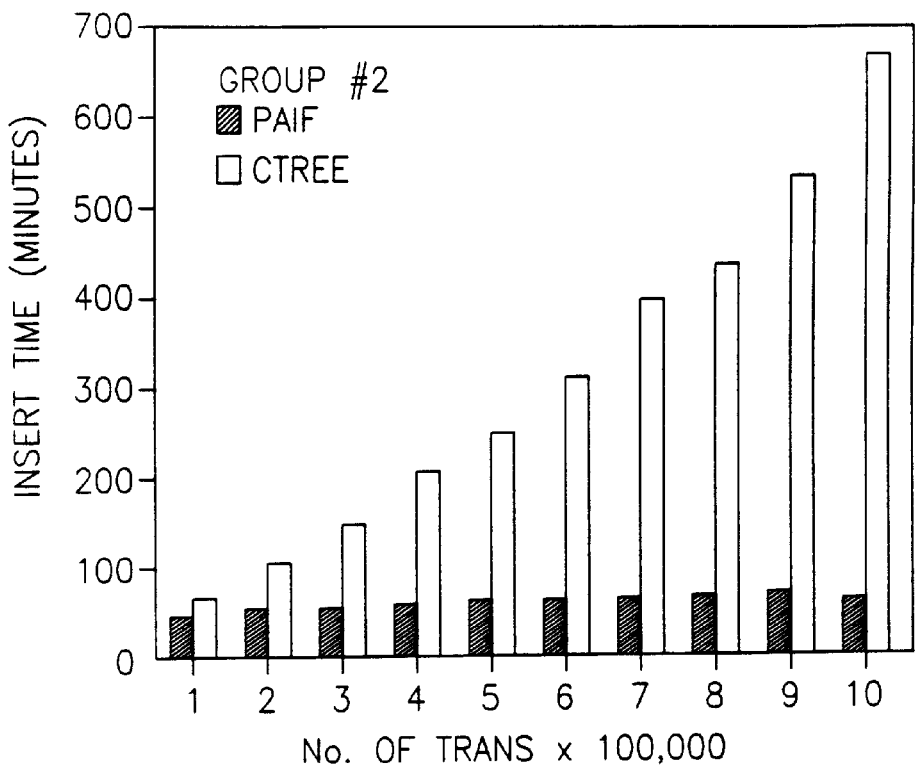
FIGS. 18A–D show four benchmark graphs demonstrating the enhanced performance, in terms of response time and file size, of a database utilizing a file management system of the invention vs. commercially available Ctree based database.

The benchmark of FIG. 18A concerns measuring the time in minutes for inserting an ever increasing number of a priori sorted data records to a file (0–1,000,000). As shown in FIG. 18A, the larger number of inserts the greater is the improvement in terms of response time of the database file management system of the invention. Thus inserting 1 million records takes about 669 minutes in the Ctree based database as compared to only 65 minutes in the system of the invention. Moreover, the response time in the file management system of the invention increases by only a small extent as the number of records increases, as opposed to significant increase in the response time in the counterpart system according to the prior art.

Figure 18B:
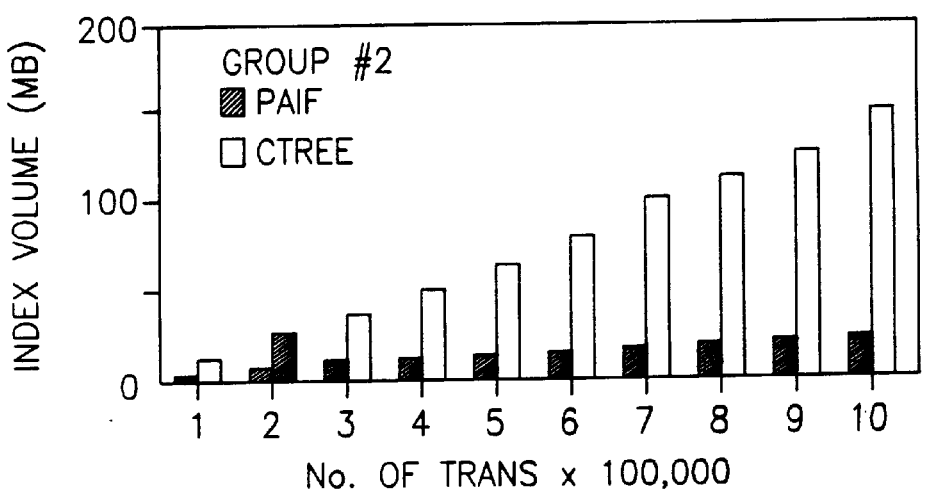
Figure 18C:
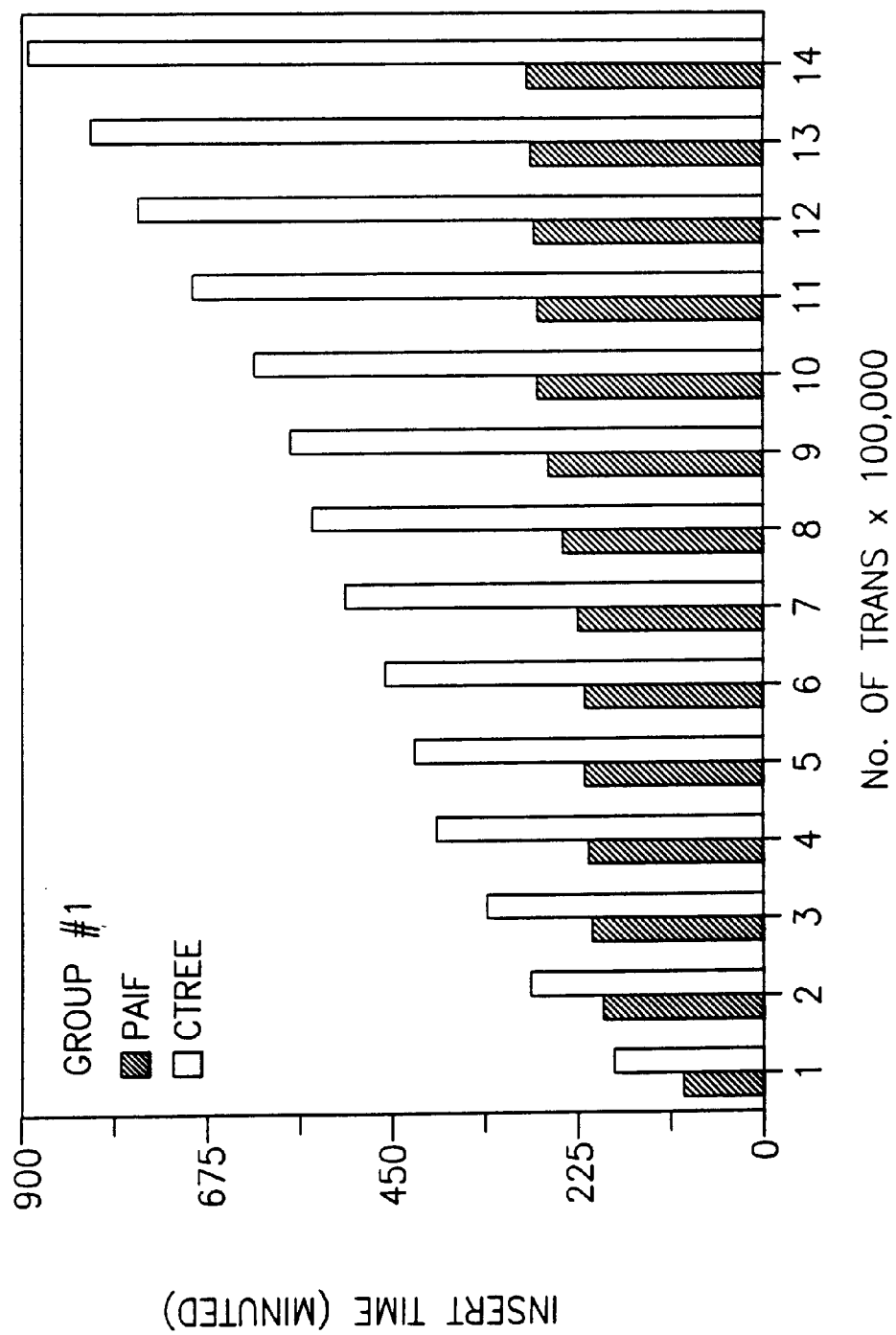
Figure 18D:
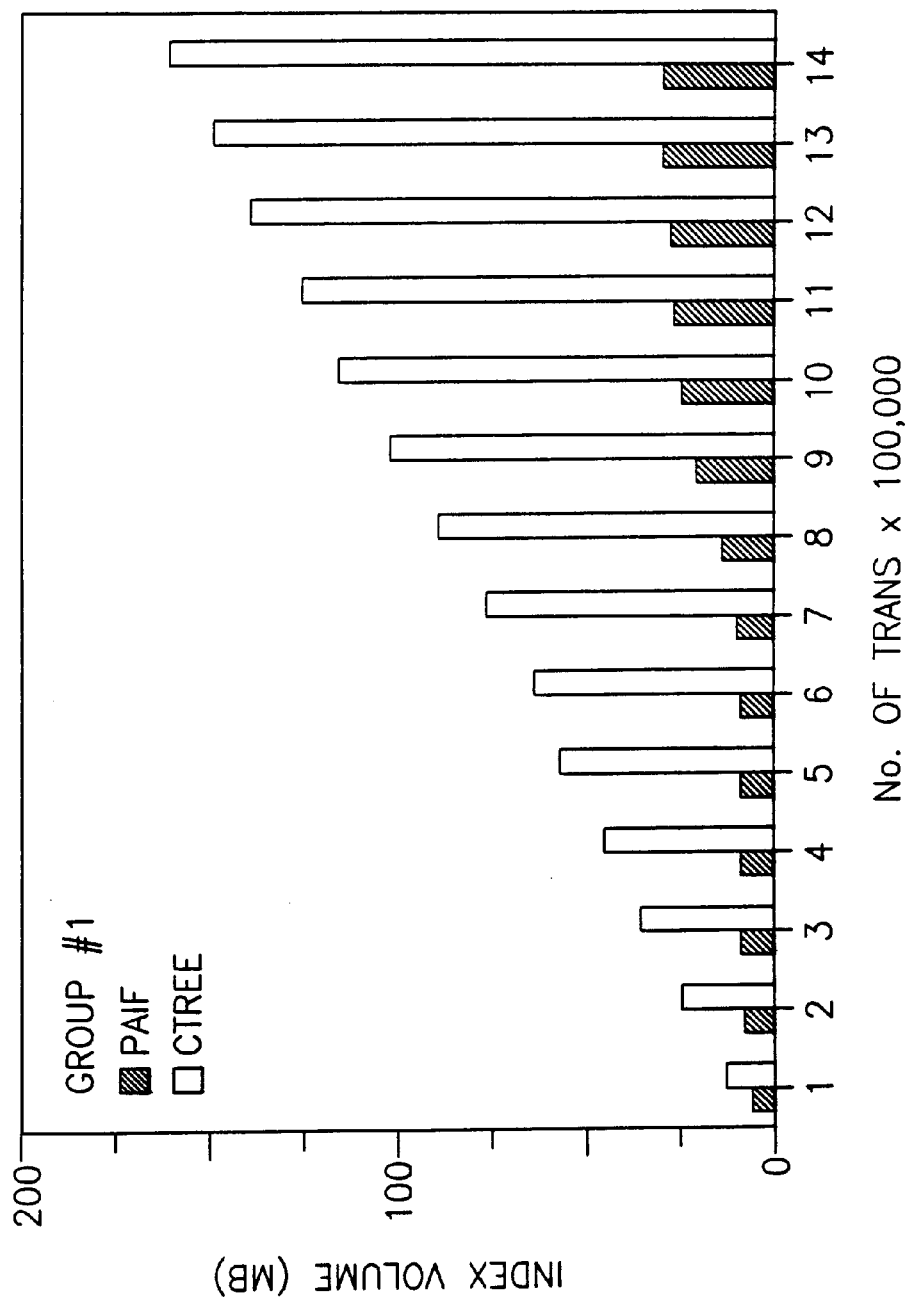
Figure 19A:
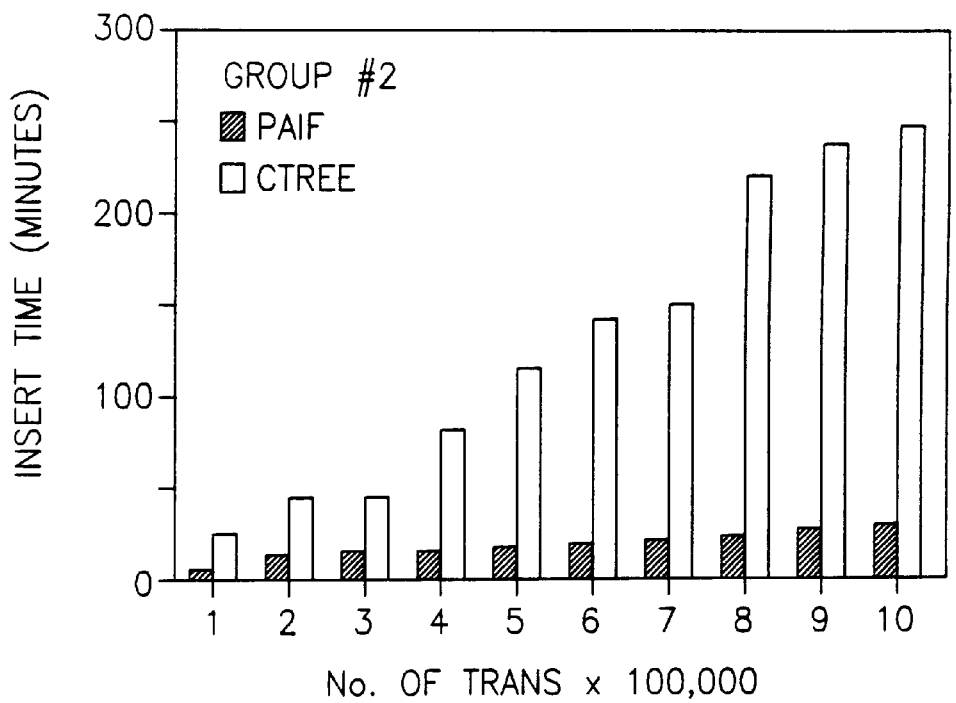
FIGS. 19A–D show four benchmark graphs demonstrating the enhanced performance, in terms of response time and file size, of a database utilizing a file management system of the invention vs. commercially available Btree based database.
Figure 19B:
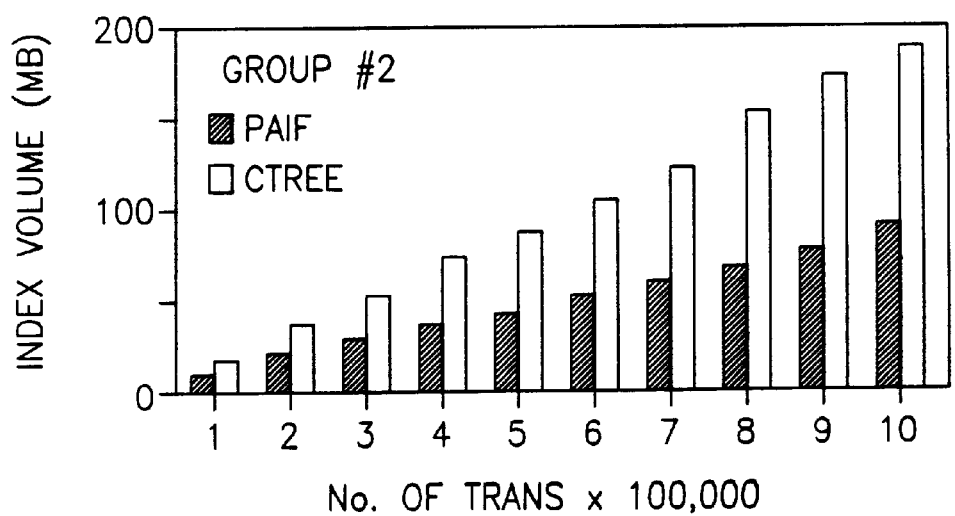
Figure 19C:
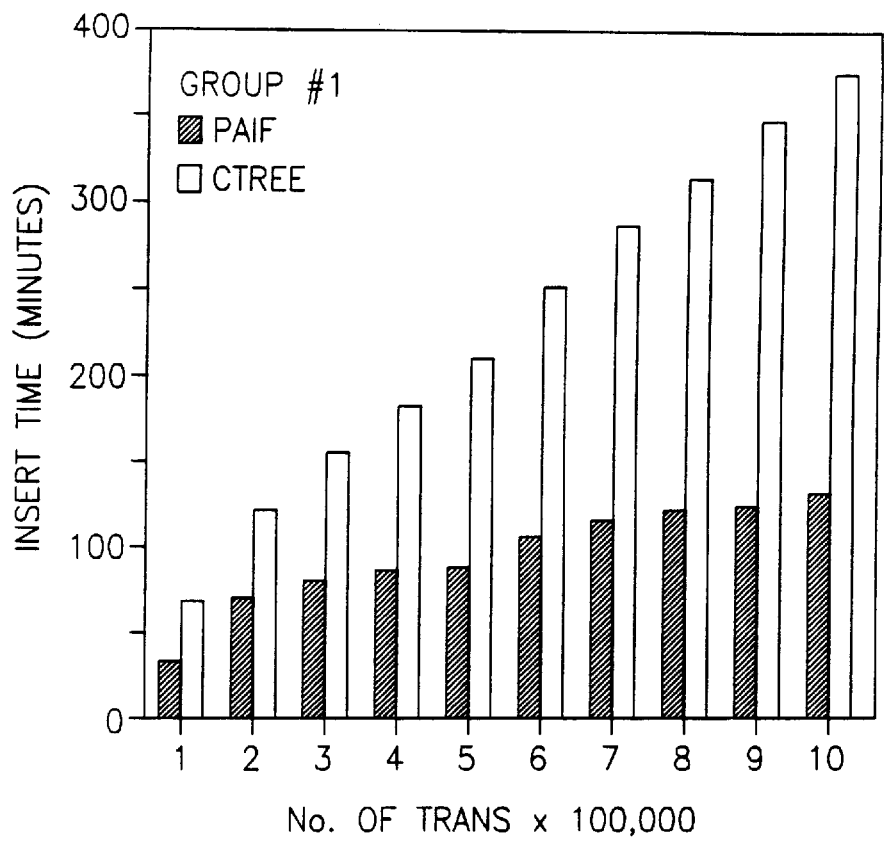
Figure 19D:
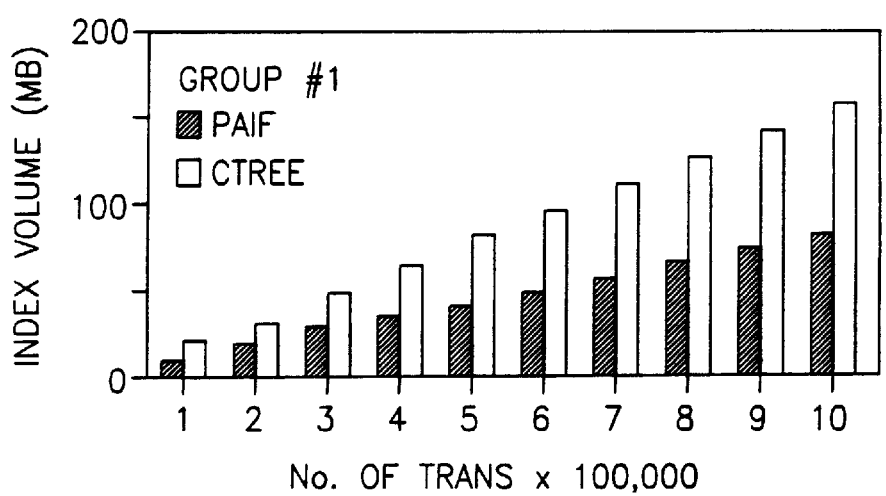

The benchmark of FIG. 18B illustrates the file size in mega bytes as a function of number of data records in the file (0–1,000,000). As shown in FIG. 18B, the larger number of records the greater is the improvement in terms of file size in the database file management system of the invention. Thus for 1 million records the file size of Ctree based file is about 151 mega byte as compared to only 22 mega byte in the database file management system of the invention.

Graphs 18C and 18D are similar to those shown in FIGS. 18A and 12B apart from the fact that in the former (18C and 18D) the data records are inserted randomly whereas in the latter (18A and 18B) the data records are a priori sorted according to search key. As shown the results are as before i.e. the system of the invention is more efficient in terms of both response time and file size.

FIGS. 19A–D illustrates a benchmark graphs of a system of the invention (operating under DOS operating system) vs. commercially available Btree based database system. The results are as before i.e. the system of the invention is more efficient in terms of both response time and file size.

Those versed in the art will appreciate that alphabetic and roman characters designating claim steps are made for convenience of explanation only and should by no means construes as imposing order of steps, or how many times each step is executed vis-a-vis other steps of the method.

The present invention has been described with a certain degree of particularity, but those versed in the art will appreciate that various modifications and alterations may be implemented without departing from the scope and spirit of the following claims:

What is claimed is:

1. In a storage medium used by a database file management system executed on data processing system, a data structure that includes:

a layered index arranged in blocks; the layered index includes a basic partitioned index that is associated with data records; the basic partitioned index enables accessing or updating the data records by key or keys, and being susceptible to an unbalanced structure of blocks;

said layered index enables accessing or updating the data records by key or keys and constitutes a balanced structure of blocks.

2. The layered index of claim 1, wherein said basic partitioned index being a trie.

3. The layered index of claim 2, wherein said trie being a PAIF trie.

4. The layered index according to claim 3, wherein the layered index includes the Btree index scheme.

5. The layered index according to claim 3, wherein the layered index includes substantially the PAIF index scheme.

6. The layered index of claim 1, wherein said storage medium being an external memory.

7. The layered index of claim 6, wherein said storage medium being further an internal memory.

8. The layered index of claim 1, wherein said storage medium being an internal memory.

9. The layered index of claim 1, wherein the basic partitioned index and a representative index of said layered index being substantially the same index schemes.

10. The layered index according to claim 9, wherein the representative index being substantially the PAIF index scheme.

11. The layered index of claim 1, wherein the basic partitioned index and a representative index of said layered index being different index schemes.

12. The layered index according to claim 11, wherein the representative index being the Btree index scheme.

13. The layered index according to claim 1, capable of supporting the ODBC standard.

14. The layered index $I_0, \ldots, I_h$ according to claim 1, comprising:

a representative index $I_1, \ldots, I_h$ constructed such that any $I_j$ is constructed over the representative keys of $I_{j-1}$.

15. The layered index $I_0, \ldots, I_h$ according to claim 14, wherein $I_h$ is fully contained in one block.

16. The method for accessing a sought data record r by key k in the layered index of claim 1, comprising:

(a) searching k in $I_h$ to $I_k$ where $h \geq k \geq 0$ and in the case it is not found in the key of a data record in order to find the block of $I_{h-1}$ leading to k;

(b) repeating step (a) until reaching the block of $I_0$ that is associated with the data record with key k, if exists.

17. The method for inserting a data record r by key k in the layered index of claim 1, comprising:

(a) searching k in $I_h$ to $I_k$ where $h \geq k \geq 0$ and in the case it is not found in the key of a data record in order to find the block of $I_{h-1}$ leading to k;

(b) repeating step (a) until reaching the block B of $I_0$ that is associated with the data record with key k, if exists;

(c) associating r to B.

18. The method for deleting a data record r by key k in the layered index of claim 1, comprising:

(a) searching k in $I_h$ to $I_k$ where $h \geq k \geq 0$ and in the case it is not found in the key of a data record in order to find the block of $I_{h-1}$ leading to k;

(b) repeating step (a) until reaching the block B of $I_0$ that is associated with the data record with key k, if exists;

(c) disconnecting r from B.

19. In a storage medium used by a database file management system executed on data processing system, a data structure that includes:

an index arranged in blocks and being constructed over the keys of data records; the index includes a basic partitioned index that is associated with the data records; the basic partitioned index enables accessing or updating the data records by key or keys, and being susceptible to an unbalanced structure of blocks;

said index enables accessing or updating the data records by key or keys and constitutes a balanced structure of blocks.

20. The layered index of claim 19, wherein said storage medium being an external memory.

21. The layered index of claim 20, wherein said storage medium being further an internal memory.

22. The layered index of claim 19, wherein said storage medium being an internal memory.

23. The layered index according to claim 19, capable of supporting the ODBC standard.

24. The method for accessing a sought data record r by key k in the layered index of claim 19, comprising:

(a) searching k in $I_h$ to $I_k$ where $h \geq k \geq 0$ and in the case it is not found in the key of a data record in order to find the block of $I_{h-1}$ leading to k;

(b) repeating step (a) until reaching the block of $I_0$ that is associated with the data record with key k, if exists.

25. The method for inserting a data record r by key k in the layered index of claim 19, comprising:

(a) searching k in $I_h$ to $I_k$ where $h \geq k \geq 0$ and in the case it is not found in the key of a data record in order to find the block of $I_{h-1}$ leading to k;

(b) repeating step (a) until reaching the block B of $I_0$ that is associated with the data record with key k, if exists;

(c) associating r to B.

26. The method for deleting a data record r by key k in the layered index of claim 19, comprising:

(a) searching k in $I_h$ to $I_k$ where $h \geq k \geq 0$ and in the case it is not found in the key of a data record in order to find the block of $I_{h-1}$ leading to k;
(b) repeating step (a) until reaching the block B of $I_0$ that is associated with the data record with key k, if exists;
(c) disconnecting r from B.

27. In a storage medium used by a database file management system executed on data processing system, a data structure that includes:
an index arranged in blocks and being constructed over the keys of data records; the index includes a trie that is associated with the data records; the trie enables accessing or updating the data records by key or keys, and being susceptible to an unbalanced structure of blocks;
said index enables accessing or updating the data records by key or keys and constitutes a balanced structure of blocks.

28. The layered index of claim 27, wherein said storage medium being an external memory.

29. The layered index of claim 28, wherein said storage medium being further an internal memory.

30. The layered index of claim 27, wherein said storage medium being an internal memory.

31. The layered index according to claim 27, capable of supporting the ODBC standard.

32. In a database file management system for accessing data records and being executed on data processing system; the data records are associated with a basic partitioned index arranged in blocks and being stored in a storage medium; the basic partitioned index enables accessing or updating the data records by key or keys and being susceptible to an unbalanced structure of blocks;
a method for constructing a layered index arranged in blocks, comprising the steps of:
(a) providing said basic partitioned index;
(b) constructing a representative index over a representative keys of said basic partitioned index; said layered index enables accessing or updating the data records by key or keys and constitutes a balanced structure of blocks.

33. The layered index of claim 32, wherein said basic partitioned index being a trie.

34. The method of claim 33, wherein said trie being a PAIF trie.

35. The method of claim 34, wherein the representative index being the Btree index scheme.

36. The layered index according to claim 34, wherein the representative index being the PAIF index scheme.

37. The method of claim 32, wherein said storage medium being an external memory.

38. The method of claim 37, wherein said storage medium being further an internal memory.

39. The method of claim 32, wherein said storage medium being an internal memory.

40. The method of claim 32, wherein the basic partitioned index and the representative index being substantially the same index schemes.

41. The layered index according to claim 40, wherein the representative index being the PAIF index scheme.

42. The method of claim 32, wherein the basic partitioned index and the representative index being different index schemes.

43. The method of claim 42, wherein the representative index being the Btree index scheme.

44. The method of claim 32, capable of supporting the ODBC standard.

45. The method of claim 32, wherein said construction step (b) includes:
(a) If B (in $I_{h-1}$) overflows, it is split into two (or more) blocks and the representative of B in $I_h$ is replaced by the representatives of the new blocks.
(b) If the block of $I_h$ overflows an additional layer $I_{h+1}$ is created and added to the layered index.

46. The method according to claim 45, performed on the fly.

47. The method according to claim 45, performed post factum.

48. The method according to claim 32, wherein the constructing step (b) includes:
(a) at least one short link among the short links of a node (hereon split node) in the block (of $B_{i-1}$ is deleted (hereon split link) in a way that at least two tries exist in the block;
(b) each of the sub-trees is moved to a separate block;
(c) if the block of $B_i$ does not exist, $B_i$ is created and a copied node of the split node is created in $B_i$;
(d) if the block of $B_i$ exists and a copied node of the split node does not exist in $B_i$, then a copied node of the split node is created in $B_i$ and connected to the trie of $B_i$ such that $B_{i-1}'$ (at the end of the split process) is accessible in a search path that includes the root node in $B_i$ and the copied node and its labeled links according to the representative key of $B_{i-1}'$;
(e) if the copied node has no direct link, a direct link is added from the copied node to the block $B_{i-1}$;
(f) a far link added from the copied node to the block $B_{i-1}'$ or if the copied node has a short link to a child node in the direction of the far link, the far link is replaced by a direct link from the child node to block $B_{i-1}'$.

49. In a database file management system for accessing data records and being executed on data processing system; the data records are associated with a basic partitioned index arranged in blocks and being stored in a storage medium; the basic partitioned index enables accessing or updating the data records by key or keys and being susceptible to an unbalanced structure of blocks;
a method for constructing an index over the keys of the data records, the index being arranged in blocks, comprising the steps of:
(a) providing said basic partitioned index;
(b) constructing an index over a representative keys of said basic partitioned index; said index enables accessing or updating the data records by key or keys and constitutes a balanced structure of blocks.

50. The method of claim 49, wherein said storage medium being an external memory.

51. The method of claim 50, wherein said storage medium being further an internal memory.

52. The method of claim 49, wherein said storage medium being an internal memory.

53. The method of claim 49, capable of supporting the ODBC standard.

54. The method of claim 32, wherein said index supports sequential operations.

55. The method of claim 49, wherein said index supports sequential operations.

56. The method of claim 49, wherein said constructing step (b) includes:
(a) If B (in $I_{h-1}$) overflows, it is split into two (or more) blocks and the representative of B in $I_h$ is replaced by the representatives of the new blocks, (b) If the block of $I_h$ overflows an additional layer $I_{h+1}$ is created and added to the layered index.

57. The method according to claim 56, performed on the fly.

58. The method according to claim 56, performed post factum.

59. In a database file management system for accessing data records and being executed on data processing system; the data records are associated with a trie arranged in blocks and being stored in a storage medium; the trie enables accessing or updating the data records by key or keys and being susceptible to an unbalanced structure of blocks;
   a method for constructing an index over the keys of the data records, the index being arranged in blocks, comprising the steps of:
   (a) providing a trie;
   (b) constructing an index over a representative keys of said trie;
said index enables accessing or updating the data records by key or keys and constitutes a balanced structure of blocks.

60. The method of claim 59, wherein said index supports sequential operations.

61. In a storage medium used by a database file management system executed on data processing system, a data structure that includes at least one probablistic access indexing file (PAIF) having a plurality of nodes and links;
   the leaf nodes of said PAIF are associated each with at least one data record accessible to said user application program and wherein at least portion of said data record constitutes at least one search-key;
   selected nodes in said PAIF represent, each, a given offset of a search key portion within said search key; link(s) originated from each given node from among said selected nodes, represent, each, a unique value of said search key portion;
   the PAIF having at least two sub-PAIF's being arranged, each, in a block;
   said data base file management system is further capable of arranging said blocks as a balanced structure of blocks.

62. The data processing system according to claim 61, wherein at least some data records that are associated to said leaf nodes are held in at least one separate file.

63. The data processing system according to claim 61, wherein at least one leaf is associated with more than one data record.

64. A method for inserting a new data record into an existing PAIF according to claim 61 including the execution of the following steps:
   i. advancing along a reference path commencing from the root node and ending at a data record associated to a leaf node (referred to as "reference data record"); in each node in the reference path, advancing along a link originated from said node if the value represented by the link equals the value of the 1-bit-long key portion at the offset specified by said node; in the case that the offset specified in the node is beyond any corresponding key portion in the key, or if there is no link with said value, advancing along an arbitrary path to any reference data record;
   ii. comparing the search key of the reference data record to that of the new data record for determining the smallest offset of the search key portion that discerns the two (hereinafter discerning offset),
   iii. proceed to one of the following steps (iii.0–iii.3) depending upon the value of the discerning offset:
      iii.0 if the data records are equal then terminate; or
      iii.1 if the discerning offset matches the offset indicated by one of the nodes in the reference path, add another link originating from said one node and assign to said link the value of the search key portion at the discerning offset taken from the search key of the new data record; or
      iii.2 if the discerning offset is larger than that indicated by the leaf node that is linked, by means of a link, to the reference data record:
         iii.2.1 disconnect the link from the reference data record (i.e. it remains temporarily "loose") and move the link to a new node; the new node is assigned with a value of the discerning offset;
         iii.2.2 connect the reference data record and the new node (which now becomes a leaf node) and assign to the link (long link) a value of the search-key-portion at the discerning offset taken from the search key of the reference data record;
         iii.2.3 connect by means of a link the new data record and the new node and assign to the link (long link) a value of the search-key-portion at the discerning offset taken from the search key of the new data record; or
      iii.3 if conditions iii.0, iii.1 and iii.2 are not met, there exists, in the reference search path, a father node and a child node thereof such that the discerning offset is, at the same time, larger than the offset assigned to the father node and smaller than the offset assigned to the child node—(—considered case A), or all the nodes in the reference search path have a value greater than the discerning offset—(—considered case B); accordingly, apply the following sub-steps:
         iii.3.1 for case A and B, create a new node and assign the node with the value of said discrening offset, for case A only—disconnect the link from the father node to the child node and shift the link to a new internal node (i.e. the child node remains temporarily "loose");
         iii.3.2 for case A and B, connect by means of a link (long link) the new data record and said new internal node; the value assigned to the link is that of the search-key-portion at the discerning offset, as taken from the search key of the new data record;
         iii.3.3 for case A and B., connect by means of a new link the new node and for case A—the child node, for case B—the root node (i.e. the new node becomes for case A—a new father node, for case B—a new root node), and the value assigned to said link is the search-key-portion at the offset indicated by the new node, taken from the search key of the reference data record.

65. A method for obtaining a balanced PAIF index; the PAIF including blocks each accommodating a plurality of nodes and links originated from said nodes; leaf nodes from among said nodes are associated with data records; the method comprising executing the following steps as many times as required:
   (i) replacing a block, constituting a replaced block, with at least two split blocks such that few from among the nodes of said split block are accommodated within one of said split blocks and the remaining nodes from among the nodes of said split block are accommodated within other split blocks;
   (ii) copying at least one node from among the nodes of said replaced block into a block such that said at least two split blocks being children blocks thereof.

66. In a computer system having a storage medium of at least an internal memory that ranges between 10 to 20 M byte or more, and an external memory;
    a data structure that includes an index over the keys of the data records; the index is arranged in blocks; such that for one billion data records substantially no more than two accesses to said external memory are required in order to access a block that is associated with any one of said billion data records, irrespective of the size of the key of said data records.

67. In a computer system having a storage medium of at least an internal memory that ranges between 10 to 20 M byte or more, and an external memory;
    a data structure that includes an index over the keys of the data records; the index is arranged in blocks; such that one million data records substantially all the blocks of the index are accommodated in said internal memory regardless of the size of the key of said data records.

68. In a computer system having a storage medium,
    a data structure that includes an index over the keys of data records; the index is arranged in a balanced structure of blocks and enables to perform sequential operations on said data records; the index size is essentially not affected from the size of said keys.

69. In a storage medium used by a database file management system executed on data processing system, a data structure that includes:
    an index over the keys of data records; the data records being of at least two types where data records of the second type are subordinated to the data records of the first type.

70. The storage medium of claim 69, wherein said index constitutes a layered index.

71. The storage medium according to claim 70, wherein said data record of the first type and said subordinated data record of the second type constitute one to one relationship.

72. The storage medium of claim 70, wherein the basic partitioned index of said layered index being a trie.

73. The storage medium according to claim 69 wherein said data record of the first type and said subordinated data record of the second type constitute one to one relationship.

74. The storage medium of claim 69, wherein said index includes a trie.

75. The storage medium of claim 69, wherein for accessing or updating transaction in respect of subordinated data record having composite key K1 . . . Kn, there exists in the index a subordinated search path that leads to the subordinated data record according to the composite key K1 . . . Kn; the subordinated search path includes a search path to a data record having key K1 . . . kn−1.

76. In a storage medium used by a database file management system executed on data processing system, a data structure that includes:
    a designated index over designated keys of data records; the data records, constituting designated data records, being of at least two types where designated data records of the second type are subordinated to the designated data records of the first type.

77. The storage medium of claim 76, wherein said designated index constitutes a layered index.

78. The storage medium according to claim 77, wherein said designated index constituting a multi-dimensional index.

79. The storage medium according to claim 78, wherein said designated index constituting a multi-model index.

80. The storage medium according to claim 77, wherein said designated index constituting a multi-model index.

81. The storage medium according to claim 76, wherein said multimodel includes relational model.

82. The storage medium according to claim 76, wherein said multimodel includes object oriented model.

83. The storage medium according to claim 76, wherein said multimodel includes object relational model.

84. The storage medium according to claim 76, wherein said multimodel complies with a client server model.

85. The storage medium according to claim 76, wherein said designated index constituting a multi-dimensional index.

86. The storage medium according to claim 85, wherein said data record of the first type and said subordinated data record of the second type constitute one to many relationship.

87. The storage medium according to claim 76, wherein said designated index constituting a multi-model index.

88. The storage medium according to claim 87, wherein said multi-model includes relational model.

89. The storage medium according to claim 87, wherein said multimodel includes object oriented model.

90. The storage medium according to claim 87, wherein said multimodel includes object relational model.

91. The storage medium according to claim 87, wherein said multimodel complies with a client server model.

92. The storage medium according to claim 76, wherein said data record of the first type and said subordinated data record of the second type constitute one to many relationship.

93. The storage medium of claim 76, wherein said index includes a trie.

94. The storage medium of claim 76, wherein for accessing or updating transaction in respect of subordinated data record having composite key K1 . . . Kn, there exists in the index a subordinated search path that leads to the subordinated data record according to the composite key K1 . . . Kn; the subordinated search path includes a search path to a data record having key K1 . . . kn−1.

95. In a storage medium used by a database file management system executed on data processing system, a data structure that includes:
    an index being stored in the storage medium and constructed over the keys of said data records that are stored in blocks; the index being arranged in blocks with the leaf blocks being linked to data records by means of links;
    said index is characterized in that at least one of said links is shared by at least two data records stored in the same block.

96. The storage medium of claim 95, wherein said index being constituted by a trie.

97. In a storage medium used by a database file management system executed on data processing system, a data structure that includes:
    an index being stored in a storage medium and constructed over the keys of said data records that are stored in blocks; the index being arranged in blocks with the leaf blocks being linked to data records by means of links;
    said index is characterized in that at least one of said links is shared by at least two data records stored in the same block;
    said index constituting a layered index according to claim 1, and blocks of said basic partitioned index are linked to said data records.

98. The storage medium of claim 97, wherein said index being constituted by a trie.

* * * * *

UNITED STATES PATENT AND TRADEMARK OFFICE
CERTIFICATE OF CORRECTION

PATENT NO.   : 6,175,835 B1
DATED        : January 16, 2001
INVENTOR(S)  : Moshe Shadmon It is certified that error appears in the above-identified patent and that said Letters Patent is hereby corrected as shown below:

Column 50,
Line 15, before "is" insert -- ) --.
Line 67, change "," to -- ; --.

Column 51,
Line 65, change "," to -- ; --.

Column 53,
Line 15, after "that" insert -- for --.
Line 66, change "76" to -- 80 --.

Column 54,
Line 1, change "76" to -- 80 --.
Line 3, change "76" to -- 80 --.
Line 5, change "76" to -- 80 --.

Signed and Sealed this

Twelfth Day of March, 2002

Attest:

JAMES E. ROGAN
*Attesting Officer*     *Director of the United States Patent and Trademark Office*